(12) United States Patent
Joshi et al.

(10) Patent No.: US 10,078,865 B2
(45) Date of Patent: Sep. 18, 2018

(54) SENSOR-DATA SUB-CONTRACTING DURING ENVIRONMENTAL MONITORING

(71) Applicant: LEEO, INC., Palo Alto, CA (US)

(72) Inventors: Nina S. Joshi, Saratoga, CA (US); Adam M. Gettings, Red Wing, MN (US); Eddy Y. Chan, Mountain View, CA (US); Andrew G. Stevens, Palo Alto, CA (US); Lucas D. Ivers, Mountain View, CA (US); Bjorn H. Hovland, Woodside, CA (US)

(73) Assignee: Leeo, Inc., San Mateo, CA (US)

( * ) Notice: Subject to any disclaimer, the term of this patent is extended or adjusted under 35 U.S.C. 154(b) by 10 days.

(21) Appl. No.: 14/701,421

(22) Filed: Apr. 30, 2015

(65) Prior Publication Data

US 2016/0072891 A1 Mar. 10, 2016

Related U.S. Application Data

(60) Provisional application No. 62/047,440, filed on Sep. 8, 2014.

(51) Int. Cl.
*H04W 4/00* (2018.01)
*G06Q 30/06* (2012.01)
(Continued)

(52) U.S. Cl.
CPC ....... *G06Q 30/0641* (2013.01); *G06F 3/0484* (2013.01); *G06F 9/4443* (2013.01);
(Continued)

(58) Field of Classification Search
None
See application file for complete search history.

(56) References Cited

U.S. PATENT DOCUMENTS 900,595 A 10/1908 Sanders
988,665 A 4/1911 Ripson
(Continued)

FOREIGN PATENT DOCUMENTS

EP 1500955 A1 1/2005
EP 1724523 A1 11/2006
(Continued)

OTHER PUBLICATIONS

U.S. Appl. No. 14/263,616, filed Apr. 28, 2014.
(Continued)

*Primary Examiner* — Anh-Vu Ly
(74) *Attorney, Agent, or Firm* — Aurora Consulting LLC; Steven Stupp

(57) ABSTRACT

An interface mechanism in a system receives a service request for a service associated with an environment from an electronic device of an entity. In response to the service request, a control mechanism in the system identifies an environmental monitoring device within the environment, where the environmental monitoring device provides sensor data that represents an environmental condition in the environment, and the environmental monitoring device is associated with a second entity that is different from the entity and a third entity associated with the system. Moreover, the control mechanism provides, via the interface mechanism, a data request for the sensor data to the environmental monitoring device. Furthermore, in response to the data request, the interface mechanism receives the sensor data from the environmental monitoring device. Then, the control mechanism provides the service to the entity based on the environmental condition.

21 Claims, 41 Drawing Sheets

(51) Int. Cl.

| | | |
|---|---|---|
| *G06Q 30/02* | (2012.01) | |
| *H04L 29/08* | (2006.01) | |
| *G06F 9/451* | (2018.01) | |
| *G06F 11/07* | (2006.01) | |
| *G06F 21/62* | (2013.01) | |
| *G06F 3/0484* | (2013.01) | |
| *G06Q 50/16* | (2012.01) | |
| *G06Q 40/08* | (2012.01) | |
| *H04M 15/00* | (2006.01) | |
| *H04L 12/24* | (2006.01) | |
| *H04L 12/26* | (2006.01) | |
| *G06F 9/44* | (2018.01) | |
| *G06F 21/52* | (2013.01) | |

(52) U.S. Cl.
CPC .......... *G06F 9/451* (2018.02); *G06F 11/0793* (2013.01); *G06F 21/52* (2013.01); *G06F 21/6218* (2013.01); *G06Q 30/0252* (2013.01); *G06Q 30/0269* (2013.01); *G06Q 30/0283* (2013.01); *G06Q 30/0631* (2013.01); *G06Q 40/08* (2013.01); *G06Q 50/163* (2013.01); *H04L 41/0806* (2013.01); *H04L 43/08* (2013.01); *H04L 67/12* (2013.01); *H04L 67/16* (2013.01); *H04M 15/68* (2013.01)

(56) References Cited

U.S. PATENT DOCUMENTS

| | | |
|---|---|---|
| 3,030,806 A | 4/1962 | Merlin |
| 3,499,664 A | 3/1970 | Burns |
| 3,722,501 A | 3/1973 | Derouineau |
| 3,767,933 A | 10/1973 | Bogue |
| 3,895,638 A | 7/1975 | Ito |
| 4,093,867 A | 6/1978 | Shah |
| 4,286,470 A | 9/1981 | Lynnworth |
| 4,418,333 A | 11/1983 | Schwarzbach |
| 4,450,436 A | 5/1984 | Massa |
| 4,772,126 A | 9/1988 | Allemand |
| 4,812,827 A | 3/1989 | Scripps |
| 4,829,283 A | 5/1989 | Spang |
| 4,896,039 A | 1/1990 | Fraden |
| 4,896,136 A | 1/1990 | Hotovy |
| 4,984,380 A | 1/1991 | Anderson |
| 5,003,486 A | 3/1991 | Hendel |
| 5,045,833 A | 9/1991 | Smith |
| 5,068,715 A | 11/1991 | Wade |
| 5,156,203 A | 10/1992 | Funakoshi |
| 5,159,315 A | 10/1992 | Schultz |
| 5,185,531 A | 2/1993 | Wynn |
| 5,192,271 A | 3/1993 | Kalb |
| 5,307,051 A | 4/1994 | Sedlmayr |
| 5,426,501 A | 6/1995 | Hokanson |
| 5,478,256 A | 12/1995 | Koganemaru |
| 5,492,482 A | 2/1996 | Lockman |
| 5,493,618 A | 2/1996 | Stevens |
| 5,532,660 A | 7/1996 | Smith |
| 5,578,995 A | 11/1996 | Bryant |
| 5,586,036 A | 12/1996 | Pintsov |
| 5,623,197 A | 4/1997 | Roseman |
| 5,646,591 A | 7/1997 | Issa |
| 5,675,070 A | 10/1997 | Gelperin |
| 5,745,670 A | 4/1998 | Linde |
| 5,801,297 A | 9/1998 | Mifsud |
| 5,855,494 A | 1/1999 | Blaszcyk et al. |
| 5,905,436 A | 5/1999 | Dwight et al. |
| 5,924,486 A | 7/1999 | Ehlers |
| 5,936,613 A | 8/1999 | Jaeger |
| 6,023,223 A | 2/2000 | Baxter |
| 6,023,233 A | 2/2000 | Craven |
| 6,074,089 A | 6/2000 | Hollander |
| 6,077,107 A | 6/2000 | Hetherington |
| 6,084,572 A | 7/2000 | Yaniger |
| 6,158,868 A | 12/2000 | Chien |
| 6,216,956 B1 | 4/2001 | Ehlers |
| 6,234,642 B1 | 5/2001 | Bokämper |
| 6,257,758 B1 | 7/2001 | Culbertson |
| 6,408,704 B1 | 6/2002 | Willeke |
| 6,415,205 B1 | 7/2002 | Myron |
| 6,428,334 B1 | 8/2002 | Skarie |
| 6,442,999 B1 | 9/2002 | Baumoel |
| 6,492,907 B1 | 12/2002 | Mccracken |
| 6,542,234 B1 | 4/2003 | Ulrich |
| 6,554,439 B1 | 4/2003 | Teicher |
| 6,615,147 B1 | 9/2003 | Jonker |
| 6,672,129 B1 | 1/2004 | Frederickson |
| 6,677,573 B1 | 1/2004 | Nakata |
| 6,741,177 B2 | 5/2004 | Ballantyne |
| 6,753,776 B2 | 6/2004 | Drinkard |
| 6,753,786 B1 | 6/2004 | Apperson |
| 6,759,763 B2 | 7/2004 | Barton |
| 6,762,686 B1 | 7/2004 | Tabe |
| 6,772,052 B1 | 8/2004 | Amundsen |
| 6,828,909 B2 | 12/2004 | Script |
| 6,853,958 B1 | 2/2005 | Turin |
| 6,873,725 B2 | 3/2005 | Xu |
| 6,892,317 B1 * | 5/2005 | Sampath ................. G06F 11/25 714/4.3 |
| 6,950,017 B2 | 9/2005 | Smith |
| 6,981,943 B2 | 1/2006 | Noguchi |
| 6,991,029 B2 | 1/2006 | Orfield |
| 7,038,398 B1 | 5/2006 | Lys |
| 7,049,968 B2 | 5/2006 | Fitzgerald |
| 7,089,780 B2 | 8/2006 | Sunshine |
| 7,098,782 B1 | 8/2006 | Peckham |
| 7,116,213 B2 | 10/2006 | Thiesen |
| 7,119,789 B1 | 10/2006 | Shaw |
| 7,155,317 B1 | 12/2006 | Tran |
| 7,166,796 B2 | 1/2007 | Nicoloau |
| 7,166,937 B2 | 1/2007 | Wilson |
| 7,227,652 B2 | 6/2007 | Cronch |
| 7,257,397 B2 | 8/2007 | Shamoon |
| 7,264,377 B2 | 9/2007 | Cooper |
| 7,287,738 B2 | 10/2007 | Pitlor |
| 7,304,129 B2 | 12/2007 | Saffell |
| 7,304,259 B2 | 12/2007 | Schwarz |
| 7,337,078 B2 | 2/2008 | Bond |
| RE40,437 E | 7/2008 | Rosen |
| 7,400,594 B2 | 7/2008 | Pereira |
| 7,405,524 B2 | 7/2008 | Null |
| 7,420,293 B2 | 9/2008 | Donnelly |
| 7,424,624 B2 | 9/2008 | Espinoza-Ibarra |
| 7,438,446 B1 | 10/2008 | McCann |
| 7,440,554 B2 | 10/2008 | Elliot |
| 7,492,273 B2 | 2/2009 | Sharpe |
| 7,502,199 B2 | 3/2009 | Hori |
| 7,515,041 B2 | 4/2009 | Eisold |
| 7,520,607 B2 | 4/2009 | Casper |
| 7,522,036 B1 | 4/2009 | Preuss |
| 7,649,472 B1 | 1/2010 | Paterno |
| 7,673,525 B2 | 3/2010 | Huang |
| 7,685,861 B2 | 3/2010 | Lynch |
| 7,710,824 B1 | 5/2010 | Katzer et al. |
| 7,714,536 B1 | 5/2010 | Silberg |
| 7,764,180 B2 | 7/2010 | Huang |
| 7,784,293 B2 | 8/2010 | Violand |
| 7,786,879 B2 | 8/2010 | Lax |
| 7,818,184 B2 | 10/2010 | Penny |
| 7,825,546 B2 | 11/2010 | Li |
| 7,828,463 B1 | 11/2010 | Willis |
| 7,839,280 B2 | 11/2010 | Peters |
| 7,874,695 B2 | 1/2011 | Jensen |
| 7,905,154 B2 | 3/2011 | Jones |
| 7,908,211 B1 | 3/2011 | Chen |
| 7,952,475 B2 | 5/2011 | Ivanov |
| 7,963,177 B2 | 6/2011 | Gysling |
| 7,992,332 B2 | 8/2011 | Lowenthal |
| 7,994,928 B2 | 8/2011 | Richmond |
| 8,018,327 B2 | 9/2011 | Nelson |
| 8,051,312 B2 | 11/2011 | Foley |
| 8,060,018 B2 | 11/2011 | Davis |
| 8,097,984 B2 | 1/2012 | Baarman |
| 8,113,069 B2 | 2/2012 | Settles |

(56) References Cited

U.S. PATENT DOCUMENTS

| | | |
|---|---|---|
| 8,125,194 B2 | 2/2012 | Nethken |
| 8,155,012 B2 | 4/2012 | Austermann |
| 8,170,722 B1 | 5/2012 | Elberbaum |
| 8,224,576 B2 | 7/2012 | Jensen |
| 8,242,640 B2 | 8/2012 | Lee |
| 8,255,090 B2 | 8/2012 | Frader-Thompson |
| 8,271,321 B1 | 9/2012 | Kestenbaum |
| 8,289,135 B2 | 10/2012 | Griffin |
| 8,301,271 B2 | 10/2012 | Lee |
| 8,314,590 B2 | 11/2012 | Chen |
| 8,335,936 B2 | 12/2012 | Jonsson |
| 8,350,406 B2 | 1/2013 | Byrne et al. |
| 8,350,697 B2 | 1/2013 | Trundle |
| 8,369,135 B1 | 2/2013 | Mani |
| 8,451,132 B1 | 5/2013 | Van Vleet |
| 8,456,293 B1 | 6/2013 | Trundle |
| 8,463,452 B2 | 6/2013 | Masters |
| 8,466,626 B2 | 6/2013 | Null |
| 8,475,367 B1 | 7/2013 | Yuen |
| 8,483,112 B2 | 7/2013 | Keshavarzian |
| 8,489,437 B1 | 7/2013 | Dlott |
| 8,493,618 B2 | 7/2013 | Ishii |
| 8,523,758 B1 | 9/2013 | Kirby |
| 8,543,247 B2 | 9/2013 | Boss |
| 8,564,403 B2 | 10/2013 | Landau-Holdsworth |
| 8,583,843 B2 | 11/2013 | Rosso |
| 8,605,091 B2 | 12/2013 | Bradbury |
| 8,610,587 B2 | 12/2013 | Tropper |
| 8,636,271 B2 | 1/2014 | Check |
| 8,639,391 B1 | 1/2014 | Alberth |
| 8,650,048 B1 | 2/2014 | Hopkins |
| 8,660,582 B2 | 2/2014 | Chen |
| 8,683,236 B2 | 3/2014 | Ukita |
| 8,730,004 B2 | 5/2014 | Elfstrom et al. |
| 8,798,260 B2 | 8/2014 | Smith |
| 8,805,386 B2 | 8/2014 | Cho |
| 8,823,529 B2 | 9/2014 | Reed |
| 8,897,804 B2 | 11/2014 | Couch |
| 8,910,298 B2 | 12/2014 | Gettings |
| 8,917,186 B1 | 12/2014 | Grant |
| 9,064,394 B1 | 6/2015 | Trundle |
| 2001/0007800 A1 | 7/2001 | Skarie |
| 2002/0011947 A1 | 1/2002 | Stolarczyk |
| 2002/0037026 A1 | 3/2002 | Sato |
| 2002/0046197 A1 | 4/2002 | Kashti |
| 2002/0050932 A1 | 5/2002 | Rhoades |
| 2002/0066019 A1 | 5/2002 | Amonou |
| 2002/0069076 A1 | 6/2002 | Faris |
| 2002/0073138 A1 | 6/2002 | Gilbert |
| 2002/0095260 A1 | 7/2002 | Huyn |
| 2002/0095269 A1* | 7/2002 | Natalini ............... H04L 12/2803 702/188 |
| 2002/0097546 A1 | 7/2002 | Weinberger |
| 2002/0111846 A1 | 8/2002 | Singer |
| 2002/0143564 A1 | 10/2002 | Webb |
| 2002/0152037 A1 | 10/2002 | Sunshine |
| 2002/0170367 A1 | 11/2002 | Lieber |
| 2002/0188504 A1 | 12/2002 | Whale |
| 2003/0028270 A1 | 2/2003 | Peterson |
| 2003/0059185 A1 | 3/2003 | Russell |
| 2003/0074092 A1 | 4/2003 | Carrabis |
| 2003/0194904 A1 | 10/2003 | Rupert et al. |
| 2003/0221118 A1* | 11/2003 | Walker ................. B60R 25/042 713/193 |
| 2003/0227220 A1 | 12/2003 | Biskup |
| 2003/0227389 A1 | 12/2003 | McGreal |
| 2003/0231495 A1 | 12/2003 | Searfoss |
| 2004/0015572 A1 | 1/2004 | Kang |
| 2004/0025604 A1 | 2/2004 | Call |
| 2004/0030531 A1 | 2/2004 | Miller |
| 2004/0069046 A1 | 4/2004 | Sunshine |
| 2004/0075566 A1 | 4/2004 | Stepanik |
| 2004/0147038 A1 | 7/2004 | Lewis |
| 2004/0158193 A1 | 8/2004 | Bui |
| 2004/0210155 A1 | 10/2004 | Takemura |
| 2004/0215981 A1 | 10/2004 | Ricciardi |
| 2005/0008127 A1 | 1/2005 | Holmes |
| 2005/0045784 A1 | 3/2005 | Pitlor |
| 2005/0073405 A1 | 4/2005 | Spoltore |
| 2005/0111213 A1 | 5/2005 | Smith |
| 2005/0136972 A1 | 6/2005 | Smith |
| 2005/0148890 A1 | 7/2005 | Hastings |
| 2005/0154494 A1 | 7/2005 | Ahmed |
| 2005/0229452 A1 | 10/2005 | Shimasaki |
| 2005/0276051 A1 | 12/2005 | Caudle |
| 2005/0289378 A1 | 12/2005 | Vorenkamp |
| 2006/0004492 A1 | 1/2006 | Terlson |
| 2006/0119954 A1 | 6/2006 | Casper |
| 2006/0173580 A1 | 8/2006 | Desrochers |
| 2006/0236326 A1 | 10/2006 | Rao |
| 2006/0238757 A1 | 10/2006 | Silcott |
| 2006/0250236 A1 | 11/2006 | Ackley |
| 2006/0250260 A1 | 11/2006 | Albert |
| 2006/0272417 A1 | 12/2006 | Zanker |
| 2006/0287783 A1* | 12/2006 | Walker ..................... H04Q 9/00 701/31.4 |
| 2007/0038334 A1 | 2/2007 | Chou |
| 2007/0061393 A1 | 3/2007 | Moore |
| 2007/0109121 A1 | 5/2007 | Cohen |
| 2007/0132558 A1 | 6/2007 | Rowe |
| 2007/0138307 A1 | 6/2007 | Khoo |
| 2007/0155349 A1 | 7/2007 | Nelson |
| 2007/0168088 A1 | 7/2007 | Ewing |
| 2007/0173978 A1 | 7/2007 | Fein |
| 2007/0182963 A1 | 8/2007 | Wright |
| 2007/0219650 A1 | 9/2007 | Wang et al. |
| 2007/0225868 A1 | 9/2007 | Terlson |
| 2007/0241615 A1 | 10/2007 | Goodrich |
| 2007/0268687 A1 | 11/2007 | Scannell |
| 2007/0276548 A1 | 11/2007 | Uzunovic |
| 2007/0278285 A1 | 12/2007 | Ehrensvaerd |
| 2008/0024089 A1 | 1/2008 | Meng |
| 2008/0065427 A1 | 3/2008 | Helitzer |
| 2008/0096620 A1 | 4/2008 | Lee |
| 2008/0097809 A1 | 4/2008 | Stroman |
| 2008/0106424 A1 | 5/2008 | Bouse |
| 2008/0120296 A1 | 5/2008 | Kariathungal |
| 2008/0123332 A1 | 5/2008 | Searfoss |
| 2008/0143525 A1 | 6/2008 | Woodbury |
| 2008/0155429 A1 | 6/2008 | Frank et al. |
| 2008/0173817 A1 | 7/2008 | Goldstein |
| 2008/0183852 A1 | 7/2008 | Pramer |
| 2008/0204258 A1 | 8/2008 | Dayton |
| 2008/0211683 A1 | 9/2008 | Curt |
| 2008/0221714 A1 | 9/2008 | Schoettle |
| 2008/0279287 A1 | 11/2008 | Asahina |
| 2008/0291036 A1 | 11/2008 | Richmond |
| 2008/0303678 A1 | 12/2008 | Mccredy |
| 2009/0012633 A1 | 1/2009 | Liu |
| 2009/0031786 A1 | 2/2009 | Takeuchi |
| 2009/0054799 A1 | 2/2009 | Vrtis |
| 2009/0065596 A1 | 3/2009 | Seem |
| 2009/0066513 A1 | 3/2009 | Kondo |
| 2009/0073694 A1 | 3/2009 | Scannell, Jr. |
| 2009/0096620 A1 | 4/2009 | Kuo |
| 2009/0105558 A1 | 4/2009 | Riley-Doucet |
| 2009/0140898 A1 | 6/2009 | Ceballos |
| 2009/0141898 A1 | 6/2009 | Huang |
| 2009/0154148 A1 | 6/2009 | Meyer |
| 2009/0157839 A1 | 6/2009 | Diederichs |
| 2009/0193578 A1 | 8/2009 | Jang |
| 2009/0195382 A1 | 8/2009 | Hall |
| 2009/0225480 A1 | 9/2009 | Baxter |
| 2009/0243597 A1 | 10/2009 | Spenik |
| 2009/0271013 A1 | 10/2009 | Chen |
| 2009/0278868 A1 | 11/2009 | Nakahira |
| 2009/0290156 A1 | 11/2009 | Popescu |
| 2009/0298957 A1 | 12/2009 | Gauthier |
| 2009/0303031 A1 | 12/2009 | Strohallen |
| 2010/0008286 A1 | 1/2010 | Abedi |
| 2010/0025449 A1 | 2/2010 | Longobardi |
| 2010/0033329 A1 | 2/2010 | Davis |
| 2010/0070619 A1 | 3/2010 | Chaganti |
| 2010/0071008 A1 | 3/2010 | Hu |

(56) References Cited

U.S. PATENT DOCUMENTS

| | | |
|---|---|---|
| 2010/0076615 A1 | 3/2010 | Daniel |
| 2010/0090822 A1 | 4/2010 | Benson |
| 2010/0101264 A1 | 4/2010 | Nishino |
| 2010/0145543 A1 | 6/2010 | Middlemiss |
| 2010/0161778 A1* | 6/2010 | Guinard ............ G06F 9/5044 709/222 |
| 2010/0164711 A1 | 7/2010 | Arms |
| 2010/0164742 A1 | 7/2010 | Anderson |
| 2010/0182201 A1 | 7/2010 | Graczyk |
| 2010/0191551 A1 | 7/2010 | Drance |
| 2010/0198656 A1 | 8/2010 | Soroka |
| 2010/0201536 A1 | 8/2010 | Robertson et al. |
| 2010/0214090 A1* | 8/2010 | Sartini ............ H04L 12/581 340/517 |
| 2010/0214417 A1 | 8/2010 | Gennari |
| 2010/0228819 A1 | 9/2010 | Wei |
| 2010/0235004 A1 | 9/2010 | Thind |
| 2010/0249955 A1 | 9/2010 | Sitton |
| 2010/0264871 A1 | 10/2010 | Matouka |
| 2010/0274367 A1 | 10/2010 | Kaufman |
| 2010/0277316 A1 | 11/2010 | Schlangen |
| 2010/0279675 A1 | 11/2010 | Slack |
| 2010/0296685 A1 | 11/2010 | Carle |
| 2010/0298742 A1 | 11/2010 | Perlman |
| 2010/0298957 A1 | 11/2010 | Sanchez Rocha |
| 2010/0306033 A1 | 12/2010 | Oved |
| 2010/0313748 A1 | 12/2010 | Schluter |
| 2010/0318236 A1 | 12/2010 | Kilborn |
| 2010/0323594 A1 | 12/2010 | Sun |
| 2011/0003587 A1 | 1/2011 | Belz |
| 2011/0007491 A1 | 1/2011 | Robinson |
| 2011/0025499 A1 | 2/2011 | Hoy |
| 2011/0027626 A1 | 2/2011 | Lattin |
| 2011/0046792 A1 | 2/2011 | Imes |
| 2011/0071656 A1 | 3/2011 | McKiel |
| 2011/0074596 A1 | 3/2011 | Frohlick |
| 2011/0082599 A1 | 4/2011 | Shinde |
| 2011/0093281 A1 | 4/2011 | Plummer |
| 2011/0095801 A1 | 4/2011 | Bjerregaard et al. |
| 2011/0108724 A1 | 5/2011 | Ewing |
| 2011/0130156 A1 | 6/2011 | Theimer |
| 2011/0185198 A1 | 7/2011 | Ukita |
| 2011/0187542 A1 | 8/2011 | Dittmer |
| 2011/0191198 A1 | 8/2011 | Rise |
| 2011/0202193 A1 | 8/2011 | Craig |
| 2011/0216453 A1 | 9/2011 | Haines |
| 2011/0245988 A1 | 10/2011 | Ingels |
| 2011/0260851 A1 | 10/2011 | Richman |
| 2011/0270458 A1 | 11/2011 | Liu |
| 2011/0270773 A1 | 11/2011 | Siekman |
| 2011/0273283 A1 | 11/2011 | Schmuttor |
| 2011/0275960 A1 | 11/2011 | Westerink |
| 2011/0292446 A1 | 12/2011 | Kojima |
| 2011/0313582 A1 | 12/2011 | Van Megen |
| 2011/0316355 A1 | 12/2011 | Gruber |
| 2012/0004871 A1 | 1/2012 | Tsao |
| 2012/0022886 A1 | 1/2012 | Ohnemus |
| 2012/0023555 A1 | 1/2012 | Putterman |
| 2012/0025221 A1 | 2/2012 | Sakumoto |
| 2012/0041917 A1 | 2/2012 | Newton |
| 2012/0051714 A1 | 3/2012 | Reimnitz |
| 2012/0071008 A1 | 3/2012 | Sessford |
| 2012/0072755 A1 | 3/2012 | Jun |
| 2012/0082180 A1 | 4/2012 | Edwardson |
| 2012/0086402 A1 | 4/2012 | Carder |
| 2012/0087211 A1 | 4/2012 | Lee et al. |
| 2012/0095610 A1 | 4/2012 | Chapel |
| 2012/0098439 A1 | 4/2012 | Recker et al. |
| 2012/0105201 A1 | 5/2012 | Sanders |
| 2012/0109398 A1 | 5/2012 | Bhakta |
| 2012/0116820 A1 | 5/2012 | English |
| 2012/0119714 A1 | 5/2012 | Jitaru |
| 2012/0124354 A1 | 5/2012 | Batwara |
| 2012/0130544 A1 | 5/2012 | Mohan |
| 2012/0154126 A1 | 6/2012 | Cohn |
| 2012/0161969 A1 | 6/2012 | Husen |
| 2012/0166610 A1 | 6/2012 | Doh |
| 2012/0166642 A1 | 6/2012 | Saint Clair et al. |
| 2012/0172027 A1 | 7/2012 | Partheesh |
| 2012/0194082 A1 | 8/2012 | Huang |
| 2012/0197196 A1 | 8/2012 | Halbert |
| 2012/0206050 A1 | 8/2012 | Spero |
| 2012/0209634 A1 | 8/2012 | Ling |
| 2012/0215652 A1 | 8/2012 | Melvin |
| 2012/0229248 A1 | 9/2012 | Parshionikar |
| 2012/0229278 A1 | 9/2012 | Roosli |
| 2012/0258800 A1 | 10/2012 | Mikhailov |
| 2012/0265361 A1 | 10/2012 | Billingsley |
| 2012/0268136 A1 | 10/2012 | Lee |
| 2012/0271471 A1 | 10/2012 | Lee |
| 2012/0278101 A1 | 11/2012 | Homchowdhury |
| 2012/0280809 A1 | 11/2012 | Glenn |
| 2012/0283860 A1 | 11/2012 | Ho |
| 2012/0288124 A1 | 11/2012 | Fejzo |
| 2012/0303554 A1 | 11/2012 | Osann |
| 2012/0310703 A1 | 12/2012 | Cavalcanti |
| 2012/0314344 A1 | 12/2012 | Lam |
| 2012/0316661 A1 | 12/2012 | Rahman |
| 2012/0319593 A1 | 12/2012 | Jou |
| 2012/0319838 A1 | 12/2012 | Ly |
| 2012/0325023 A1 | 12/2012 | Calio |
| 2013/0006436 A1 | 1/2013 | Masters |
| 2013/0013967 A1 | 1/2013 | Gokhale et al. |
| 2013/0019320 A1 | 1/2013 | Ericsson |
| 2013/0021720 A1 | 1/2013 | Ty et al. |
| 2013/0024211 A1 | 1/2013 | Monteforte |
| 2013/0035599 A1 | 2/2013 | De Bruijn |
| 2013/0035992 A1* | 2/2013 | Silverman ........ G06Q 30/0233 705/14.1 |
| 2013/0038470 A1 | 2/2013 | Niemeyer |
| 2013/0049466 A1 | 2/2013 | Adams |
| 2013/0049607 A1 | 2/2013 | Urata |
| 2013/0051543 A1 | 2/2013 | McDysan et al. |
| 2013/0053023 A1 | 2/2013 | Meredith |
| 2013/0058116 A1 | 3/2013 | Galbas |
| 2013/0082817 A1 | 4/2013 | Gruenbacher |
| 2013/0083805 A1 | 4/2013 | Lu |
| 2013/0085609 A1 | 4/2013 | Barker |
| 2013/0085615 A1 | 4/2013 | Barker |
| 2013/0107041 A1 | 5/2013 | Norem |
| 2013/0119891 A1 | 5/2013 | Herremans |
| 2013/0135214 A1 | 5/2013 | Li |
| 2013/0141233 A1 | 6/2013 | Jacobs et al. |
| 2013/0144644 A1 | 6/2013 | Simpson |
| 2013/0162821 A1 | 6/2013 | Park |
| 2013/0166089 A1 | 6/2013 | Craig |
| 2013/0174646 A1 | 7/2013 | Martin |
| 2013/0175132 A1 | 7/2013 | Battlogg |
| 2013/0179276 A1 | 7/2013 | Wheelon |
| 2013/0184880 A1 | 7/2013 | Mcmahon |
| 2013/0200254 A1 | 8/2013 | Johnson |
| 2013/0201033 A1 | 8/2013 | Cohn |
| 2013/0234625 A1 | 9/2013 | Kondo |
| 2013/0238153 A1 | 9/2013 | Warwick |
| 2013/0252638 A1 | 9/2013 | Yang |
| 2013/0264889 A1 | 10/2013 | Quittek |
| 2013/0271015 A1 | 10/2013 | Peng |
| 2013/0275148 A1 | 10/2013 | Attaluri |
| 2013/0276144 A1 | 10/2013 | Hansen |
| 2013/0289919 A1 | 10/2013 | Wilson |
| 2013/0338839 A1 | 12/2013 | Rogers |
| 2013/0339766 A1 | 12/2013 | Chen |
| 2013/0346229 A1* | 12/2013 | Martin ............ G06Q 40/00 705/26.3 |
| 2014/0006506 A1 | 1/2014 | Frei |
| 2014/0025221 A1 | 1/2014 | Chapel |
| 2014/0028097 A1 | 1/2014 | Augur |
| 2014/0032003 A1 | 1/2014 | Chapel |
| 2014/0035749 A1 | 2/2014 | Reed |
| 2014/0046599 A1 | 2/2014 | Smith |
| 2014/0052300 A1 | 2/2014 | Matsuoka et al. |
| 2014/0069131 A1 | 3/2014 | Masui |
| 2014/0070959 A1 | 3/2014 | Bhargava et al. |
| 2014/0075220 A1 | 3/2014 | Song |

(56) References Cited

U.S. PATENT DOCUMENTS

| | | | |
|---|---|---|---|
| 2014/0075496 A1 | 3/2014 | Prakash |
| 2014/0092765 A1 | 4/2014 | Agarwal |
| 2014/0098445 A1 | 4/2014 | Hooper |
| 2014/0099941 A1 | 4/2014 | Ji |
| 2014/0100700 A1 | 4/2014 | Matsumoto |
| 2014/0101346 A1 | 4/2014 | Naaman |
| 2014/0122140 A1 | 5/2014 | Rijnders et al. |
| 2014/0136242 A1 | 5/2014 | Weekes |
| 2014/0141725 A1 | 5/2014 | Jesme |
| 2014/0143149 A1 | 5/2014 | Aissi |
| 2014/0143569 A1 | 5/2014 | Banerjee |
| 2014/0156084 A1 | 6/2014 | Rahman |
| 2014/0185646 A1 | 7/2014 | Mowry |
| 2014/0187162 A1 | 7/2014 | Mei |
| 2014/0188286 A1 | 7/2014 | Hunka |
| 2014/0233186 A1 | 8/2014 | Savelli |
| 2014/0236372 A1 | 8/2014 | Ewing |
| 2014/0253326 A1 | 9/2014 | Cho |
| 2014/0257572 A1 | 9/2014 | Mohan |
| 2014/0274147 A1 | 9/2014 | Kennedy |
| 2014/0277869 A1 | 9/2014 | King |
| 2014/0281544 A1 | 9/2014 | Paczkowski |
| 2014/0283144 A1 | 9/2014 | Gettings |
| 2014/0292514 A1 | 10/2014 | Glenn |
| 2014/0340227 A1 | 11/2014 | Reed |
| 2014/0364089 A1 | 12/2014 | Leinhart |
| 2014/0365017 A1 | 12/2014 | Hanna |
| 2015/0021465 A1 | 1/2015 | Gettings |
| 2015/0049191 A1 | 2/2015 | Scalisi |
| 2015/0065161 A1 | 3/2015 | Ganesh |
| 2015/0072663 A1 | 3/2015 | Chande |
| 2015/0179038 A1 | 6/2015 | Daniel |
| 2015/0195100 A1 | 7/2015 | Imes |
| 2015/0256623 A1* | 9/2015 | Ryhorchuk .............. H04L 67/12 709/217 |
| 2015/0326701 A1 | 11/2015 | Robfogel |
| 2015/0365278 A1* | 12/2015 | Chakrabarti ........ H04L 41/0806 370/254 |
| 2016/0070276 A1* | 3/2016 | Joshi ................... G05D 23/1393 705/14.66 |
| 2016/0070614 A1* | 3/2016 | Joshi ................... G05D 23/1393 714/47.1 |
| 2016/0070920 A1* | 3/2016 | Joshi ................... G05D 23/1393 726/28 |
| 2016/0071148 A1* | 3/2016 | Joshi ................... G05D 23/1393 705/14.5 |
| 2016/0071183 A1* | 3/2016 | Joshi ................... G05D 23/1393 705/26.7 |
| 2016/0071184 A1* | 3/2016 | Joshi ................... G05D 23/1393 705/26.7 |
| 2016/0071219 A1* | 3/2016 | Joshi ................... G05D 23/1393 705/4 |
| 2016/0127878 A1 | 5/2016 | Clarke |
| 2016/0183064 A1 | 6/2016 | Wouhaybi |
| 2016/0246473 A1 | 8/2016 | Jobs |

FOREIGN PATENT DOCUMENTS

| | | |
|---|---|---|
| GB | 2454731 A | 5/2009 |
| JP | 2002077324 A | 3/2002 |
| WO | WO-01033178 | 5/2001 |
| WO | WO-2005063006 | 7/2005 |
| WO | WO-2007148299 | 12/2007 |
| WO | WO-2013072926 | 5/2013 |

OTHER PUBLICATIONS

U.S. Appl. No. 14/263,668, filed Apr. 28, 2014.
U.S. Appl. No. 14/263,721, filed Apr. 28, 2014.
U.S. Appl. No. 14/283,075, filed May 20, 2014.
U.S. Appl. No. 14/640,738, filed Mar. 6, 2015.
U.S. Appl. No. 14/283,079, filed May 20, 2014.
U.S. Appl. No. 14/283,084, filed May 20, 2014.
U.S. Appl. No. 14/283,086, filed May 20, 2014.
U.S. Appl. No. 14/283,035, filed May 20, 2014.
U.S. Appl. No. 14/283,057, filed May 20, 2014.
U.S. Appl. No. 14/283,080, filed May 20, 2014.
U.S. Appl. No. 14/752,634, filed Jun. 26, 2015.
U.S. Appl. No. 14/283,097, filed May 20, 2014.
U.S. Appl. No. 14/316,446, filed Jun. 26, 2014.
U.S. Appl. No. 14/263,769, filed Apr. 28, 2014.
U.S. Appl. No. 14/263,802, filed Apr. 28, 2014.
U.S. Appl. No. 14/742,668, filed Jun. 17, 2015.
U.S. Appl. No. 14/263,838, filed Apr. 28, 2014.
U.S. Appl. No. 14/263,875, filed Apr. 28, 2014.
U.S. Appl. No. 14/263,899, filed Apr. 28, 2014.
U.S. Appl. No. 14/263,920, filed Apr. 28, 2014.
U.S. Appl. No. 14/535,249, filed Nov. 6, 2014.
U.S. Appl. No. 14/334,533, filed Jul. 17, 2014.
U.S. Appl. No. 14/334,550, filed Jul. 17, 2014.
U.S. Appl. No. 14/732,681, filed Jun. 6, 2015.
U.S. Appl. No. 14/334,567, filed Jul. 17, 2014.
U.S. Appl. No. 14/334,583, filed Jul. 17, 2014.
U.S. Appl. No. 14/334,598, filed Jul. 17, 2014.
U.S. Appl. No. 14/334,616, filed Jul. 17, 2014.
U.S. Appl. No. 14/448,849, filed Jul. 31, 2015.
U.S. Appl. No. 14/732,684, filed Jun. 6, 2015.
U.S. Appl. No. 14/467,872, filed Aug. 25, 2014.
U.S. Appl. No. 14/470,525, filed Aug. 27, 2014.
U.S. Appl. No. 14/470,753, filed Aug. 27, 2014.
U.S. Appl. No. 14/470,774, filed Aug. 27, 2014.
U.S. Appl. No. 14/732,683, filed Jun. 6, 2015.
U.S. Appl. No. 14/480,307, filed Sep. 8, 2014.
U.S. Appl. No. 14/848,195, filed Sep. 8, 2015.
U.S. Appl. No. 14/701,399, filed Apr. 30, 2015.
U.S. Appl. No. 14/701,410, filed Apr. 30, 2015.
U.S. Appl. No. 14/701,435, filed Apr. 30, 2015.
U.S. Appl. No. 14/701,439, filed Apr. 30, 2015.
U.S. Appl. No. 14/701,445, filed Apr. 30, 2015.
U.S. Appl. No. 14/701,450, filed Apr. 30, 2015.
U.S. Appl. No. 14/701,451, filed Apr. 30, 2015.
U.S. Appl. No. 14/518,689, filed Apr. 30, 2015.
Albea, "High Performance Control Design for Dynamic Voltage Scaling Devices", IEEE Transactions on Circuits and Systems, Part 1, Regular Papers 58, 12, Nov. 17, 2011, pp. 2919-2930.
Baran, Paul, "Packet Switching", Fundamentals of Digital Switching, 2nd Ed., 1990, pp. 193-235.
Brown, Rick, "Nest pulls Protect Smoke Detector from Retail on Safety Issue", CNET. Retrieved from the Internet: <www.cnet.com/news/nest-pulls-protect-smoke-detector-from-retail-on-safet>, accessed on Nov. 3, 2014, 3 pgs.
Carriazo-Osorio, Fernando, "Impacts of Air Pollution on Property Values: An Economic Valuation for Bogota, Columbia", Retrieved from the Internet: <http://www.demogr.mpg.de/papers/workshops/010518_paper02.pdf>, published on Aug. 19, 2007, 16 pgs.
"Chapter Five—Global Positioning System", Global Positioning System. Retreived from the Internet: <http://www.academia.edu/6330277/Chapter_5_Global_Positioning_System>, pp. 5.1-5.14.
Fadell, Tony. "Consumer Safety Notice for Nest Protect: Smoke + CO Alarm". Retrieved from the Internet: <Nest.com/letter-from-the-ceo>, published on Apr. 3, 2014, 3 pgs.
Dandamudi, Sivarama, "Interrupts", Fundamentals of Computer Organization and Design, Sep. 22, 2001, pp. 825-862.
Dijkman, Greg, "Scientific Gel and Blot Imaging: The difference between resolution and sensitivity with CCD cameras." Retrieved from the Internet: <gregdijkman.com/ccd-camera-imaging-sensitivity-resolution>, accessed on Nov. 5, 2014, 2 pgs.
"For $129, the best smoke detector on the marker", CNET. Retrieved from the Internet: <http://www.cnet.com/products/nest-protect>, accessed on Jul. 8, 2014, 4 pgs.
Frederiksen, Rikard, "The optical sensitivity of compound eyes: theory and experiment compared", Bio. Lett., vol. 4, No. 6, Dec. 23, 2008, pp. 745-747.
"Guidance Regarding Methods for De-identification of Protected Health Information in Accordance with the Health Insurance Portability Act (HIPPA) Privacy Rule", Department of Health and

(56) References Cited

OTHER PUBLICATIONS

Human Services. Retrieved from the Internet: <http://www.hhs.gov/ocr/privacy/hippa/understanding/coveredentities/De-identification/guidance.html>, accessed on Dec. 4, 2014, 18 pgs.
Hayashi, et al., "A Network-Centric approach to Sensor-data and Service Integration", SICE Annual Conference 2011, Sep. 13, 2011, pp. 2037-2042.
Huang, et al., "Pervasive, Secure Access to a Hierarchical Sensor-Based Healthcare Monitoring Architecture in Wireless Heterogeneous Networks", IEEE Journal on Selected Areas in Communication, vol. 27, No. 4, May 2009, pp. 400-411.
Mainwaring, "Wireless Sensor Networks for Habitat Monitoring", WNSA '02, Sep. 28, 2002, pp. 88-97.
McCracken, Harry, "Nest's Smoke Detector Recall; Doesn't Mean You Need to Send Yours Back", Retrieved from the Internet: <http://time.com/108171/nest-recall/>, published on May 21, 2014, 2 pgs.
Miyaho, et al. "Sensor Network Management for Healthcare applications", 2010 Fifth International Conference on Systems and Networks Communications, 2010, pp. 14-20.
Moffat, "Notes on Using Thermocouples". Retrieved from the Internet: <http://www.electronics-cooling.com/1197/01/notes-on-using-thermocouples/>, accessed on Nov. 6, 2014, pp. 1-9.
Mogg, Trevor, "Nest Recall 440,000 Protect Smoke alarms, Issues Software Update that fixes Glitch". Retrieved from the Internet: <http://www.digitaltrends.com/home/nest-halts-sales-of-nest-protect-smoke-alarm/>, published on May 21, 2014, 5 pgs.
"Nest Labs Recall to Repair Nest Protect Smoke +CO Alarms Due to Failure to Sound Alert". Retrieved from the Internet: <http://www.cpsc/gov/en/Recalls/2014/Nest-Labs-Recalls-to-Repair-Nest-protect-Smoke-CO-Alarms>, published on May 21, 2014, 3 pgs.

"Nest Protect", Manual, Oct. 2013, 2 pgs.
Noh, Sun-Kuh et al. "Design of a Room Monitoring System for Wireless Sensor Networks", Intl. Journal of Distributed Sensor Networks, vol. 2013, Article ID 189840, 2013, 7 pages.
"Optical Resolution ." Retrieved from the Internet: <en.wikipedia.org/wiki.Optical_resolution>, accessed on Nov. 5, 2014, 11 pgs.
"Privacy Protector:6 Good Reasons to De-Indentify Data". Retrieved from the Internet: <http://privacyguidance.com/blog/6-good-reasons-to-de-identify-data>, accessed on Dec. 8, 2014, 6 pgs.
"Resolution and Sensitivity". Retrieved from the Internet: <www.atnf.csiro.au/outreach/education/senior/astrophysics/resolution_sensitivity.html>, accessed on Nov. 5, 2014, 5 pgs.
Steenerson, Christopher E, "Education in Microscopy and Digital Imaging". Retrieved from the Internet: <zeiss-campus.magnets.fsu.edu/tutorials/basics/spatialfrequency/indexfalsh.html>, accessed on Nov. 5, 2014, 2 pgs.
"Symptom—Definition by Merriam-Webster", Retrieved from the Internet: <http://www.merriam-webster.com/medical/symptom/>, accessed on Dec. 4, 2014, 3 pgs.
"Tutorial on Spatial Frequency Analysis". Retrieved from the Internet: <www.psy.vanderbilt.edu/courses/hon185/SpatialFrequency/SpatialFrequency.html>, accessed on Nov. 5, 2014, 10 pgs.
"What is Nest Wave and how does it work?". Retrieved from the Internet: <support/nest.com/article/what-is-nest-wave-and-how-does-it-work>, accessed on Nov. 5, 2014, 3 pgs.
Yildiz, "Potential ambient Energy-Harvesting Sources and Techniques", The Journal of Technology Studies, vol. 35, No. 1. Fall 2009, pp. 1-14. Retrieved from the Internet: <http://scholarlib.vt.edu/ejournals/JOTS/v35Iv35n1/yidliz.html>, accessed on Jan. 27, 2015.
Supplementary European Search Report and European Search Opinion dated Jan. 3, 2018 re European Application No. 15840490.5.

\* cited by examiner

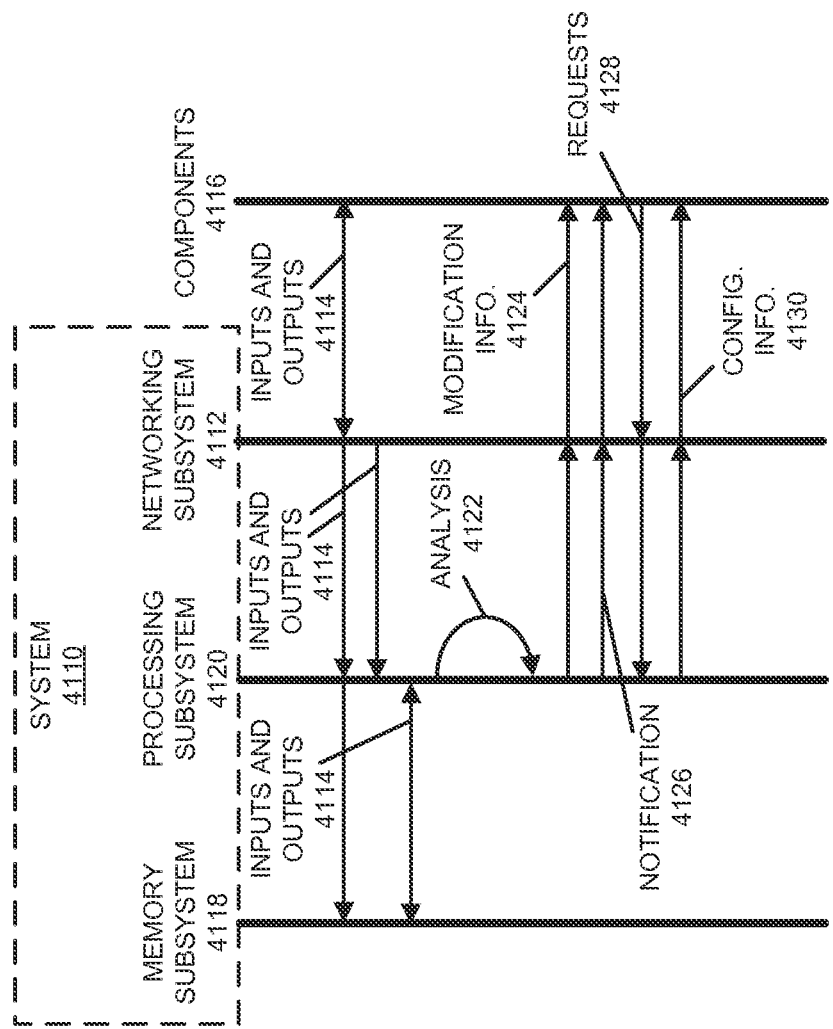

SENSOR-DATA SUB-CONTRACTING DURING ENVIRONMENTAL MONITORING

CROSS-REFERENCE TO RELATED APPLICATION

This application claims priority under 35 U.S.C. § 119(e) to U.S. Provisional Application Ser. No. 62/047,440, entitled "Systems and Methods for Transferring Data and Revenue," by Nina S. Joshi, Adam M. Gettings, Eddy Y. Chan, Andrew G. Stevens, Lucas D. Ivers and Bjorn H. Hovland, filed on Sep. 8, 2014, the contents of which are herein incorporated by reference.

This application is related to U.S. patent application Ser. No. 14/701,435, entitled "Alert-Driven Dynamic Sensor-Data Sub-Contracting," by Nina S. Joshi, Adam M. Gettings, Eddy Y. Chan, Andrew G. Stevens, Lucas D. Ivers and Bjorn H. Hovland, filed on Apr. 30, 2015, the contents of which is hereby incorporated by reference.

BACKGROUND

Field

The described embodiments relate generally to environmental monitoring of environments, and more specifically to techniques for sub-contracting for sensor data during the environmental monitoring based on a request for a service.

Related Art

Trends in connectivity and in portable electronic devices are resulting in dramatic changes in people's lives. For example, the Internet now allows individuals access to vast amounts of information, as well as the ability to identify and interact with individuals, organizations and companies around the world. This has resulted in a significant increase in online financial transactions (which are sometimes referred to as 'ecommerce'). Similarly, the increasingly powerful computing and communication capabilities of portable electronic device (such as smartphones and tablets), as well as a large and growing set of applications, are accelerating these changes, providing individuals access to information at arbitrary locations and the ability to leverage this information to perform a wide variety of tasks.

Recently, it has been proposed these capabilities be included in other electronic devices that are located throughout our environments, including those that people interact with infrequently. In the so-called 'Internet of things,' it has been proposed that future versions of these so-called 'background' electronic devices be outfitted with more powerful computing capabilities and networking subsystems to facilitate wired or wireless communication. For example, the background electronic devices may include: a cellular network interface (LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface (such as a near-field-communication interface). These capabilities may allow the background electronic devices to be integrated into information networks, thereby further transforming people's lives.

However, the overwhelming majority of the existing background electronic devices in people's homes, offices and vehicles have neither enhanced computing capabilities (such as a processor that can execute a wide variety of applications) nor networking subsystems. Given the economics of many market segments (such as the consumer market segment), these so-called 'legacy' background electronic devices (which are sometimes referred to as 'legacy electronic devices') are unlikely to be rapidly replaced.

These barriers to entry and change are obstacles to widely implementing the Internet of things. For example, in the absence of enhanced computing capabilities and/or networking subsystems it may be difficult to communicate with the legacy electronic devices. Furthermore, even when electronic devices include enhanced computing capabilities and/or networking subsystems, it may be difficult to communicate with electronic devices that use different communication protocols. These challenges may make it difficult to perform basic tasks such as identifying particular electronic devices and exchanging data, and thus may limit the applications and tasks that can be performed.

SUMMARY

The described embodiments relate to a system. This system includes: an interface mechanism that communicates with electronic devices; and a control mechanism (such as a processor or control logic) coupled to the interface mechanism. The control mechanism: receives, via the interface mechanism, a service request for a service associated with an environment from an electronic device (such as a computer or a cellular telephone) of an entity; and identifies an environmental monitoring device within the environment in response to the service request, where the environmental monitoring device provides sensor data that represents an environmental condition in the environment, and the environmental monitoring device is associated with a second entity that is different from the entity and a third entity associated with the system. Moreover, the control mechanism: provides, via the interface mechanism, a data request for the sensor data to the environmental monitoring device; receives, via the interface mechanism, the sensor data from the environmental monitoring device in response to the data request; and provides the service to the entity based on the environmental condition.

Note that the service request may include compensation (or information that specifies the compensation) to the third entity for the service.

Moreover, the service may be associated with a type of the sensor data, and the environmental monitoring device may be identified based on the type of the sensor data.

Furthermore, the control mechanism may analyze the sensor data, and the service may be provided based on the analyzed sensor data.

Additionally, the second entity includes a service provider, and the data request may include compensation (or information specifying the compensation) to the second entity for the sensor data. Alternatively, the second entity may include a partner of the third entity, and the sensor data may be received without compensation to the second entity for the sensor data.

In some embodiments, the control mechanism provides an instruction to a regulator device in the environment to modify the environmental condition, where the regulator device is associated with: the second entity and/or a fourth entity that is different from the entity, the second entity and the third entity. Moreover, the instruction may include compensation (or information specifying the compensation) for modifying the environmental condition. For example, the compensation may be for: modifying the environmental condition on a per-event basis; and/or modifying the environmental condition during at least a time interval.

Furthermore, the service may be provided on a one-time basis. Alternatively or additionally, the service may be selectively provided as a function of time based on the environmental condition.

Note that performing the service may involve: downloading software for the environmental monitoring device that, when executed by the environmental monitoring device, performs the service; and/or remotely enabling a software module in the environmental monitoring device that, when executed by the environmental monitoring device, performs the service.

Additionally, the service may include insurance for: an item in the environment, a portion of the environment, and/or the environment.

In some embodiments, the control mechanism includes: a processor coupled to the interface mechanism; and memory, coupled to the processor, which stores a program module that is executed by the processor. The program module may include instructions for at least some of the operations performed by the system.

Another embodiment provides a computer-program product for use in conjunction with the system. This computer-program product may include instructions for at least some of the aforementioned operations performed by the system.

Another embodiment provides a method for providing the service. During operation, the system receives, via the interface mechanism in the system, the service request for the service associated with the environment from the electronic device of the entity. Then, the system identifies the environmental monitoring device within the environment in response to the service request, where the environmental monitoring device provides the sensor data that represents the environmental condition in the environment, and the environmental monitoring device is associated with the second entity that is different from the entity and the third entity associated with the system. Moreover, the system provides, via the interface mechanism, the data request for the sensor data to the environmental monitoring device. Next, the system receives, via the interface mechanism, the sensor data from the environmental monitoring device in response to the data request. Furthermore, the system provides the service to the entity based on the environmental condition.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 41 is a drawing illustrating communication among components in an ecosystem during the method of FIG. 40 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
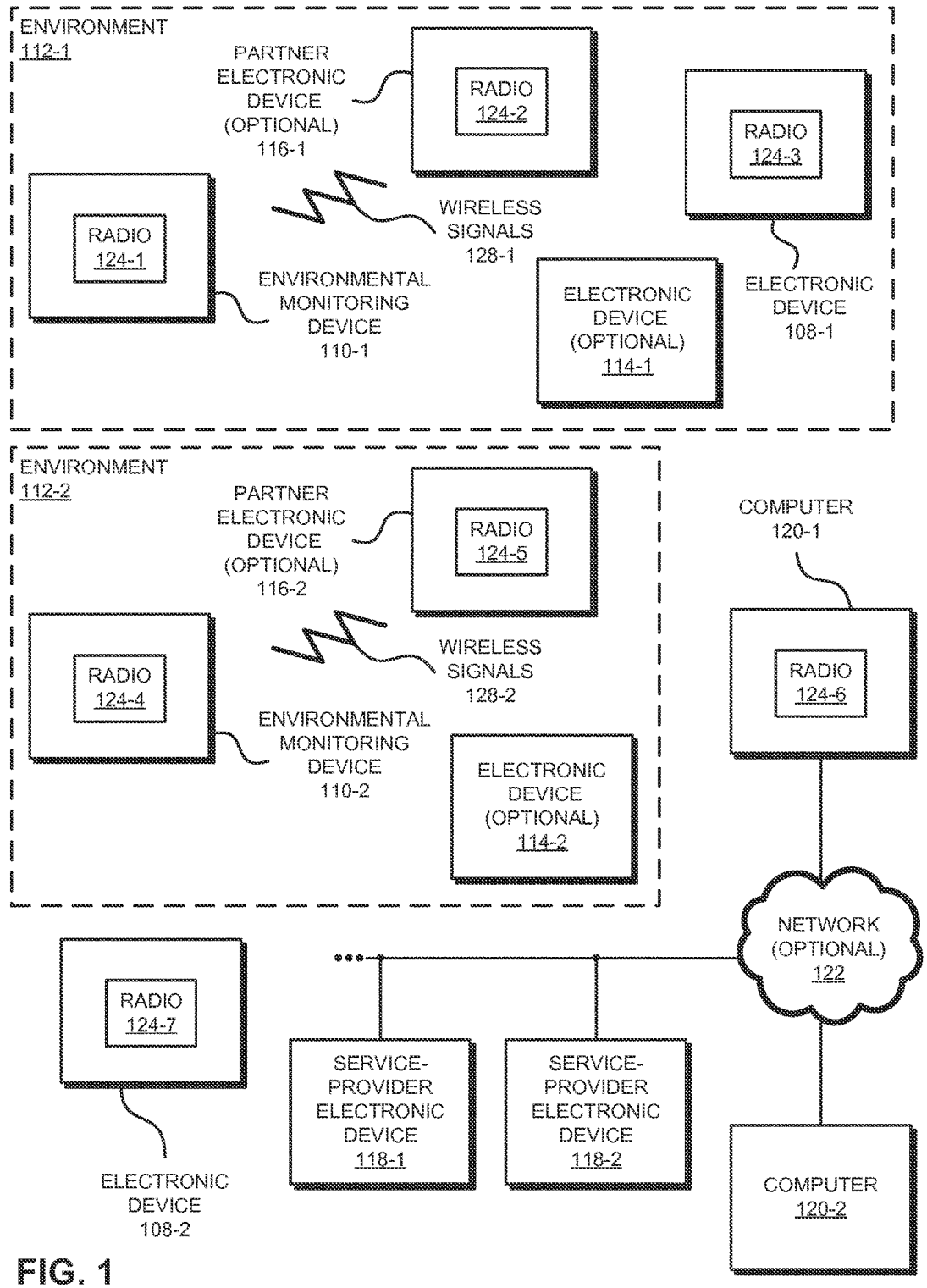
FIG. 1 is a block diagram illustrating electronic devices communicating in an ecosystem in accordance with an embodiment of the present disclosure.

In some embodiments, an interface mechanism in a system receives, from an electronic device of an entity, a service request for a service associated with an environment. In response to the service request, a control mechanism in the system identifies an environmental monitoring device within the environment, where the environmental monitoring device provides sensor data that represents an environmental condition in the environment, and the environmental monitoring device is associated with a second entity that is different from the entity and a third entity associated with the system. Moreover, the control mechanism provides, via the interface mechanism, a data request for the sensor data to the environmental monitoring device. Furthermore, in response to the data request, the interface mechanism receives the sensor data from the environmental monitoring device. Then, the control mechanism provides the service to the entity based on the environmental condition. For example, the service may include: communicating an instruction to a regulator device in the environment to modify the environmental condition, providing insurance, etc.

In this way, the system may dynamically subcontract with one or more different second entities for the sensor data needed to selectively provide a requested service to the entity. This flexibility and adaptability may allow the system to access sensor data, as needed, based on customer needs. Consequently, the system may improve the service (e.g., the service may be more cost effective for the entity), which may increase customer satisfaction with the environmental monitoring device and/or the system, and/or the monitored environment.

Communication between devices in the system (which is sometimes referred to as an 'ecosystem'), such as environmental monitoring devices, electronic devices of users or entities, partner electronic devices and/or service-provider electronic devices, may utilize wired, optical and/or wireless communication. In particular, the communication may involve communicating packets or frames that are transmitted and received by radios in the devices in accordance with a communication protocol, such as: Bluetooth™ (from the Bluetooth Special Interests Group of Kirkland, Wash.), an Institute of Electrical and Electronics Engineers (IEEE) 802.15 standard (such as ZigBee® from the ZigBee® Alliance of San Ramon, Calif.), an Institute of Electrical and Electronics Engineers (IEEE) 802.11 standard, Z-Wave, a power-line communication (PLC) standard, an infra-red communication standard, a universal serial bus (USB) communication standard, a near-field-communication standard or specification (from the NFC Forum of Wakefield, Mass.), another wireless ad-hoc network standard, and/or another type of wireless interface. In some embodiments, the communication protocol may be compatible with a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. For example, the communication protocol may include Long Term Evolution or LTE. In the discussion that follows, ZigBee® is used as an illustrative example. In addition, the communication may occur via a wide variety of frequency bands, including frequencies associated with the so-called 'white space' in frequencies bands associated with analog television broadcasting. In some embodiments, the communication is unidirectional, while in other embodiments the communication is bidirectional.

The communication between the devices is shown in FIG. 1, which presents a block diagram illustrating communication among electronic devices 108 (such as a cellular telephone or a portable electronic device of a user or an entity), environmental monitoring devices 110, optional electronic devices 114 (such as regulator devices e.g., electronic device 114-2, legacy electronic devices, e.g., electronic device 114-1), optional partner electronic devices 116, service-provider electronic devices 118 and computers 120 (which collectively are sometimes referred to as 'components') using wireless signals and communication via network 122 (such as the Internet, a wireless local area network, an Ethernet network, an intra-net, an optical network, etc.). As described further below with reference to FIGS. 26-41, environmental monitoring devices 110, partner electronic devices 116 and/or service-provider electronic devices 118 may monitor environmental conditions (or environmental states) in one or more environments 112 that include or are associated with environmental monitoring devices 110, electronic devices 114, partner electronic devices 116 and/or service-provider electronic devices 118. For example, environments 112 may include: a portion of a building (e.g., an apartment, a hotel room, an office suite, a storage unit, etc.), the building, a region proximate to or adjacent to a building, an outdoor space or region, a container (such as a box, a package or a shipping container), a vehicle (such as a car, a truck or a boat), a liquid, and/or a train car. (Note that one or more of environmental monitoring devices 110, electronic devices 114, partner electronic devices 116 and/or service-provider electronic devices 118 may be immersed in a liquid, and environments 112 may be at fixed locations or time-varying locations.) Moreover, at least some of environmental monitoring devices 110, partner electronic devices 116 and/or service-provider electronic devices 118 may include sensors that provide sensor data that reflects the environmental conditions in the one or more environments 112. (In the discussion that follows, note that 'sensor data' may include: information or measurements collected by one or more devices, such as one or more of the sensors. Sensor data can be a dependent variable as a function of one or more independent variables, for example time and/or space. Moreover, sensor data can be collected continuously or at discrete intervals. Furthermore, sensor data can refer to information collected by a single sensor or a compilation of data collected by two or more sensors. In some embodiments, sensor data refers to a raw measurement collected by a sensor, while in other embodiments sensor data refers to a measurement that has been processed in some way, such as transformed from one form to another.)

In addition, partner electronic devices 116 may include sensors and/or program modules on behalf of a provider of a system (who may also provide at least some of environmental monitoring devices 110). This system may facilitate dynamic aggregation of sensor data and the dynamic configuration of combinations of the components in the system (such as a non-homogenous group of components) in the system to providing services in environments 112. (Note that at least one of computers 120 may be operated by or on behalf of the provider of the system.) In general, the sensor data may be provided without or excluding direct interaction (such as wireless communication and/or electrical coupling) between environmental monitoring devices 110 and electronic devices 114. Thus, sensors in environmental monitoring devices 110 may indirectly infer information about the operation and/or the performance of electronic devices 114 based on the monitored environmental conditions. However, in some embodiments at least some of environmental monitoring devices 110, partner electronic devices 116 and/or service-provider electronic devices 118 interact directly with at least some of electronic devices 114 (via wireless communication or electrical coupling), thereby facilitating direct measurement of the sensor data, as well as feedback control of these electronic devices by at least some of environmental monitoring devices 110. In some embodiments, one or more of environmental monitoring devices 110, partner electronic devices 116 and/or service-provider electronic devices 118 is integrated into one or more other electronic device, such as one or more of electronic devices 114.

The sensor data may be analyzed locally by at least one of environmental monitoring devices 110 and/or remotely by service-provider electronic devices 118 and computers 120 (some of which may be associated with the provider of the system and/or one or more partners of the provider of the system). Moreover, the sensor data and/or the analyzed sensor data may be communicated among environmental monitoring devices 110, partner electronic devices 116, service-provider electronic devices 118 and computers 120. In particular, environmental monitoring devices 110 and/or partner electronic devices 116 may form a ZigBee® mesh network, with ZigBee® end devices communicating with a ZigBee® coordinator (such as environmental monitoring device 110-1) via one or more optional ZigBee® routers. (Thus, at least some of environmental monitoring devices 110, partner electronic devices 116 and/or service-provider electronic devices 118 may function as sensor-data hubs for other environmental monitoring devices 110.) Then, environmental monitoring device 110-1, partner electronic devices 116 and/or service-provider electronic devices 118 may communicate (wirelessly and/or via computers 120 and network 122) the sensor data and/or the analyzed sensor data to other components in the system (such as one of electronic devices 108), as well as with remote servers or computers not shown in FIG. 1. Note that, while ZigBee® is used as an illustrative example, in other embodiments different communication protocols are used.

In addition to the sensor data and/or the analyzed sensor data, other inputs and outputs from the components in the system may be communicated in FIG. 1. In particular, compensation (or information specifying compensation, which in the following discussion may include: an electronic payment, credit-card or debit-card information, a bank-account number, the compensation amount in a particular currency, a promise of future goods or services, a bartered good or service, a rebate and/or a service value token) for sensor data and/or services may be communicated among the components. Thus, one of environmental monitoring devices 110 may advertise the availability of sensor data associated with one of environments 112 via the system and, in response to a request for the sensor data, may sell the sensor data to another component in the system. In this way, the system may allow the components to subcontract for sensor data and, more general, the system may provide a sensor-data and sensor-data-based services marketplace. The system may also allow the components to provide sub-services to each other in the context of a broader service being provided by at least some of the components. In general, the inputs and the outputs from the components in FIG. 1 may include: sensor data, analyzed sensor data, services, sub-services (which are associated with one or more of the services), compensation (for the sensor data, the analyzed sensor data, the services and/or the sub-services), and information (such as alerts associated with occurrences of environmental conditions in environments 112).

The input and outputs from the components that are communicated in FIG. 1 may be protected. For example, the sensor data (and, more generally, any of the inputs and outputs) may be encrypted, digitally signed and/or securely hashed (such as using a one-way cryptographic hash function) by environmental monitoring devices 110, partner electronic devices 116 and/or service-provider electronic devices 118. Furthermore, one or more of computers 120 (such as those that are associated with the provider of the system), which function as archive devices, may store the inputs and the outputs (or information specifying the inputs and the outputs, such as pointers to locations in one or more of the components where a particular input or output is stored). In some embodiments, at least some of this information is stored in secure, certified historical records or logs, such as records of the environmental conditions in environments 112. In principle, the information stored by the one or more of computers 120 may be protected. However, in some embodiments, users of environmental monitoring devices 110 or entities associated with environmental monitoring devices 110, who, in general, control how their data is used and shared, instruct environmental monitoring devices 110 to provide, via the mesh network, information to the one or more of computers 120 that allows the one or more of computers 120 to unprotect the stored inputs and outputs. (Alternatively or additionally, the users or the entities may provide such authorization to the one or more of computers 120 using one or more of electronic devices 108.) Similarly, in response to requests from authorized recipients (e.g., from one of service-provider electronic devices 118) for inputs and outputs, such as the sensor data and/or the analyzed sensor data, the one or more of computers 120 may provide access to the stored sensor data and/or the analyzed sensor data. If the sensor data and/or the analyzed sensor data is protected, the associated ones of environmental monitoring devices 110, partner electronic devices 116 and/or service-provider electronic devices 118 may provide protection information to the one or more of computers 120 that allows the one or more of computers 120 to unprotect the sensor data and/or the analyzed sensor data.

Note that the components in FIG. 1 may be associated with a variety of entities, including: individuals, organizations, for-profit companies, non-profit companies, and/or governmental agencies. In particular, the entities associated with at least some of environmental monitoring devices 110 may include users or owners of environmental monitoring devices 110 (which are henceforth referred to as 'user entities'). Alternatively or additionally, the user entities may also be associated with environments 112, such as: a tenant of an apartment or a building (which may be encompassed within one of environments 112), a hotel guest, a property owner (such as a landlord) of an apartment or a building, maintenance personnel that help maintain one or more of environments 112, and/or a property manager of one or more of environments 112. In some embodiments, at least some of environmental monitoring devices 110 are owned by different entities than the entities associated with environments 112 (which are henceforth referred to as 'third-party owner entities'). In these embodiments, a user entity may rent one or more of environmental monitoring devices 110 from the third-party owner entities and/or may pay for a service facilitated by the one or more of environmental monitoring devices 110. As noted previously, at least some of environmental monitoring devices 110 may be provided by or fabricated by the provider of the system, and at least some of computers 120 may be operated by or on behalf of the provider of the system.

Moreover, some of electronic devices 114 (such as electronic device 114-2, which may be a regulator device) may be associated with one or more so-called 'regulator entities,' such as one that provides a regulation service in which an environmental condition in one of environments 112 is modified or changed. Partner electronic devices 116 may be associated with 'partner entities' that are partners of the provider of the system. A partner electronic device may provide sensor data, analyzed sensor data, sub-services and/or services to other components in FIG. 1 that are associated with the provider of the system based on a pre-defined business relationship or agreement with the provider of the system (and, thus, may not need to be directly compensated via outputs from the recipient components or other components that manage services in FIG. 1). Alternatively or additionally, at least some of partner electronic devices 116 may include modules and/or sensors on behalf of the provider of the system, which may allow these partner electronic devices to monitor and provide sensor data and/or analyzed sensor data to other components in the system.

Furthermore, service-provider electronic devices 118 may be associated with service providers. In contrast with partner entities, service providers may provide sensor data, analyzed sensor data, sub-services, goods and/or services to other components in FIG. 1 in exchange for compensation, which may be directly communicated via outputs from the recipient component or other components that manages services in FIG. 1. For example, the service providers may include: a maintenance service (which can repair or clean at least a portion of one or more of environments 112), an installation service (which can install equipment in one or more of environments 112), a retail service (which can provide or deliver a product to one or more of environments 112, such as suppliers of components or spare parts), an insurance carrier, a utility (which may customize services, insurance coverage or billing based on a user's utility usage pattern), and/or an emergency-monitoring service (which can provide an alert about one or more of environments 112 or can contact emergency services or a 911 dispatcher to send the police, ambulance and/or fire department to one or more of environments 112). In some embodiments, the service providers include insurance companies or insurance brokers that can provide insurance for: items in one or more of environments 112, a portion of one or more of environments 112, and/or one or more of environments 112.

Note that the entities associated with different components in FIG. 1 may be different from each other. However, in some embodiments at least some of the entities associated with different components in FIG. 1 are the same (thus, the provider of the system may also provide at least some of environmental monitoring devices 110). Moreover, in general, environmental monitoring devices 110, partner electronic devices 116 and/or service-provider electronic devices 118 may: provide sensor data, refine or analyze sensor data (which may be acquired by the same electronic device or may, at least in part, be received from another component in the system), and/or provide services or sub-services in the services. Thus, the roles of the electronic devices associated with the different entities in the system of FIG. 1 may, at least for some of the components, overlap each other.

Components in FIG. 1 may allow a variety of services to be offered to the user entities, to the service providers and/or third parties (such as realtors, leasing agents, businesses, organizations, governments or governmental agencies, potential buyers of physical objects, a shipping or transportation company, etc.). As described below with reference to FIGS. 26 and 27, one of environmental monitoring devices 110 (such as environmental monitoring device 110-1) may provide a service in response to an alert. In particular, if, based on sensor data provided by a sensor mechanism in environmental monitoring device 110-1, environmental monitoring device 110-1 determines the alert (such as an alert associated with the occurrence of an environmental condition in and/or associated with environment 112-1 that includes environmental monitoring device 110-1), environmental monitoring device 110-1 may provide a service offer to one of electronic devices 108 that is associated with a user entity. This service offer may include information associated with the environmental condition. For example, the service offer may indicate that there is an alert available for environment 112-1. Then, if environmental monitoring device 110-1 receives a response that authorizes the service, environmental monitoring device 110-1 may perform the service.

Note that the service may include providing the alert, such as via one of electronic devices 108 (e.g., on a display, using speakers and, more generally, on a physiological output device that provides sensory information). Thus, a user entity may be alerted if a legacy electronic device in an environment is not functioning properly. For example, environmental monitoring device 110-1 may include one or more sensors that monitor the environmental condition in environment 112-1 (such as an acoustic signal from a legacy electronic device, e.g., a fire or carbon-monoxide detector, which indicates a failing battery). More generally, the service may provide feedback that indicates the presence of an environmental condition in environment 112-1, such as: the presence of an allergen, the presence of mold, excess moisture or humidity, flooding in a room or building, the presence of radon, a chemical contaminant, poor air quality, cleanliness of a room (e.g., a hotel room), a chemical contaminant, an infestation (e.g., bed bugs, insects or rodents), a pluming problem (e.g., low water pressure or the acoustic signature of an impending pipe failure), a radiator problem, high winds (e.g., an approaching hurricane or a tornado), flooding or a flood warning for a region external to the external environment, extreme weather (e.g., very low temperatures or a blizzard), a power outage (or conditions that may result in a power outage), fire, etc. In some embodiments, determining the alert involves comparing a measured sensor value to a threshold or target value of the environmental condition and/or computing a derived value of a parameter that is a function of the sensor value, such as a statistical or probabilistic analysis of how likely an alarm output by a legacy electronic device is likely to be associated with an occurrence of an environmental condition, e.g., a fire, based on historical alarm occurrence data for one or more of electronic devices 114 in one or more of environments 112).

Alternatively or additionally, the service may include regulating or maintaining the environmental condition in environment 112-1 by providing an instruction to a regulator device in environment 112-1. For example, the regulator device may maintain the environmental condition in environment 112-1 (such as temperature, humidity, an illumination pattern, etc.) based on a medical condition of an individual (such as an allergy, a chemical sensitivity, a light sensitivity or an illumination preference, an illness, a chronic disease, etc.). In particular, the instruction may modify an operating condition of a regulator device (such as electronic device 114-2, e.g., a thermostat, a heater, an air conditioner, a humidifier, an air purifier or an air filter, a ventilator device or a fan, a window opener, a door opener, etc.) that regulates the environmental condition. The modified operating condition may be based on a comparison of the sensor data and a target value of the environmental condition in environment 112-1 (which may be determined based on the medical condition). Moreover, the modified operation condition may include a control signal for the regulator device. Note that the medical condition of an individual can include a psychological comforting effect (e.g., warming up a room before the user enters it), or even a placebo effect in which the environmental factor has no known benefits (and may even have drawbacks or random effects) according to scientific studies, but by making a user more comfortable, the modified environmental factor(s) provides psychological comfort to the user (which can be categorized as a form of placebo effect).

Instead of providing the instruction, in some embodiments environmental monitoring device 110-1 is electrically coupled to the regulator device. Then, environmental monitoring device 110-1 may control operation of the regulator device by selectively electrically coupling power signal(s) to the regulator device. For example, environmental monitoring device 110-1 may include a switch, such as an electrically operated switch or relay, or an electromechanical component that can interrupt a circuit and/or divert current from the regulator device. The switch may be single pole or multiple pole, and may (or may not) be make before break. Thus, the switch may selectively switch between a closed state and an open state. Note that electrical-connection between these components may include: a light socket, a rotatable connector configured to electrically couple to a light socket, an AC power plug, an AC power socket, a multi-wire electrical terminal, a DC power plug, a DC power socket, and/or a USB-compatible connector. In some embodiments, electrical-connection nodes between these components includes: male connectors, female connectors and/or wires.

For example, the modified operating condition may be based on a user preference, e.g., lowering the temperature of a bedroom before bedtime, as desired lighting conditions at a particular time of day, etc. In particular, the user preference may specify a threshold value for the environmental condition (such as a maximum temperature of 80 F or a minimum temperature of 65 F, a maximum humidity of 80% or a minimum humidity of 30%, a maximum or a minimum concentration of a chemical or an allergen in the external environment, etc.) and, during the service, one of environmental monitoring devices 110 may directly (via a switch) or indirectly (by providing information or an instruction) electrically couple or decouple the regulator device from a power source based on the threshold value. In this way, the regulator device may be selectively activated. Note that, while preceding discussion illustrated selective activation based on a static or fixed user preference, more generally, the user preference may evolve or change as a function of time or as a function of the environmental condition, which may allow one or more of environmental monitoring devices 110 to dynamically respond to or control the environmental condition.

Furthermore, the service may include providing a maintenance notification based on the analyzed sensor data, which is associated with the operation of one of electronic devices 114 (such as a legacy electronic device or an electronic device that is included in a feedback loop with one of environmental monitoring devices 110), and which represents an environmental condition in one of environments 112. For example, the maintenance notification may include an instruction to: change a filter, perform maintenance, replace a battery, order a replacement component, etc. Based on the environmental condition, environmental monitoring device 110-1 may provide a maintenance notification to a user entity's cellular telephone (e.g., one of electronic devices 108) to replace the battery or to perform another remedial action (such as a repair or service to be performed on one of electronic devices 114). Alternatively or additionally, the maintenance notification may be provided to one of service-provider electronic devices 118, who, at least in part, may perform the maintenance or the remedial action. Note that the maintenance notification and any subsequent remedial action (such as a repair or service performed on one of electronic devices 114) may be stored in a historical record or log for environment 112-1 (such as a historical record maintained by one or more of computers 120).

Thus, whether the user entity owns environmental monitoring device 110-1 or not, they may be provided the service offer for the service (possibly for a fee) when the alert is determined or detected (such as based on an alarm sounded by a legacy electronic device) by environmental monitoring device 110-1. In some embodiments, in order to perform the service, environmental monitoring device 110-1: downloads software (such as a software module or an application from one of computers 120) that, when executed by environmental monitoring device 110-1, performs the service; and/or enables a software module that, when executed by environmental monitoring device 110-1, performs the service.

Components in the system may also selectively communicate the sensor data and/or the analyzed sensor data to another component based on data privileges of different entities. As described below with reference to FIGS. 28 and 29, one of environmental monitoring devices 110 (such as environmental monitoring device 110-1) may generate and then provide different subsets of the sensor data (and/or the analyzed sensor data) based on different data privileges of different entities. For example, different sensor data may be provided to a tenant and their landlord. This may protect the tenant's privacy, while allowing the landlord to monitor their property for problems, such as: fire, flooding, mold, infestation, loud noise, etc. Moreover, environmental monitoring device 110-1 may use the system (such as one or more of computers 120) to post data-availability information specifying available sensor data for environment 112-1 (e.g., environmental monitoring device 110-1 may use the system as a sensor-data marketplace). Then, environmental monitoring device 110-1 may receive requests for at least some of the sensor data from one or more of electronic devices 108, other environmental monitoring devices, partner electronic devices 116 and/or service-provider electronic devices 118. These requests may explicitly include the data privileges of the different entities, or may implicitly specify the data privileges (e.g., based on the type of data requested or based on the requestor if the request comes from an entity other than the user entity or user entities of environmental monitoring device 110-1). In response, environmental monitoring device 110-1 may generate and provide the different subsets of the sensor data. In some embodiments, a user entity defines or specifies the data privileges, so that a security-monitoring company has access to a subset of the sensor data, while an insurance company does not have access to the subset of the sensor data.

Note that the data privileges may vary as a function of: time, and/or the environmental condition. For example, a landlord may have access to more sensor data at times of day when a tenant is not at home or when there is a fire or a potential emergency (and, more generally, an occurrence of the environmental condition). Moreover, the data privileges may specify: different spatial extents in environment 112-1 monitored by environmental monitoring device 110-1 (e.g., the landlord may only have access to sensor data acquired within a region that is proximate to environmental monitoring device 110-1, such as within 10 ft, in the kitchen or near the furnace, while the tenant may have access to sensor data acquired throughout environment 112-1, such as a house the tenant rents); and/or different types of information associated with environment 112-1 (e.g., the landlord may have access to sensor data associated operation of utilities, heat, air conditioning, and other services, as well as sensor data associated with emergencies, such as life-threatening events or events that could damage environment 112-1, while the tenant may have access to a broader variety of sensor data, such as sensor data the represents temperature, humidity, allergens, lighting conditions, monitoring of a child, etc.).

The system may also allow subcontracting for sensor data that enables a service. As described below with reference to FIGS. 30 and 31, one of computers 120 (such as computer 120-1) may receive a request for a service associated with one of environments 112 (such as environment 112-1) and, in response, may subcontract for the sensor data that enables the service. In particular, computer 120-1 may identify one of environmental monitoring devices 110 (such as environmental monitoring device 110-1) based on the requested service, a type of sensor data and/or analyzed sensor data. For example, if the requested service involves regulating concentrations of an allergen or a chemical in environment 112-1, computer 120-1 may access stored information about the capabilities of environmental monitoring devices 110, partner electronic devices 116, and/or service-provider electronic devices 118 in environment 112-1, and based on these capabilities may identify one or more components that include sensor mechanisms capable of measuring the allergen or the chemical. Alternatively, if the service includes insurance on an item in environment 112-1, computer 120-1 may determine or may access predetermined risk mechanisms that can adversely impact the item (and, thus, which can degrade its value), including the environment at or near the location where the item is stored. Based on the risk mechanisms, computer 120-1 may determine types of sensor data and/or analyzed sensor data that can provide feedback about the occurrence of different risk mechanisms. Then, computer 120-1 may access the stored information about the capabilities of one or more components in the system to match these capabilities with the necessary sensory and/or computational capabilities in environment 112-1 for determining the risk mechanisms.

Next, computer 120-1 may provide a data request(s) for the sensor data and/or the analyzed sensor data to the identified environmental monitoring devices, partner electronic devices and/or service-provider electronic devices in environment 112-1. In response to the data request(s), computer 120-1 may receive (either once, during a time interval, such as a week, a month, six months, etc., or on an ongoing basis) the requested sensor data and/or the analyzed sensor data from one or more of these components, and computer 120-1 may provide (possibly in conjunction with one or more additional components in the system) the requested service (such as one of the services described previously). In some embodiments, if the necessary sensor data and/or analyzed sensor data is unavailable in environment 120-1, computer 120-1 provides instructions to one or more of the identified environmental monitoring devices, partner electronic devices and/or service-provider electronic devices in environment 112-1 to download software (or an application) and/or to activate a previously installed program module, so that these components can provide the necessary sensor data and/or the analyzed sensor data that is used to provide the service.

Alternatively, as described below with reference to FIGS. 32 and 33, in a variation on the preceding example, the system may subcontract for sensor data and/or analyzed sensor data that enable the service in response to an alert associated with environment 112-1 (as opposed to in response to a request for the service). In these embodiments, after identifying the one or more environmental monitoring devices, partner electronic devices and/or service-provider electronic devices that can provide the necessary sensor data and/or the analyzed sensor data, computer 120-1 may provide a service offer to the user entity associated with environment 112-1. This service offer may include information associated with the environmental condition. For example, the service offer may indicate that the humidity or the temperature in environment 112-1 is excessive, and may offer to regulate or modify the humidity or the temperature (such as by instructing or selectively turning on a regulator device). If the user entity authorizes the service, computer 120-1 may provide the data request and, after receiving the requested sensor data and/or the analyzed sensor data, may provide the service.

Moreover, components in the system may be used to dynamically provide a service (such as insurance). As described below with reference to FIGS. 34 and 35, one of computers 120 (such as computer 120-1) may receive sensor data from environmental monitoring devices 110, partner electronic devices 116 and/or service-provider electronic devices 118 in environments 112, which may include current and/or historical sensor data representing the environmental conditions in environments 112. This sensor data may be analyzed to determine the probability of the environmental condition (such as flooding or a fire) occurring during a time interval (such as a day, a week, a month, a year, etc.) in at least one of the environments (such as environment 112-1). In particular, the probability may be determined from the ratio of the number of occurrences during a first time interval (such as a week or a month) in environments 112 and the total number of possible occurrences (such as the number of environments 112), divided by the number of environments, and times a ratio of a second time interval (such as a month or a year) and the first time interval.

Moreover, computer 120-1 may calculate the price-duration range of the insurance associated with the environmental condition (such as insurance for flood damage, fire damage, theft, etc.) in environment 112-1 necessary for profitability of the insurance (on a statistical or an absolute basis) based on the determined probability and the estimated cost associated with the insurance. For example, given fixed and variable costs associated with a type of insurance in environment 112-1 (such as property insurance) and the probability (i.e., the likelihood of having to pay a claim), computer 120-1 may calculate a range of prices (or premiums) and durations of the insurance necessary for profitability of the insurance (at least on a statistical basis, such as a 50, 75, 90, 95 or 99% confidence of profitability, where the confidence percentage may be based on a size of a population of user entities that have or contract for the insurance). Thus, a lower (or higher) price may be associated with a shorter (or longer) duration, and a higher (or lower) price may be associated with a lower (or higher) probability. Alternatively or additionally, computer 120-1 may assess the impact of one or more environmental factors (and, more generally, the environmental condition) on the quality and/or value of a physical object associated with environment 112-1. For example, computer 120-1 may determine a risk metric for the physical object by comparing the sensor data in different environments 112. This risk metric may be used to calculate a financial value, such as a commercial value of the physical object. Then, based on a minimum acceptable commercial value of the physical object and the probability, the price-duration range may be determined so that the insurance compensates an owner of the physical object if the commercial value drops below the minimum acceptable commercial value. In some embodiments, the sensor data is used to assess the safety of one or more high-value items, e.g., artwork, antiques, wine, rare instruments, and other items that can be sensitive to light, heat, humidity and, more generally, environmental conditions. Based on sensor data for ultraviolet exposure, temperature, and/or humidity in a storage area for the one or more high-value items, the probability and the price-duration range can be calculated.

Next, computer 120-1 may provide a service offer (with at least a price or an insurance premium and a duration) for the insurance to one of electronic devices 108 associated with a user entity (such as electronic device 108-1). Alternatively, the service offer may include multiple pairs of prices and durations based on the calculated price-duration range, which may allow the user entity to select, a la carte, the desired service. (Thus, the service offer may oblige the user entity to continue the insurance for the duration, e.g., the user entity may have to pay the price in advance or there may be a penalty for early cancellation of the insurance.) Note that the insurance may cover: an item in one of environments 112, a portion of one of environments 112, an individual inhabiting or who is in one of environments 112, and/or one of environments 112.

If computer 120-1 subsequently receives a response from electronic device 108-1 authorizing the insurance (and, more generally, the service) at a particular price and/or duration, computer 120-1 may subsequently (directly or indirectly, such as in conjunction with a service provider) provide the insurance. For example, the response may be received from electronic device 108-1 with or without action by the user entity (e.g., in some embodiments an application executing on electronic device 108-1 dynamically authorizes the insurance on behalf of the user, such as when there is a high risk of fire or flooding, or when environment 112-1 is included in a Federal disaster area). Note that the insurance may be based on subsequent sensor data received from environmental monitoring devices 110, partner electronic devices 116 and/or service-provider electronic devices 118 in environments 112 (or, at least, in environment 112-1). In particular, the insurance may be selectively provided based on one or more occurrences of the environmental condition (e.g., when there is a risk of flooding, fire damage, high or low temperatures, high or low humidity, etc.). Therefore, the duration may include or may encompass one or more occurrences of the environmental condition. In addition, the subsequent sensor data received from environmental monitoring devices 110, partner electronic devices 116, and/or service-provider electronic devices 118 in environments 112 may be used by computer 120-1 to dynamically update the calculated probability and/or the price-duration range, which may allow computer 120-1 to modify the insurance (such as to change the price, the duration, a deductible, etc.).

In some embodiments, computer 120-1 provides a data request for additional sensor data to environmental monitoring devices 110, partner electronic devices 116, and/or service-provider electronic devices 118 in environments 112 (or, at least, environment 112-1), and the insurance (and, more generally, the service) is provided based on the additional sensor data (which may have been collected after the initial sensor data that was used to determine the probability and/or the price-duration range). For example, the additional sensor data may represent another (related) environmental condition (such as humidity or barometric pressure), which can be used to improve the determined estimate of the probability (such as the probability of flooding), as well as to update the price and/or the duration. Moreover, the additional sensor data may assess or monitor whether secure or safe habits are practiced, such as locking doors, turning on burglar alarms or home-monitoring sensors, exchanging smoke-detector batteries, etc. In addition, an insurance company may utilize the additional sensor data to detect, prevent and/or deter insurance fraud. More generally, the additional sensor may provide independent feedback about the insurance.

Additionally, the system may dynamically identify and aggregate or assemble combinations of components in the system to provide a service. As described below with reference to FIGS. 36 and 37, based on sensor data from one of more of environmental monitoring devices 110, partner electronic devices 116, and/or service-provider electronic devices 118 in at least one of environments 112 (such as environment 112-1), one of computers 120 (such as computer 120-1) may identify a combination that provides a service related to environment 112-1, where the combination includes one or more of environmental monitoring devices 110 and one or more of partner electronic devices 116 and/or the service providers. For example, the service may involve monitoring for fire and carbon monoxide in environment 112-1. In the identified combination, electronic device 114-1 may monitor for fire, and partner electronic device 116-1 may monitor for carbon monoxide. In addition, environmental monitoring device 110-1 may use an acoustic sensor to detect a sound indicating that a battery in electronic device 114-1 needs to be replaced. When this sound is detected, environmental monitoring device 110-1 may alert service-provider electronic device 118-1, which instructs the service provider to ship a new battery to an address associated with environment 112-1 and/or to install the new battery in electronic device 114-1. In some embodiments, the service is associated with a type of the sensor data, and at least the one or more of environmental monitoring devices 110 are identified based on the type of the sensor data.

After identifying the combination, computer 120-1 may communicate configuration information specifying the combination and functions in the service to the one or more of environmental monitoring devices 110 and the one or more of partner electronic devices 116 and/or the service providers. Note that the configuration information may specify interrelationships among the components in the combination that define a service-data hierarchy. In addition, the service-data hierarchy may specify exchange of the sensor data, sub-services in the service, and compensation within the combination for the sensor data and the sub-services (which are sometimes collectively referred to as 'inputs and outputs'). Moreover, at least some of the combinations specified may provide the services in at least a subset of environments 112 without action by occupants or user entities of at least the subset of environments 112.

Furthermore, the combination may be identified in response to a request, such as a request for the service, such as a request from: a governmental organization, an insurance provider, an owner of one or more environments 112, etc. In particular, the computer 120-1 may receive a request for the service from an electronic device (such as electronic device 108-1) associated with a user entity that is associated with environment 112-1, which is different from the provider of the system, the partners and/or the service providers. However, in some embodiments the combination is identified without a request from the user entity. For example, as noted previously, the computer 120-1 may identify the combination: when an alert about an occurrence of the environmental condition in environment 112-1 is received (such as from environmental monitoring device 110-1); when the environmental condition occurs in environment 112-1; and/or when a risk of occurrence of the environmental condition exceeds a threshold. Consequently, in some embodiments computer 120-1: provides a service offer for the service to electronic device 108-1; receives a response to the service offer from electronic device 108-1, where the response authorizes the service; and notifies the combination to provide the service.

Subsequently, computer 120-1 may receive additional sensor data from one or more of environmental monitoring devices 110 and/or an additional environmental monitoring device in environment 112-1. Based on the additional sensor data, computer 120-1 may determine and then provide modification information specifying one or more modifications to the combination. For example, the additional sensor data may indicate a change in the environmental condition or a risk metric associated with environment 112-1. Consequently, computer 120-1 may determine that different or additional sensors are need, and may identify different or additional components in the system that can provide the service. Alternatively or additionally, computer 120-1 may determine revision information specifying one or more revisions to the service based on the additional sensor data, and then may modification information specifying one or more modifications to the combination based on the one or more revisions to the service. For example, if the additional sensor data indicates the presence of an individual in environment 112-1 who has a medical condition or an allergy, the service may be revised to reflect a different threshold for the allergen or a need to monitor the allergen in environment 112-1.

One challenge associated with aggregating components associated with different entities into combinations is the risk of incorrect data and/or fraudulent behavior. This problem may be addressed by the system. In particular, as described below with reference to FIGS. 38 and 39, the system may identify bad sensor data and/or fraudulent payments in combinations in the ecosystem, and then may perform remedial action. For example, one of computers 120 (such as computer 120-1) may monitor inputs and outputs exchanged among components in combinations that provide services in environments 112, where the components in a given combination include at least one of: environmental monitoring devices 110 and one or more of partner electronic devices 116 and/or the service providers. As noted previously, the inputs and the outputs from a given component in the given combination may include: sensor data representing one or more environmental conditions in one or more of environments 112 (which may be acquired by one of more of: environmental monitoring devices 110, partner electronic devices 116 and/or service-provider electronic devices 118), sub-services in the services, and/or compensation within the given combination for the sensor data and the sub-services.

Computer 120-1 may: store the monitored inputs and outputs; analyze the monitored inputs and outputs based on quality criteria (such as predefined signatures of failure mechanisms in the combinations that result in particular sensor-data values or inferred environmental conditions as a function of time, and/or predefined signatures of previous fraudulent activity in the combinations) and historical inputs and outputs exchanged within the combinations; identify, based on the analysis, an instance in the inputs and the outputs of incorrect sensor data and/or fraudulent compensation; and perform the remedial action based on the identified instance. For example, computer 120-1 may identify the instance based on a variance (such as at least a $3\sigma$ difference relative to a historical norm or mean value) in sensor data, or may detect a change relative to typical inputs and outputs at a given time of day or day of the week. In some embodiments, the quality criteria and the historical inputs and outputs are used to train a supervised-learning model (using a machine-learning technique, such as: support vector machines, classification and regression trees, a neural network, logistic regression, etc.) that predicts the likelihood (with an associated confidence, such as 95 or 99% confidence) that a given input or output is incorrect or fraudulent. Note that the analysis may compare the monitored inputs and outputs and historical inputs and outputs from at least a subset of the combinations. Moreover, the combinations in the subset may have: a common type of service, and/or a common type of sensor data. Thus, the analysis may use techniques such as collaborative filtering.

In response to identifying an instance, computer 120-1 may perform a variety of remedial actions. For example, the remedial action may include providing a notification about the identified instance to an affected combination. Alternatively or additionally, the remedial action may include providing modification information specifying a modification to an affected combination that includes the identified instance. In particular, the modification may include excluding a source of the identified instance from the affected combination, where the source may include one of: environmental monitoring devices 110, partner electronic devices 116 and/or the service providers. Note that the remedial action may include banning the source from inclusion in subsequent combinations. In some embodiments, the modification includes replacing the source of the identified instance in the affected combination, where a replacement for the source may include one of: environmental monitoring devices 110, partner electronic devices 116 and/or the service providers that is different than the source.

Moreover, the remedial action may include: discontinuing the service provided by an affected combination that includes the instance; and/or adjusting a level of the service provided by the affected combination that includes the instance. For example, a service that includes or that is based on the instance may be intentionally degraded (such as delaying the service or intentionally reducing its reported quantitative accuracy to reflect the impact of the inaccurate sensor data), which may function as a warning or which may punish misbehavior by the source. Alternatively or additionally, the remedial action may include removing the incorrect sensor data from the inputs and the outputs. Furthermore, the remedial action may include replacing the incorrect sensor data from the inputs and the outputs with modified sensor data (such as interpolated sensor data from timestamps before and after the suspect sensor data). Additionally, the remedial action may include instructions (such as to one of the service providers) for performing maintenance on the source of the identified instance in an affected combination (which may correct or eliminate the incorrect sensor data).

In addition to maintaining the quality of existing services provided in the system, the system may also perform analysis on the inputs and outputs to identify opportunities for improving the services and/or for offering additional services. In particular, as described below with reference to FIGS. 40 and 41, computer 120-1 may analyze the monitored inputs and outputs, as well as information specifying the combinations and the services, to determine: sensor-data patterns, suggested services, and/or suggested sensor-data sub-contracting during the services and the suggested services. For example, the analysis may determine: purchasing patterns (of products, replacement parts and/or sensor data), recommended product features, recommended retail inventory, recommended pricing of the services and the suggested services, and/or recommended durations of the services and the suggested services. The recommendations based on the analysis may improve: the speed of the service, the accuracy of the service (such as the accuracy with which an environmental condition is monitored), the ability to perform a service (such as the ability to monitor a particular environmental condition), the cost of the service, the value proposition of the service to user entities, etc.

Note that the analysis may compare current monitored inputs and outputs and historical inputs and outputs from at least a subset of the combinations. Moreover, the combinations in the subset may have: the common type of service, and/or the common type of sensor data. However, in some embodiments the subset includes combinations that use different types of sensor data and/or that provide different types of service. As an illustration, metadata about the components in the combinations may be used to relate seemingly disparate components and/or services, so that, by these association or based on these comparisons, the services and/or the sensor-data sub-contracting to different sub-components can be identified. Alternatively or additionally, the sensor-data patterns may be used to relate the seemingly disparate components and/or services, so that the services and/or the sensor-data sub-contracting to different sub-components can be identified. Based on the analysis, computer 120-1 may provide: modification information specifying a modification to the combinations; and/or a notification.

In these ways, one or more components in the system may dynamically provide services to the user entities associated with environments 112 based on occurrences of environmental conditions and/or alerts. This capability may allow the services to be provided as needed and/or when the user entities want the services. Moreover, the flexibility and adaptability of the system may allow different combinations of components to be identified and dynamically aggregated in order to provide the services. These combinations may allow sensor data and sub-services to be sub-contracted to components that are associated with different entities. Furthermore, the system may allow sensor data and/or analyzed sensor data to be selectively shared (e.g., based on data privileges of different entities), which may protect entity privacy while facilitating the monitoring of the environments that is needed for the services. Consequently, the system may provide a dynamic sensor-data marketplace with appropriate structure. The services provided by the system may be improved (e.g., the services may be more cost effective for the user entities, incorrect data and/or fraudulent activity may be identified and eliminated or mitigated, etc.), which may increase customer confidence and satisfaction with the components and/or the system.

Moreover, as described further below with reference to FIG. 2, environmental monitoring devices 110, partner electronic devices 116, service-provider electronic devices 118, computers 120 and/or optionally some of electronic devices 114 (such as electronic device 114-2) may include subsystems, such as: a networking subsystem, a memory subsystem, a processing subsystem, feedback subsystem and a sensor subsystem. In addition, these electronic devices may include radios 124 in the networking subsystems. More generally, environmental monitoring devices 110, partner electronic devices 116, service-provider electronic devices 118, computers 120 and/or optionally some of electronic devices 114 can include (or can be included within) any electronic devices with networking subsystems that enable wirelessly communication with another electronic device. This can comprise transmitting packets or frames on wireless channels to enable the electronic devices to make initial contact, followed by exchanging subsequent data/management frames (such as connect requests or petitions to establish a connection or link), configuring security options (e.g., encryption on a link or in a mesh network), transmitting and receiving packets or frames on one or more wireless channels, etc.

As can be seen in FIG. 1, wireless signals 126 (represented by a jagged line) are transmitted from/received by radios 124 in environmental monitoring devices 110, partner electronic devices 116, at least some of service-provider electronic devices 118, at least some of computers 120 and/or optionally some of electronic devices 114. In general, wireless communication among these electronic devices may or may not involve a connection being established between the electronic devices, and therefore may or may not involve communication via a wireless network. (Note that the communication between service-provider electronic devices 118 and computers 120 may occur via network 122, which may involve wired or optical communication with a different communication protocol than wireless signals 126.)

Furthermore, the processing of a packet or frame in an electronic device (such as environmental monitoring device 110-1) may include: receiving wireless signals 126 with the packet or frame; decoding/extracting the packet or frame from received wireless signals 126 to acquire the packet or frame; and processing the packet or frame to determine information contained in the packet or frame (such as an input to environmental monitoring device 110-1 and/or an output from another component in the system).

As noted previously, in general communication among the components in FIG. 1 may be protected. This may involve encryption using an encryption key (such as an encryption key associated with one of environmental monitoring devices 110 and/or a self-contained secure channel in a processor in one of environmental monitoring devices 110). The encryption key may use symmetric or asymmetric encryption techniques. Alternatively or additionally, a secure hash function (such as SHA-256) may be used. For example, the secure hash may supplement encryption that is associated with a network interface in one or more of environmental monitoring devices 110.

Although we describe the environment shown in FIG. 1 as an example, in alternative embodiments, different numbers or types of electronic devices or components may be present. For example, some embodiments comprise more or fewer electronic devices or components. Furthermore, while not shown in FIG. 1, one or more components in electronic device 110 may be coupled or connected by additional signals lines or a bus.

We now describe embodiments of components in the system in FIG. 1. FIG. 2 presents a block diagram illustrating electronic device 200, such as one of environmental monitoring devices 110 (FIG. 1). (However, similar subsystems and at least some of the functionality described below may be included in other components in FIG. 1, such as electronic devices 108, at least some of electronic devices 114, partner electronic devices 116, service-provider electronic devices 118 and/or computers 120.) This electronic device includes processing subsystem 210 (and, more generally, an integrated circuit or a control mechanism), memory subsystem 212, a networking subsystem 214, power subsystem 216, optional switching subsystem 220, optional sensor subsystem 224 (i.e., a data-collection subsystem and, more generally, a sensor mechanism) and feedback subsystem 236. Processing subsystem 210 includes one or more devices configured to perform computational operations and to execute techniques to process sensor data. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include an optional secure channel that performs secure processing of information, securely communicates with other components in electronic device 200, and more generally performs secure services. This secure channel may include one or more processors, a secure boot ROM, one or more security peripherals, and/or other components. The security peripherals may be hardware-configured to assist in the secure services performed by the optional secure channel. For example, the security peripherals may include: authentication hardware implementing various authentication techniques, encryption hardware configured to perform encryption, secure-interface controllers configured to communicate over a secure interface to other components, and/or other components. In some embodiments, instructions executable by the optional secure channel are stored in a trust zone in memory subsystem 212 that is assigned to the optional secure channel, and the optional secure channel fetches the instructions from the trust zone for execution. The optional secure channel may be isolated from the rest of processing subsystem 210 except for a carefully controlled interface, thus forming a secure region for the optional secure channel and its components. Because the interface to the optional secure channel is carefully controlled, direct access to components within the optional secure channel (such as a processor or a secure boot ROM) may be prevented. In some embodiments, the optional secure channel decrypts inputs and/or encrypts outputs communicated via networking subsystem 214, and encrypts and/or decrypts information (such as sensor data) communicated with optional sensor subsystem 224.

Memory subsystem 212 includes one or more devices for storing data and/or instructions for processing subsystem 210, networking subsystem 214 and/or optional sensor subsystem 224. For example, memory subsystem 212 can include dynamic random access memory (DRAM), static random access memory (SRAM), and/or other types of memory. In some embodiments, instructions for processing subsystem 210 in memory subsystem 212 include one or more program modules 232 or sets of instructions, which may be executed in an operating environment (such as operating system 234) by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired, optical and/or wireless network (i.e., to perform network operations and, more generally, communication), including an interface circuit 228 (such as a ZigBee® communication circuit) and one or more optional antennas 230. For example, networking subsystem 214 may include: a ZigBee® networking subsystem, a Bluetooth™ networking system (which can include Bluetooth™ Low Energy, BLE or Bluetooth™ LE), a cellular networking system (e.g., a 3G/4G network such as UMTS, LTE, etc.), a USB networking system, a networking system based on the standards described in IEEE 802.11 (e.g., a Wi-Fi® networking system), an Ethernet networking system, an infra-red communication system, a power-line communication system and/or another communication system (such as a near-field-communication system or an ad-hoc-network networking system).

Moreover, networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between electronic device 200 and other electronic devices, e.g., transmitting advertising frames, petitions, beacons and/or information associated with near-field communication.

Moreover, electronic device 200 may include power subsystem 216 with one or more power sources 218. Each of these power sources may include: a battery (such as a rechargeable or a non-rechargeable battery), a DC power supply, a transformer, and/or a switched-mode power supply. Moreover, the one or more power sources 218 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid or may be rematebale. Note that the one or more power sources 218 may be mechanically and electrically coupled to an external power source or another electronic device by one of the electrical-connection nodes in switch 246 in optional switching subsystem 220.

In some embodiments, power subsystem 216 includes or functions as a pass-through power supply for one or more electrical connectors to an external electronic device (such as an appliance or a regulator device) that can be plugged into the one or more electrical connectors. Power to the one or more electrical connectors (and, thus, the external electronic device) may be controlled locally by processing subsystem 210, optional switching subsystem 220 (such as by switch 246), and/or remotely via networking subsystem 214.

Furthermore, optional sensor subsystem 224 may include one or more sensor devices 226 (or a sensor array), which may include one or more processors and memory. For example, the one or more sensor devices 226 may include: a thermal sensor (such as a thermometer), a humidity sensor, a barometer, a camera or video recorder (such as a CCD or CMOS imaging sensor), one or more microphones (which may be able to record acoustic information, including acoustic information in an audio band of frequencies, in mono or stereo), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a utility-usage sensor, an Internet-usage sensor, a wireless-network usage sensor, a burglar-alarm sensor, a voltmeter, an ammeter, a chemical-analysis device, a mass spectrometer, a microanalysis device, a nano-plasmonic sensor, a genetic sensor (such as a micro-array), an accelerometer, a forced-entry detector, a break-in detector, a detector that measures a parameter associated with an emotional state or a mood of an individual, a position or a location sensor (such as a location sensor based on the Global Positioning System or GPS), a gyroscope, a motion sensor (such as a light-beam sensor), an ambient-light sensor, a contact sensor, a strain sensor (such as a strain gauge), a pressure sensor, a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 226 may include redundancy (such as multiple instances of a type of sensor device) to address sensor failure or erroneous readings, to provide improved accuracy and/or to provide improved precision.

During operation of electronic device 200, processing subsystem 210 may execute one or more program modules 232, such as an environmental monitoring application. In particular, environmental monitoring application may instruct one or more sensor devices 226 to measure or acquire sensor data that represents one or more environmental conditions in an environment that includes electronic device 200 (which is sometimes referred to as an 'external environment'). For example, the environmental condition may include: presence of an individual (such as a resident or a potential burglar), opening of a door, an individual getting out of bed, an individual waking up, an individual crying, an individual tossing and turning in bed, an individual shivering, presence of a chemical compound (such as exhaust, carbon monoxide, radon, smoke, a non-volatile organic compound and/or a volatile organic compound), presence of an allergen (such as dander or pollen), presence of dust, presence of a fungus, a fire, presence of smoke, flooding, a water leak, a chemical leak, presence of an insect or rodent (and, more generally, an infestation), discharge of a firearm, a possible altercation or criminal act (such as domestic violence), a medical emergency, a change in health condition of an individual, availability of electrical power (such as whether there is a power failure), a lighting condition (such as whether the lights are on or off), temperature deviating from a predefined target, and/or humidity deviating from a predefined target. In some embodiments, the environmental condition is associated with the operation of a regulator device (which may or may not be a legacy electronic device). The regulator device (and, more generally, one of electronic devices 114 in FIG. 1) may include: a smoke detector, a thermostat, a carbon-monoxide detector, an appliance, a pet or animal feeder, a plant or animal watering device, a clock, a security alarm, a humidifier, an air filter, a switch, a light, etc. Note that the monitoring of the sensor data may be continuous, periodic (such as after a time interval has elapsed) or as needed (such as event-driven monitoring).

Alternatively or additionally, instead of measuring the sensor data using optional sensor subsystem 224 or in conjunction with the measured sensor data from optional sensor subsystem 224, electronic device 200 may receive the sensor data from another electronic device (such as one of partner electronic devices 116 in FIG. 1) that includes one or more sensor devices that are similar to sensor devices 226. In particular, the sensor data may be received from the other electronic device using networking subsystem 214. (Similarly, electronic device 200 may communicate the sensor data to another component in FIG. 1 using networking subsystem 214 for analysis and/or for use in implementing a sub-service or a service.)

The measured and/or the received sensor data may be communicated to processing subsystem 210. Then, the environmental monitoring application may optionally analyze the sensor data, such as: calculating a discrete or a Fourier transform, determining a histogram, performing filtering or signal processing, performing data compression, calibrating one or more of sensor devices 226, managing power consumption of electronic device 200, identifying one or more of sensor devices 226 that are not working or which are outputting erroneous sensor data, applying another transformation, converting data from one format to another, calculating statistics (such as moments of a distribution), performing supervised learning (such as Bayesian analysis), performing noise reduction, normalizing the sensor data, scaling the sensor data, partitioning the sensor data, aggregating or compiling the sensor data, converting units, etc. (Alternatively or additionally, the sensor data or a document summarizing the sensor data may be communicated to another electronic device using networking subsystem 214 and the analysis may be performed remotely, e.g. by one of computers 120 in FIG. 1.) For example, the analysis may determine whether an environmental condition is present in the environment. In some embodiments, this analysis is based on information, such as sensor data and/or environmental conditions, received from other environmental monitoring devices. This may allow calibration settings, such as environment-specific threshold values, to be determined for the environment and/or electronic device 200. (Alternatively or additionally, the calibration settings may be manually set by a user entity or by software that implements a calibration technique.) In addition, the analysis may be based on information from external data sources, such as datasets of weather and environmental phenomena, e.g., tornados, hurricanes, earthquakes, tsunamis, weather forecasts, etc.

Then, the environmental monitoring application may provide feedback to a user entity associated with electronic device 200 (such as to one of electronic devices 108 in FIG. 1) and/or directly to one of electronic devices 114 in FIG. 1 (if this electronic device is able to communicate with electronic device 200 via networking subsystem 214). In particular, the environmental monitoring application may instruct feedback subsystem 236 to provide sensory information, such as; a text or graphical message, a graph, a report, a chart, a spectrum, a video displayed on a display 240, a sound or audio message (such as an alert) output by optional speakers 242 and/or an illumination pattern output by optional light sources 244. For example, the sensory information may include: a range of values, numerical measurements, shades of gray (or grayscale), colors, chemical formulas, images, illumination patterns, textures, patterns (which may correspond to one or more environmental conditions), tessellations with gradients of larger or smaller element sizes, and/or tessellations of increasing or decreasing element sizes (such as tessellation that are adjusted to be larger or smaller as a given environmental condition increases or decreases). Thus, in some embodiments the sensory information includes a change in the color of electronic device 200. Alternatively or additionally, the feedback may include a change in the illumination pattern provided by optional light sources 244. In some embodiments, the feedback is communicated using networking subsystem 214 and presented to the user entity (or other individuals) on another electronic device, such as one of electronic devices 108 in FIG. 1 (e.g., a user's cellular telephone, tablet computer or computer) that is used for remote visualization of: the sensor data, the analyzed sensor data, the environmental condition and/or the feedback.

For example, in response to an environmental condition, a potential threat or an actual threat, electronic device 200 may provide or output an alert, which may include audible sound (or feedback) in the environment and/or information that is wirelessly communicated to one or more electronic devices (such as one of electronic devices 108 in FIG. 1). There may be different types of alerts (such as different warning sounds, lights, messages, etc.) for different environmental conditions or as the severity of one or more environmental conditions changes. Additionally, electronic device 200 may output or provide more than one alert at the same time. Note that electronic device 200 may provide or output an alert that was received from another electronic device (such as one of partner electronic devices 116 in FIG. 1).

In some embodiments, the environmental monitoring application may provide, via networking subsystem 214, the feedback to one or more of environmental monitoring devices 110 (FIG. 1), partner electronic devices 116 (FIG. 1), service-provider electronic devices 118 (FIG. 1), computers 120 (FIG. 1) and/or other electronic devices (such as computers or servers associated with or operated on behalf of: component suppliers, retailers, insurance companies, security personnel, emergency service personnel, utilities, maintenance organizations, shipping companies, landlords or property owners, a corporate-compliance organization, inspectors, businesses, government agencies, etc.). For example, the environmental monitoring application may utilize a Short Message Service, email, a social network and/or a messaging service with a restricted number of characters per message. Alternatively or additionally, the feedback may be posted to a web page or website (and, more generally, a location on a network), and one or more recipients may be notified via networking subsystem 214, e.g., a link to the location on the network may be provided to the recipients.

In turn, an authorized entity may use an electronic device (such as one of electronic devices 108 in FIG. 1) may, via networking subsystem 214, modify settings of electronic device 200 (such as alarm settings, user preferences, etc.) that change how the feedback is provided locally (e.g., using optional speakers 242) and/or remotely (e.g., using networking subsystem 214), and which more generally change one or more functions of electronic device 200. For example, a user of electronic device 108-1 in FIG. 1 may access a web page associated with a provider of electronic device 200 or the system to modify one or more settings, such as to disable the providing of alerts or feedback.

When the providing of the alert is disabled, processing subsystem 210 may continue to assess a potentially threatening environmental condition (such as the possible presence of smoke or carbon monoxide) based on subsequent sensor data and, if the threat is increasing (such as if the concentration of carbon monoxide is increasing or has become dangerous), may reactivate the providing of the alert. Alternatively, after a time interval (such as 5, 10, 15 or 30 minutes), the modified alert setting may automatically revert to the original alert setting, so that electronic device 200 can provide alerts again. In some, embodiments, a user subsequently changes the modified alert setting back to the original alert setting or resets the alert setting to default. Thus, electronic device 200 may continue to assess the impact of one or more environmental factors (and, more generally, the environmental condition) on the safety of the environment, while also providing a user operational control over alerts. In addition, electronic device 200 may provide fail-safes, both in how alerts are disabled and by reactivating alerts in case the threat is increasing.

In some embodiments, processing subsystem 210 performs a remedial action in response to an alert or an alarm (i.e., based on one or more environmental conditions). This remedial action may include communicating with a regulator device to correct the environmental condition(s). For example, via networking subsystem 214, processing subsystem 210 may instruct the regulator device to: ventilate the area, activate a humidifier, power on or power off a regulator device, initiate the operation of a mode on a regulator device, etc. In some embodiments, this same function (and, more generally, the remedial action) is performed without directly communicating with the regulator device by changing a state of switch 246 in optional switching subsystem 220. Alternatively, processing subsystem 210 may provide a maintenance notification (such as a notification to change an air filter). Furthermore, the alert may indicate a remedial action, such as positive or negative changes that can restore the environmental condition to a safe value. Thus, the alert may indicate that a user should turn on the ventilation or wear a safety mask when painting or vacuuming, and/or may encourage the user to stop applying a chemical product (such as paint) or to slow down the rate of application.

Furthermore, the one or more program modules 232 may include a maintenance application. This maintenance application may provide a maintenance notification related to the operation of electronic device 200, one of the other components in FIG. 1 and/or one or more environmental conditions in the environment. For example, the maintenance application may provide an instruction to: perform maintenance, replace a battery (and, more generally, one of power sources 218), replace one of the one or more sensor devices 226, order another replacement component (such as a filter) and/or to take out the garbage. When providing the maintenance notification, the maintenance application may instruct feedback subsystem 236 to present the maintenance notification to the user entity, maintenance personnel or a service provider, and/or may instruct networking subsystem 214 to communicate the maintenance notification to another electronic device, such as a user entity's cellular telephone. In some embodiments, maintenance application suggests or recommends a specific service provider or product to address or perform a remedial action in response to a maintenance notification. Alternatively, maintenance application may direct a user to a document (such as a web page or website) that includes information related to a maintenance notification.

Note that the sensor data and/or the analyzed sensor data may be stored, at least temporarily, in a data structure in memory subsystem 212. In particular, the data structure may include entries with: sensor data, timestamps, locations, optional analyzed sensor data and/or environmental conditions. (More generally, memory subsystem 212 may store inputs to and/or outputs from components in the system of FIG. 1.) Note that the locations (or location information) may specify locations were the sensor data was acquired or measured and/or may include pointers to locations were the sensor data (and, more generally, inputs and/or outputs) are stored. For example, the location information may be measured using a sensor device in electronic device 200 (such as a location monitor) and/or the location information may be received from another electronic device that is proximate to electronic device 200 in FIG. 2 (such as a user's cellular telephone that is within 1-10 m). Thus, the location may be determined via GPS and/or a cellular-telephone network (e.g., triangulation or trilateration).

Moreover, the one or more program modules 232 may include a data-sharing application. This data-sharing application may enable a designated or authorized recipient to access protected sensor data that is stored on archive device, such as one of computers 120 (FIG. 1). In particular, when executed by processing subsystem 210, the data-sharing application may instruct optional sensor subsystem 224 to measure or collect sensor data that represents the environmental condition. Then, the data-sharing application may protect the sensor data and/or analyzed sensor data. For example, the sensor data and/or the analyzed sensor data may be encrypted using an encryption key by processing subsystem 210 and/or optional secure channel 222. Alternatively or additionally, the sensor data and/or the analyzed sensor data may be protected using a secure hash function in conjunction with an identifier of electronic device 200 and/or a random (or pseudorandom) number generated by processing subsystem 210. Next, data-sharing application may instruct networking subsystem 214 to provide the protected sensor data and/or the analyzed sensor data to at least one of computers 120 (FIG. 1).

Subsequently, when electronic device 200 receives, via networking subsystem 214, a request for the sensor data from data-sharing electronic device 118 (FIG. 1), the data-sharing application may access a predefined authorization preference of a user of electronic device 200 that is stored in memory subsystem 212. If the predefined authorization preference of the user authorizes the recipient associated with the request, the data-sharing application may provide, via networking subsystem 214, authorization information to at least one of computers 120 (FIG. 1) to release the sensor data to one of electronic devices 108 (FIG. 1). Alternatively, the data-sharing application may instruct a feedback subsystem 236 to request feedback about the request from the user. This user feedback may be received via an optional user interface 248 (FIG. 1). If the user feedback approves the request, the data-sharing application may provide, via networking subsystem 214, authorization information to one of electronic devices 108 (FIG. 1) to release the sensor data to at least the one of electronic devices 108 (FIG. 1). (Thus, the user of electronic device 200 may control when other parties are allowed to access the sensor data.) Note that the data-sharing application may also provide, via networking subsystem 214, protection information specifying how to unprotect the sensor data to at least the one of electronic devices 108 (FIG. 1) and/or to at least one of computers 120 (FIG. 1). For example, the data-sharing application may provide the encryption key and/or may indicate the secure hash function, the random (or pseudorandom) number and/or the identifier. In some embodiments, this protection information is received from the user of electronic device 200, e.g., via networking subsystem 214 and/or optional user interface 248.

In some embodiments, the data-sharing application selectively provides or shares different subsets of the sensor data (or analyzed sensor data) to different entities based on data privileges of these entities. For example, the environmental monitoring application may generate subsets of the sensor data based on data privileges of different entities, and then, via networking subsystem 214, the data-sharing application may provide the subsets of the sensor data to electronic devices associated with the entities (such as one or more user entities, partner entities and/or service providers). Note that the data privileges may specify: different spatial extents in the external environment monitored by the sensor mechanism (such as monitoring of different regions in an apartment or a building at different times of day to protect tenant privacy); and/or different types of information associated with the external environment (thus, a tenant may monitor and access different types of information than a landlord, e.g., information about a sleeping child versus information about the operation of a heating or an air-conditioning system). In addition, the data-sharing application may post data-availability information specifying available sensor data for the external environment. As described further below, the data-availability information may enable subcontracting for sensor data and/or the dynamic aggregation of sensor data, partner entities and/or service providers to provide services. In particular, in response to a request for at least some of the sensor data from another entity (such as a partner entity or a service provider), which is received via networking subsystem 214, the data-sharing application optionally generates (if the requested subset of the sensor data does not already exist in memory subsystem 212) and then provides a subset of the sensor data to the other entity via networking subsystem 214.

Moreover, the one or more program modules 232 may include a service application that allows environmental monitoring device to, directly or indirectly, selectively (and, thus, dynamically) enable or provide a service (such as on a per-alert basis or as needed). In particular, alone or in conjunction with one of the preceding program modules, this service application may selectively enable the providing of the service in response to an alert associated with and/or indicating an occurrence of the environmental condition in the environment. When one or more of sensor devices 226 measures or acquires sensor data that represents one or more environmental conditions in the external environment, the environmental monitoring application may determine, based on the sensor data, an alert associated with the environmental condition and/or the external environment. Note that determining the alert may involve optionally analyzing the sensor data.

Based on the alert, the service application may provide, via networking subsystem 214, a service offer to an electronic device of an entity. For example, the service offer may be provided to a cellular telephone or a computer of a user entity (such a user or an owner of environmental monitoring entity 200, a tenant, a property owner, maintenance personnel, and/or a property manager). This service offer may include information associated with the environmental condition, such as the type or service (maintenance, regulation of the environmental condition, dynamic insurance, etc.) and/or an indication that there is an alert available for the external environment.

Then, if networking subsystem 214 receives a response that authorizes the service, the service application may perform the service. Note that performing the service may involve: feedback subsystem 236 providing the alert (or information specifying the alert) on display 240, via optional speaker(s) 242, etc.; and/or networking subsystem 214 providing the alert (or information specifying the alert) to the electronic device of the entity. Furthermore, the service application may perform the service, such as: providing an instruction or a command, via networking subsystem 214, to change on operating condition of a regulator device (thereby changing one or more environmental conditions); controlling the regulator device via optional switching subsystem 220 (e.g., by opening or closing switch 246, selecting a grey-scale value of an impedance of switch 246 that is between open and closed, etc.); providing, via networking subsystem 214, a maintenance notification about or associated with an electronic device (e.g., a legacy electronic device, the regulator device, an electronic device in a feedback loop, etc.) to the user entity or a service provider to perform particular maintenance or a remedial action; and/or ordering, via networking subsystem 214, a replacement part or component for the electronic device from a supplier (e.g., a retailer); and/or providing, via networking subsystem 214, an instruction to an insurance company to provide insurance for an object in and/or for at least a portion of the external environment (e.g., a room or a building).

In some embodiments, in order to perform the service, the service application: downloads or installs software (such as a software module, an application or a driver) that, when executed by processing subsystem 210, performs the service; and/or enables a software module or a driver that, when executed by processing subsystem 210, performs the service. For example, the software or the driver may facilitate an additional capability of environmental monitoring device 200, such as the ability to monitor another environmental condition using one or more of sensor devices 226 or the ability to perform different analysis on the measured sensor data to determine the other environmental condition.

Note that the service provided by environmental monitoring device 200 may be based on the sensor data from one or more of sensor devices 226 and/or sensor data received (via networking subsystem 214) from another electronic device in the external environment (such as other environmental monitoring devices, partner electronic devices, and/or service-provider electronic devices). This sensor data may include current and/or historical sensor data representing the environmental conditions in one or more external environments that include environmental monitoring devices. Using the sensor data, the service application may facilitate or enable the dynamic providing of insurance. For example, the service application may analyze the sensor data to determine the probability of an environmental condition occurring during a time interval in one of the external environments. Furthermore, the service application may calculate a price-duration range of the insurance associated with the environmental condition necessary for profitability of the insurance. Then, the service application may provide, via networking subsystem 214, a service offer (with at least a price or an insurance premium and a duration) for the insurance to a user entity (such as to the cellular telephone of a user). After receiving, via networking subsystem 214, a response that accepts the service offer (and, thus, that authorizes the service), the service application may (alone or in conjunction with a service provider) provides the insurance to the user entity. (However, in some embodiments, the service application initiates the insurance even when the user entity has not explicitly authorized it, such as when probability of the environmental condition occurring during the time interval, such as the next 24-72 hours, exceeds a threshold, e.g., 5, 10, 25 or 50%.) In some embodiments, the service application dynamically adapts the price and/or the duration of the insurance based on subsequent sensor data to ensure profitability.

As noted previously, the service application may allow dynamic subcontracting for (and, thus, dynamic aggregating of) sensor data that enables a service. This subcontracting may be based on a service request, received via networking subsystem 214 (e.g., from a user entity or from a computer system in an ecosystem that includes environmental monitoring device 200), for a service and/or based on an alert associated with the external environment, such as when the environmental monitoring application determines the presence of one or more environmental conditions based on sensor data. (Thus, the subcontracting can occur with or without an explicit request for the service. Instead, in some embodiments, environmental monitoring device 200 identifies a need based on an alert and/or the presence of an environmental condition, and subcontracts for sensor data that allows environmental monitoring device 200 to provide the service.)

In response to the request and/or the alert, the service application may identify, based on the requested service and/or the alert, another electronic device (which is sometimes referred to as a 'subcontracting electronic device') that can provide at least some of the information (such as a type of sensor data and/or analyzed sensor data) needed to provide the service. For example, the service application may identify the other electronic device based on the capabilities, stored in memory subsystem 212 (and/or stored remotely), of other environmental monitoring devices, partner electronic devices, and/or service-provider electronic devices in the external environment. Then, the service application may provide, via networking subsystem 214, a request for the sensor data and/or the analyzed sensor data to the one or more identified environmental monitoring devices, partner electronic devices and/or service-provider electronic devices in the external environment. Next, the service application receives (e.g., once, during a time interval or on an ongoing basis), via networking subsystem 214, the requested sensor data and/or the analyzed sensor data from the one or more identified environmental monitoring devices, partner electronic devices and/or service-provider electronic devices. Using the requested sensor data and/or the analyzed sensor data, the service application provides the service.

Note that, if the necessary sensor data and/or analyzed sensor data is unavailable in the external environment, the service application may provide, via networking subsystem 214, instructions to at least one of the one or more identified environmental monitoring devices, partner electronic devices and/or service-provider electronic devices in the external environment to download (or install) software, an application or a driver and/or to activate a previously installed program module or driver, so that at least this subcontracting electronic device can provide the necessary sensor data and/or the analyzed sensor data. In the embodiments where the service application identifies the subcontracting electronic device based on the alert, the service application optionally provides, via networking subsystem 214, a service offer to a user entity (such as providing information specifying an environmental condition to a user's cellular telephone with a service offer to monitor the environmental condition or to perform a remedial action) and, if the user authorizes the request (e.g., by accepting the service offer), provides the service (and, thus, subcontracts for the sensor data and/or the analyzed sensor data).

In conjunction with a combination of other components in the ecosystem of electronic devices and service providers, the service application may enable environmental monitoring device 200 to provide a service. For example, the service application (and/or a computer system in the ecosystem) may identify the combination based on the sensor (such as sensor data measured by one or more sensor devices 226 and/or from another environmental monitoring device, partner electronic device, or service-provider electronic device). Note that the combination may include one or more of environmental monitoring devices, one or more partner electronic devices and/or one or more of the service providers (which are sometimes collectively referred to as 'components' in the combination). Moreover, note that the sensor application (and/or the computer system) may identify the combination in response to a request (from a user entity or another entity, such as an insurance company or a government agency) or without there being an explicit request (thus, the service may be provided even if a user or a user entity has not authorized the service). For example, if sensor data from multiple homes in a neighborhood indicate an increase in attempted or successful burglaries, an insurance provider may provide a request for enhanced surveillance or home security, which may involve environmental monitoring devices in neighboring homes so that audio and video feeds from these environmental monitoring devices can provide a dynamic neighborhood-watch capability.

In some embodiments, the combination allows the service application to track and predict the activities of a user (such as an individual in their home) based on sensor data from multiple electronic devices (i.e., in a collaborative manner) as the user moves through and in and out of their home. Moreover, the service application may use the sensor data to determine the mood or emotional state of the user or another individual in the external environment. Then, the service application may provide, via networking subsystem 214, a forecast (which includes the predicted activities and/or the user's emotional state) to a service provider (such as cable-television provider or an over-the-top content provider) that allows the service provider to select and distribute audio, video and/or text content to the user (e.g., on a television, an electronic device, speakers, etc.) at suitable or convenient times for the user without requiring any explicit action by the user. For example, the service application may use spectral analysis of audio to determine that a baby is crying, and thus may conclude that the baby's parent is stressed, so the service provider may be alerted to provide soothing music, a children's program on a television as a distraction and/or calming lighting. Alternatively or additionally, the service application may use natural language processing of audio of a phone conversation to determine that the user has a particular problem, and the service provider may be alerted to conduct a corresponding search using a search engine and may display useful results on the user's cellular telephone. Furthermore, the service application may determine a user's shopping intent based on natural language processing of audio and the user's activities (such as cooking and placing an empty milk cartoon on a counter), and may alert a service provider to order and deliver select groceries to the user's home.

As the environmental condition(s) in the external environment change (i.e., based on additional sensor data, such as sensor data that indicates when the user is in different locations or performing different tasks), the service application (and/or the computer system) may dynamically identify and aggregate different combinations to provide the service(s). The service application (and/or the computer system) may, via networking subsystem 214, communicate configuration information specifying the combination, inter-relationships and functions in the service to the components in the combination at a given time, including: the sensor data exchanged, sub-services performed and/or compensation (or information specifying the compensation) in the service.

Because the combinations may include bad sensor data and/or fraudulent activity, the one or more program modules 232 may include a quality application that monitors, via networking subsystem 214 (and/or in conjunction with the computer system), the inputs and outputs exchanged among the components in combinations that provide services in one or more external environments. Then, the quality application (and/or the computer system) analyzes the monitored inputs and outputs based on quality criteria (such as signatures of failure mechanisms in the combinations and/or signatures of previous fraudulent activity in the combinations) and historical inputs and outputs exchanged within the combinations, which are stored in memory subsystem 212 (and/or remotely). When the quality application (and/or the computer system) identifies an instance in the inputs and the outputs of incorrect sensor data and/or fraudulent compensation, the service application (and/or the computer system) may perform a remedial action. In particular, the service application may, via networking subsystem 214, provide to an affected combination that includes the identified instance: a notification about the identified instance; modification information specifying a modification to the affected combination (such as an instruction to exclude or replace a source of the identified instance); a notification to discontinue a service provided by an affected combination; and/or information specifying an adjustment to a level of the service provided by the affected combination (such as an instruction to delay or intentionally degrade the service).

The one or more program modules 232 may also include an analysis application that identifies opportunities for improving the services and/or for offering additional services based on analysis of the inputs and outputs exchanged in the combinations. In particular, the analysis application (and/or the computer system) may identify: sensor-data patterns, suggested services, and/or suggested sensor-data sub-contracting during the services and the suggested services. For example, the analysis application may determine: purchasing patterns, recommended product features, recommended retail inventory, recommended pricing of the services and the suggested services, and/or recommended durations of the services and the suggested services. Moreover, the service application may, via networking subsystem 214, communicate information specifying a modification to a combination based on one or more of the identified opportunities.

Within electronic device 200, processing subsystem 210, memory subsystem 212, networking subsystem 214, power subsystem 216, optional switching subsystem 220, optional sensor subsystem 224 and/or feedback subsystem 236 may be coupled using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems.

Electronic device 200 can be (or can be included in) a wide variety of electronic devices. For example, electronic device 200 can be (or can be included in): a sensor (such as a smart sensor), a tablet computer, a smartphone, a cellular telephone, an appliance, a regulator device, a consumer-electronic device (such as a baby monitor), a portable computing device, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), an alarm, a smoke detector, a carbon-monoxide detector, a monitoring device, and/or another electronic device (such as a switch or a router).

Although specific components are used to describe electronic device 200, in alternative embodiments, different components and/or subsystems may be present in electronic device 200. For example, electronic device 200 may include one or more additional processing subsystems, memory subsystems, networking subsystems, power subsystems, switching subsystems, and/or sensor subsystems. Additionally, one or more of the subsystems may not be present in electronic device 200. Moreover, in some embodiments, electronic device 200 may include one or more additional subsystems that are not shown in FIG. 2.

Figure 2:
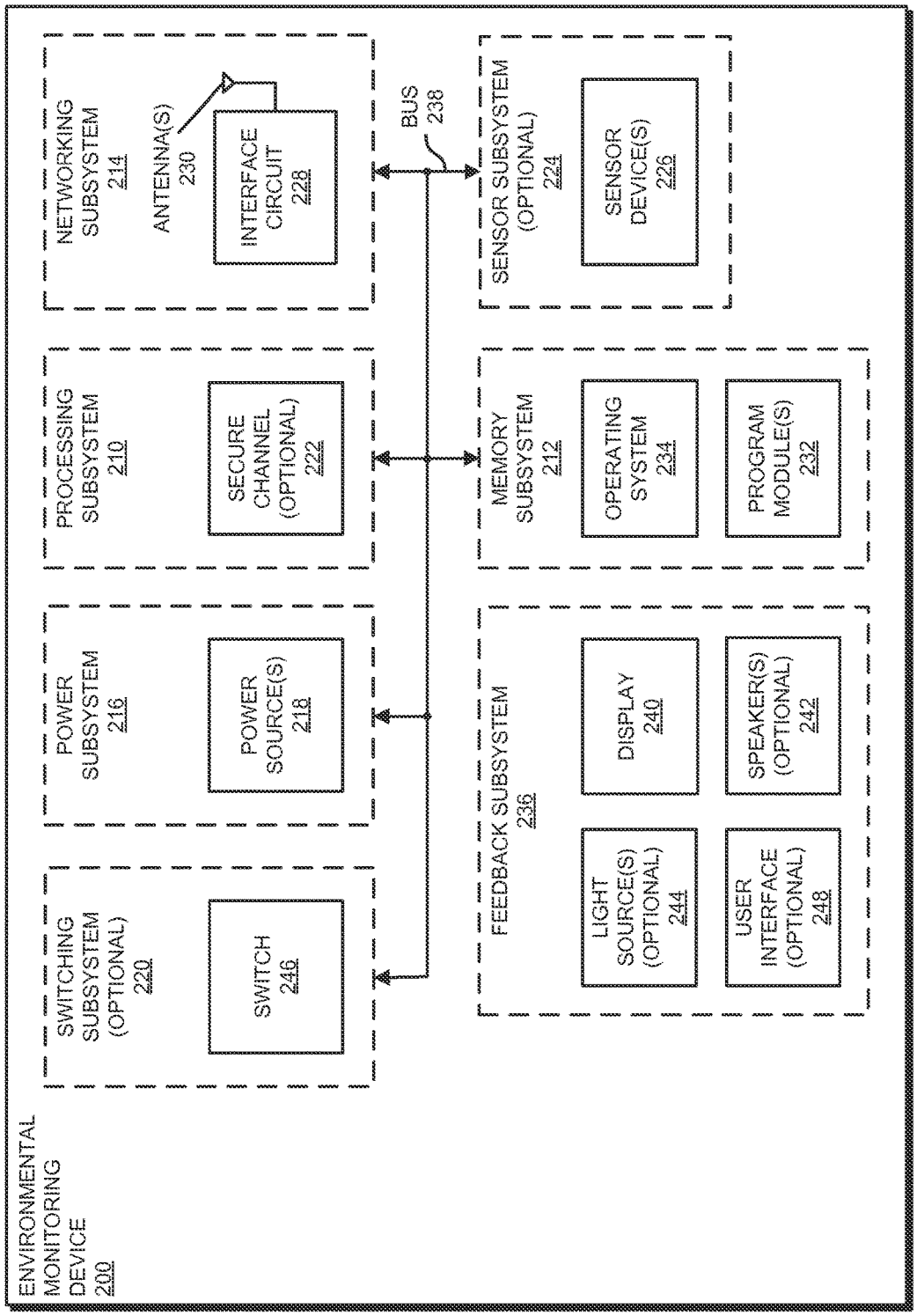
FIG. 2 is a block diagram illustrating an electronic device in the ecosystem of FIG. 1 in accordance with an embodiment of the present disclosure.

Although separate subsystems are shown in FIG. 2, in some embodiments, some or all of a given subsystem or component can be integrated into one or more of the other subsystems or components in electronic device 200. For example, in some embodiments the one or more program modules 232 are included in operating system 234. In some embodiments, a component in a given subsystem is included in a different subsystem.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 200. Moreover, the integrated circuit may include hardware and/or software mechanisms that are used for transmitting wireless signals from electronic device 200 to, and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, a petition, a beacon, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Figure 3:
FIG. 3 is a drawing illustrating a component in the ecosystem of FIG. 1 in accordance with an embodiment of the present disclosure.

We now further describe exemplary embodiments of the ecosystem. FIG. 3 presents a drawing illustrating a component 300 in the ecosystem of FIG. 1. This component may be capable of receiving one or more inputs 310, such as a service, information or goods or SIG (which may include a service, a sub-service in the service, a product, analyzed sensor data, configuration information, notifications, fraud-detection information, fraudulent-payment information, faulty-sensor information, additional information, etc.), compensation and/or sensor data. For example, component 300 may include an application programming interface with a structured format of the one or more inputs 310, which allows component 300 to: collect or receive sensor data, receive analyzed sensor data, receive a service or a sub-service, receive a fraud alert or information specifying a fraudulent payment, receive a notification about a faulty sensor, receive information that configures component 300 (such as into a combination that provides a sub-service or a service), receive payment for sensor data, a sub-service or a service, receive calibration information, receive location information, receive characteristics of an external environment (such as a laser scan of a room, a thermal profile of a room, etc.), receive user preferences, receive encryption keys, receive authentication information and permissions, etc. Similarly, component 300 may be capable of providing one or more outputs 312, such as an SIG, compensation and/or sensor data. For example, component 300 may include another application programming interface with a structured format of the one or more outputs 312, which allows component 300 to: provide or forward sensor data, provide or forward analyzed sensor data, provide a service or a sub-service, provide a fraud alert or information specifying a fraudulent payment, provide a notification about a faulty sensor, provide information to configure another component (such as into a combination that provides a sub-service or a service), provide payment for sensor data, a sub-service or a service, provide identifying information about component 300, the external environment and/or an entity with which component 300 is associated, etc. Note that component 300 may include: an environmental monitoring device, a partner electronic device, a regulator device, a service-provider electronic device, a computer system in the ecosystem, another electronic device (such as an electronic device of a user entity), etc.

For example, a component that receives or provides compensation (such as a payment) includes an environmental monitoring device that is enabled for a subscription to a service, or that charges another electronic device (such as another environmental monitoring device) an amount for a prepaid service (such as a prepaid 'service value token' or SVT that is used for each instance of a notification or an alert). Moreover, a component that receives a service may include an environmental monitoring device that remotely receives a firmware upgrade, a software application or a program module that expands the functionality or capability of the environmental monitoring device after a user pays for an upgraded service or the expanded functionality. Alternatively a component that receives a sub-service may include a smoke detector that receives motion-sensor data, which allows the smoke detector to determine the location of an individual or an animal during a fire. Furthermore, a component that provides a service may include an air purifier purifying the air, a smoke detector or a carbon-monoxide detector providing an alert or a notification, or a volatile-organic-compound sensor providing measurements of harmful chemicals in an external environment.

Figure 4:
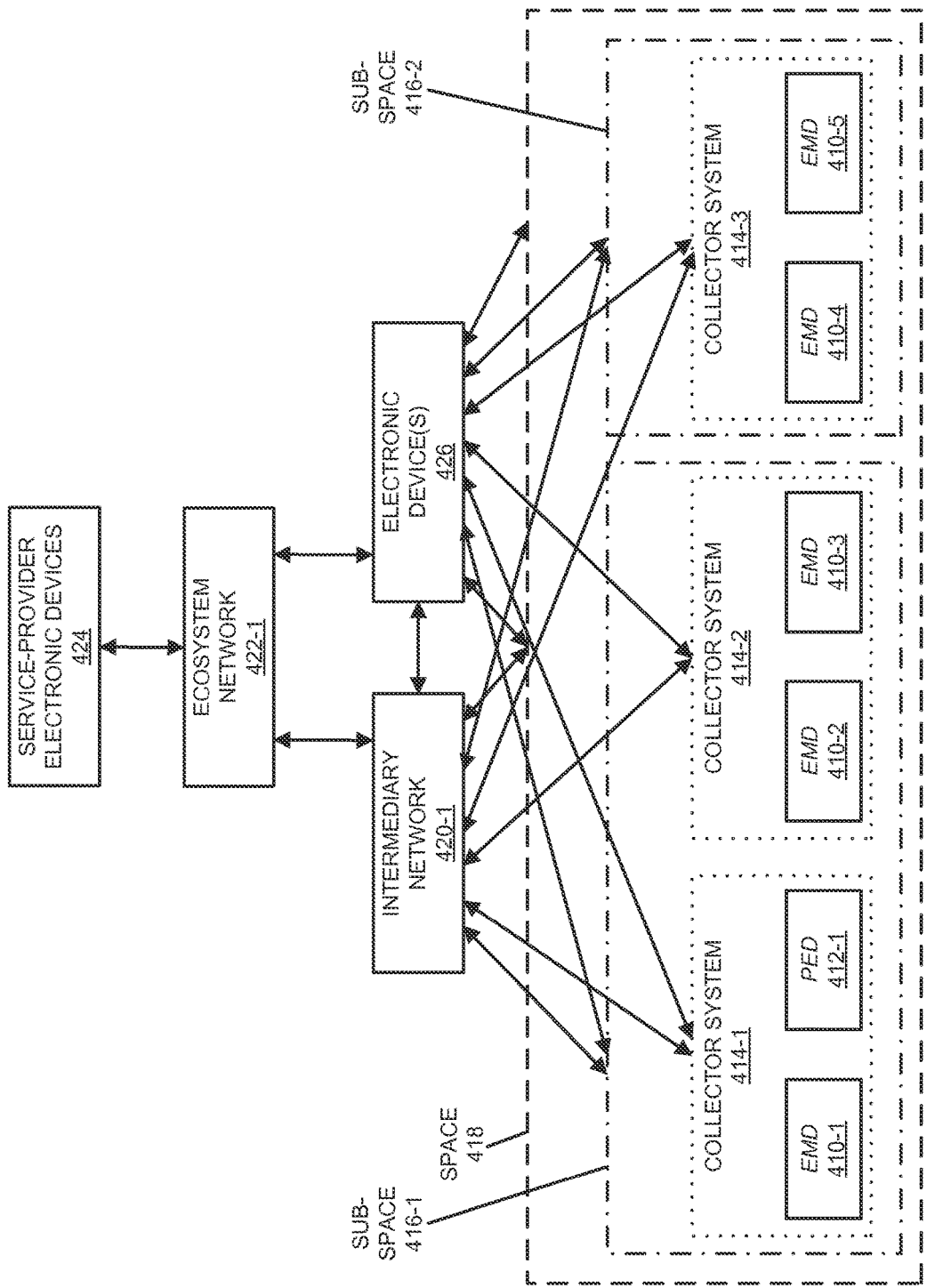
FIG. 4 is a block diagram illustrating communication among the components in the ecosystem of FIG. 1 in accordance with an embodiment of the present disclosure.

Components in the ecosystem may be arranged into a service hierarchy, which allows different combinations (which may be arranged or assembled dynamically) to provide services in environments. This is illustrated in FIG. 4, which presents a block diagram illustrating communication among the components in the ecosystem of FIG. 1. In particular, environmental monitoring devices (EMD) 410 and/or partner electronic devices (such as partner electronic device or PED 412-1) in sub-spaces 416 in spaces 418 (such as hallways and/or rooms in a house or building) may interact with each other (i.e., may exchange the inputs and the outputs) to form collector systems 414 (such as groups of interacting environmental monitoring devices 410). Moreover, environmental monitoring devices 410, partner electronic device 412-1 and/or collector systems 414 may, via optional intermediary network 420-1 (such as a network associated with a partner of a provider of at least some of environmental monitoring devices 410) and/or ecosystem network 422-1 (which may include one or more computer systems and one or more communication networks), interact with service-provider electronic devices 424 (and, more generally, the service providers). In addition, environmental monitoring devices 410, partner electronic device 412-1 and/or collector systems 414 may, directly or via an intermediary, communicate with one or more electronic device(s) 426 of users or user entities (such as a homeowner or a group of homeowners) that pay for a service based on the monitored sensor data.

Thus, there may be multiple environmental monitoring devices 410, partner electronic devices and collector systems in sub-spaces 416 and/or spaces 418. For example, there may be multiple smoke detectors in a long hallway, or a smoke detector, a nightlight and an air purifier in the same room, and there can be multiple sub-spaces in a space (such as rooms in a house, rooms in a hotel, offices in a building, buildings in a work campus, houses in a housing association, etc.). Moreover, there can be many different users, partners and entities that exchange the inputs and outputs with different or varying data privileges or information rights across these electronic devices, collector systems, sub-spaces and spaces. For example, landlords or property managers, property owners, maintenance staff and tenants can have varying access to information (such as sensor data, analyzed sensor data, environmental conditions, alerts, notifications, etc.) in a space that represents a multi-unit housing community.

Note that a service provider and a partner can be associated with the same or a different organization or company. In general, a partner is a company that manufacturers or provides a product (such as partner electronic device 412-1) that is compatible with one or more of environmental monitoring devices 410, such as a product that is designed by a provider of one or more of environmental monitoring devices 410 or that includes a processing subsystem that is compatible with one or more of environmental monitoring devices 410 (such as a processor or a microcontroller that uses the same libraries as one or more of environmental monitoring devices 410). In some embodiments, a partner electronic device includes a sensor or a program module on behalf of the provider of one or more of environmental monitoring devices 410. This sensor or program module may enable functionality of the partner electronic device that, in conjunction with one or more of environmental monitoring devices 410, facilitates a sub-service or a service. Furthermore, a partner may exchange inputs and outputs with one or more environmental monitoring devices 410 without requiring compensation at the time of the exchange (e.g., based on a pre-existing business agreement between the partner and the provider of one or more of environmental monitoring devices 410). In contrast, a service provider is an individual, an organization, a company or a government entity that uses the outputs (such as sensor data) to provide a sub-service or a service in a combination, such as: a more competitive insurance quote, a fire or security monitoring service, automatic battery and filter shipments, automatic maintenance and repair-service scheduling, etc. In some embodiments, partners and/or service providers can also use their own data and payment gateways to provide services directly to customers or user entities.

In some embodiments, a provider of environmental monitoring devices 410 provides incentives to entities to install environmental monitoring devices 410. For example, an incentive can be a monthly rebate, a per-use rebate, or an initial discount on environmental monitoring devices 410 or a discount on the installation of environmental monitoring devices 410. Similarly, the provider can provide incentives for partners to manufacture partner electronic devices that are compatible with the ecosystem, such as a payment for each partner electronic device. In addition, agreements between the provider and a partner may allow one or both to have access to sensor data, analyzed sensor data and/or environmental condition information that they would not otherwise be able to access.

Figure 5:
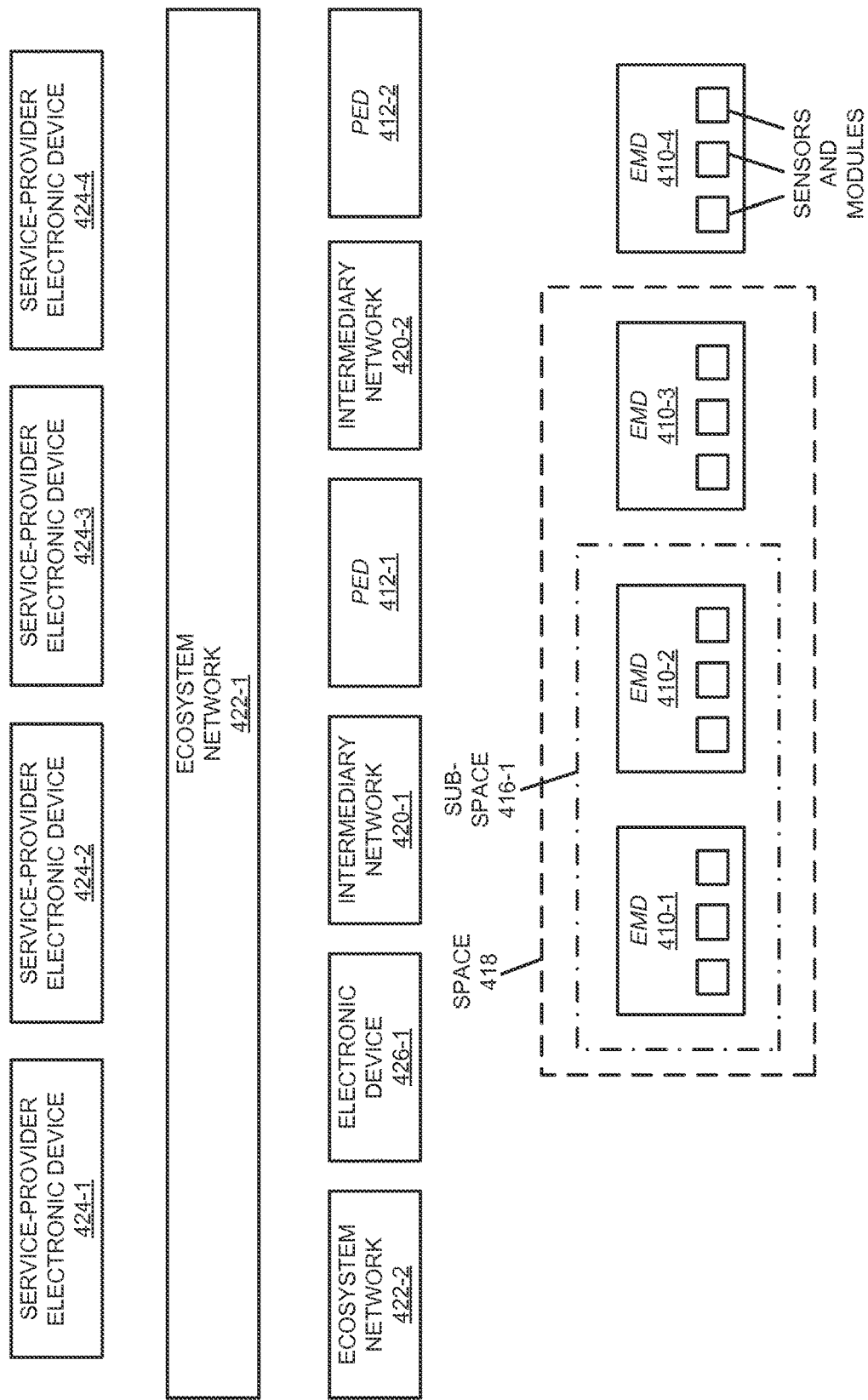
FIG. 5 is a drawing illustrating components and layers in the ecosystem of FIG. 1 in accordance with an embodiment of the present disclosure.
Figure 6:
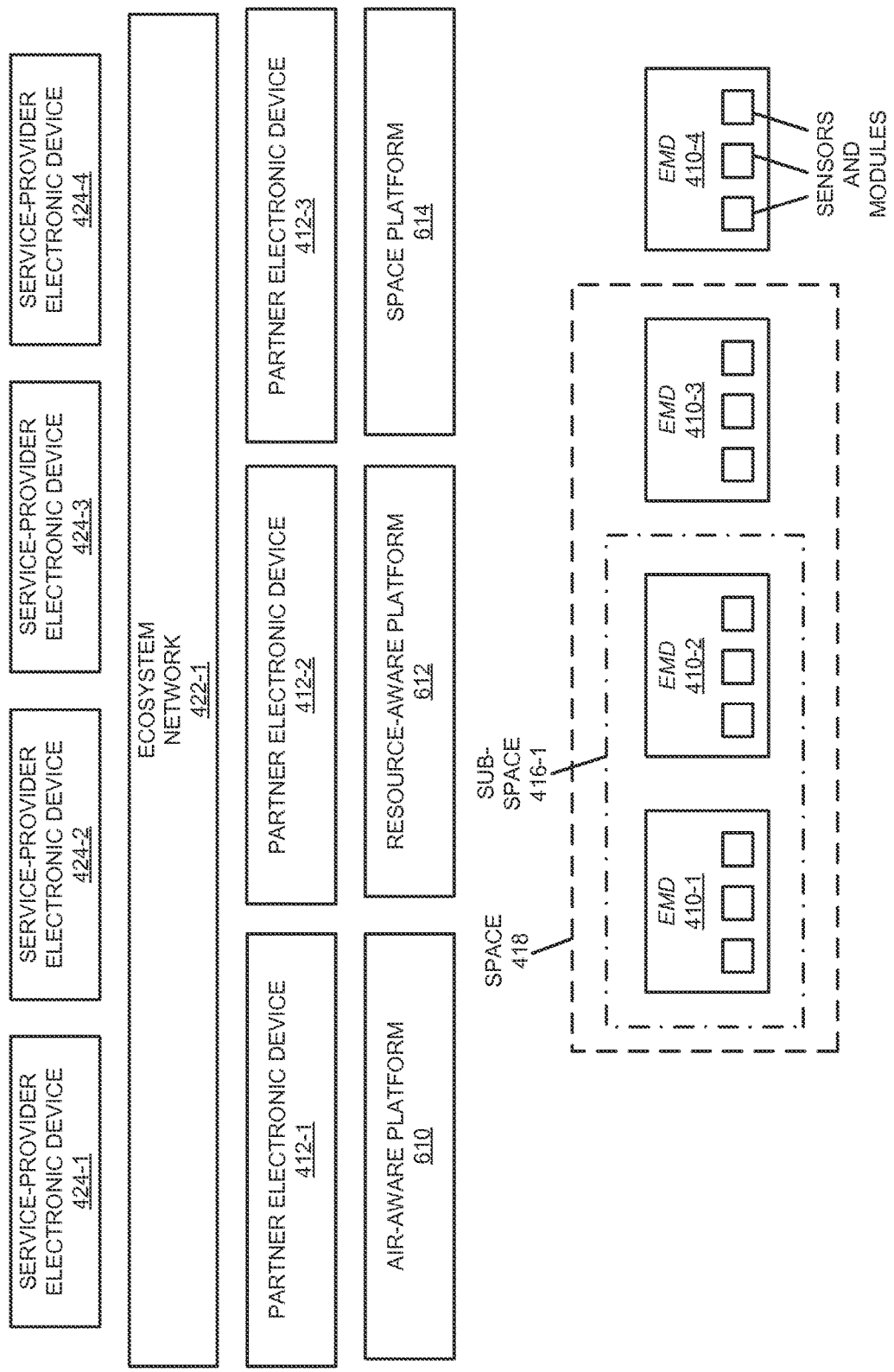
FIG. 6 is a drawing illustrating components and layers in the ecosystem of FIG. 1 in accordance with an embodiment of the present disclosure.

Another view of the service hierarchy is shown in FIG. 5, which presents a drawing illustrating different components and layers in the ecosystem of FIG. 1. Yet another view of the service hierarchy is shown in FIG. 6, which presents a drawing illustrating different components and layers in the ecosystem of FIG. 1. Note that an air-aware platform 610 in the ecosystem may include: climate control (such as temperature and humidity monitoring), air-quality control, lighting or illumination control, and/or health and comfort. A space-aware platform 612 in the ecosystem may include: security (including monitoring for hazards such as burglary), safety (including monitoring for hazards such as fire) and/or access control. Moreover, a resource-aware platform 614 may include: shared-resource metering or monitoring (such as use of a utility in a multiple occupancy residence, e.g., gas, electric, trash or water services), more-efficient resource consumption and/or resource distribution. An entity can choose to subscribe to one or more of the services facilitated by these platforms. For example, a user may opt-in to some services and opt-out of others for a rate reduction. Note that the services can be grouped into subsets such that an entity can subscribe to a specific subset of the services.

In the embodiments of the ecosystem, ecosystem network 616 (or cloud) may include different (but linked or connected) sub-components. For example, a portion of ecosystem network 616 (such as air-aware platform 610, space-aware platform 612 and/or resource-aware platform 614) may provide an interface that exchanges, collects and/or stores the sensor data, the analyzed sensor data, environmental conditions, component configurations, the alerts and notifications, payments or compensation, and user or entity accounts, and that provides access to different entities to this information. In addition, another portion of ecosystem network 616 may provide an interface to the service providers to receive service orders and notifications, to provide products and services, to receive compensation, to receive fraud-detection and payment analytics, etc.

Figure 7:
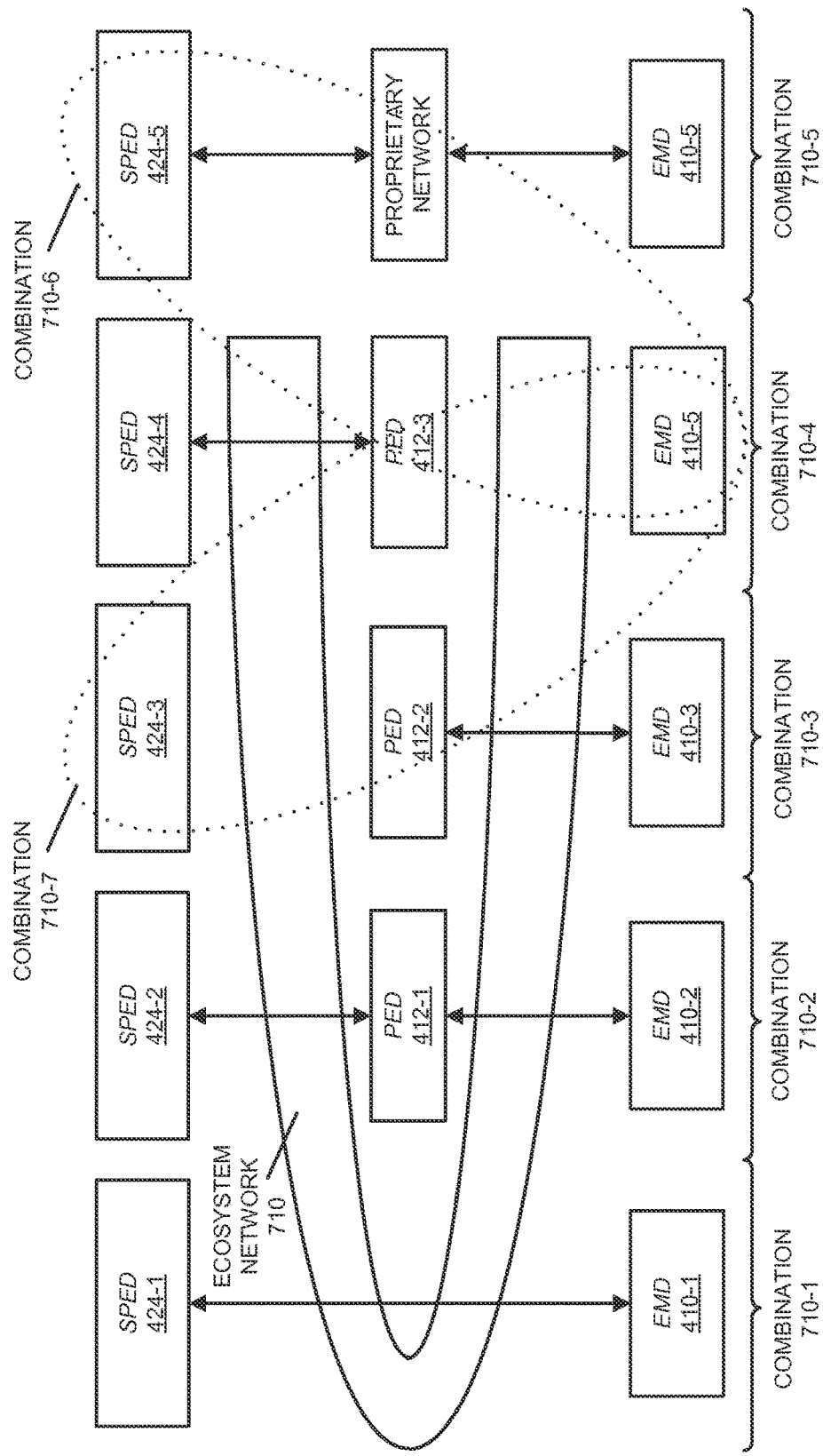
FIG. 7 is a drawing illustrating components and layers in the ecosystem of FIG. 1 in accordance with an embodiment of the present disclosure.

FIG. 7 presents a drawing illustrating components and layers in the ecosystem of FIG. 1. In particular, ecosystem network 422-1 (which provides an independent infrastructure for dynamically establishing, monitoring, and/or modifying combinations of components) is illustrated as a horseshoe shape with environmental monitoring devices 410 on one side, service-providers electronic devices 424 on the other side, and partner electronic devices 412 in the middle. Different positions along the horizontal length of ecosystem network 422-1 may represent connections or channels in different combinations 710 that can be implemented by ecosystem network 422-1. For example, using combination 710-1, a user entity can leverage sensor data from environmental monitoring device 410-1 that is installed in a space or space system. This environmental monitoring device may be provided by a provider of ecosystem network (or on whose behalf ecosystem network is operated). Moreover, environmental monitoring device 410-1 may communicate sensor data and/or analyzed sensor data to service-provider electronic device (SPED) 424-1 via ecosystem network 422-1, and service-provider electronic device 424-1 may provide a service to a user (e.g., via ecosystem network 422-1 and/or environmental monitoring device 410-1). Alternatively, in combination 710-2, environmental monitoring device 410-2 may exchange sensor data and/or analyzed sensor data with partner electronic device 412-1 in a space or a space system via ecosystem network 422-1, and partner electronic device 412-1 may communicate the sensor data, the analyzed sensor data, additional sensor data and/or additional analyzed sensor data to service-provider electronic device 424-2 via ecosystem network 422-1. In turn, service-provider electronic device 424-2 may provide a service to a user (e.g., via ecosystem network 422-1, partner electronic device 412-1 and/or environmental monitoring device 410-2).

In combination 710-3, environmental monitoring device 410-3 may exchange sensor data and/or analyzed sensor data with partner electronic device 412-2 in a space or a space system via ecosystem network 422-1. For example, partner electronic device 412-2 may provide additional functionality or capability in combination 710-3 by leveraging the sensor data and/or the analyzed sensor data from environmental monitoring device 410-3, such as by further analyzing the sensor data. In particular, if partner electronic device 412-2 is a smoke detector, its emergency capabilities may be expanded based on live-person detection information from environmental monitoring device 410-3, which may allow partner electronic device 412-2 to alert the fire department to the location of individuals in an external environment in the event of a fire. Alternatively or additionally, if partner electronic device 412-2 is the smoke detector, its emergency capabilities may be expanded based on temperature measurements from environmental monitoring device 410-3, which may allow partner electronic device 412-2 to provide information to the fire department about the location of a fire in the external environment. In another example, if partner electronic device 412-2 is the burglar alarm, ecosystem network 422-1 may allow sensor data from a lock sensor in environmental monitoring device 410-3 (which may detect lock picking or vibrations) to be used to increase the accuracy of a detected space intrusion (and, thus, may decrease the number of false alarms).

Furthermore, in combination 710-4 partner electronic device 412-3 communicates with environmental monitoring device 410-4 via ecosystem network 422-1, and uses ecosystem network 422-1 to communicate with one or more service-provider electronic devices 424. This may allow partner electronic device 412-3 to access service-provider electronic devices 424 with reduced costs. In turn, this may allow service-provider electronic devices 424-4 to have access to a richer set of sensor data and analysis, and to provide a wide variety of services to users.

However, in some embodiments, such as combination 710-5, environmental monitoring device 410-5, partner electronic device 412-4 and service-provider electronic device 424-5 communicate with each other without using ecosystem network 422-1. For example, this communicate may involve a separate or dedicated infrastructure that only supports communication between electronic devices associated with or provided by a common provider or manufacturer.

Figure 8:
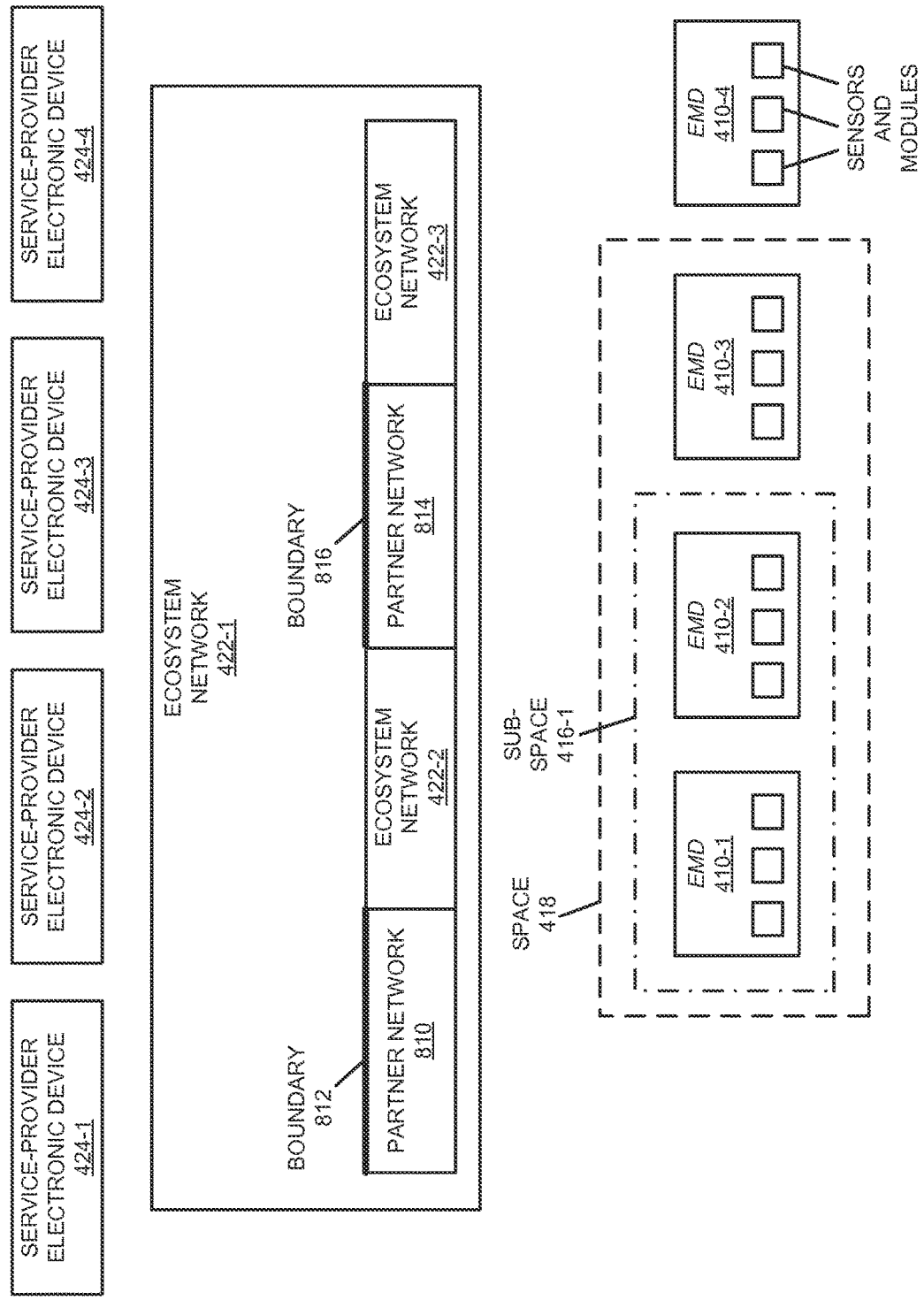
FIG. 8 is a drawing illustrating components and layers in the ecosystem of FIG. 1 in accordance with an embodiment of the present disclosure.

In order to achieve the aforementioned dynamic combinations in the ecosystem, the components may need to exchange data or information, which is sometimes referred to as 'data permeability.' This is shown in FIG. 8, which presents a drawing illustrating components and layers in the ecosystem of FIG. 1. In FIG. 8, data permeability is illustrated among one or more partners and a provider of ecosystem network 422-1. However, the concept of data permeability may be extended to an arbitrary component in the ecosystem. In particular, the data permeability can occur between partners that are using ecosystem network 422-1 to collect and analyze sensor data and/or partners that have their own partner networks (such as partner network 810) that are owned and managed by the partners. The data permeability can be defined by a partnership agreement between one or more partners and a provider of environmental monitoring devices 410 and/or ecosystem network 422-1. Moreover, the data permeability can be further influenced by user preferences or settings. The data permeability can be bi-directional, meaning that a first partner can share data with a second partner, and a second partner can reciprocally share data with the first partner. However, in some embodiments the data permeability is unidirectional. For example, as indicated by boundary 812, the sensor data captured by environmental monitoring devices 410 may have completely bi-directional data permeability with one or more partners. Alternatively, in some embodiments a partner (who may be associated with partner electronic device 412-1) can choose not to have data permeability. In these embodiments, partner network 810 may communicate with ecosystem network 422-1 to achieve the analytical capability and/or connection to one of service providers 424. Partner network 810 may not be able to achieve this functionality by having access to sensor data from other partner electronic devices (as indicated by boundary 816). In another embodiment, partner network 814 has unidirectional data permeability. In these embodiments, partner network 814 accepts sensor data from other partner electronic devices, but partner network 814 may not provide a fraction or all of its sensor data to the other partner electronic devices.

Figure 9:
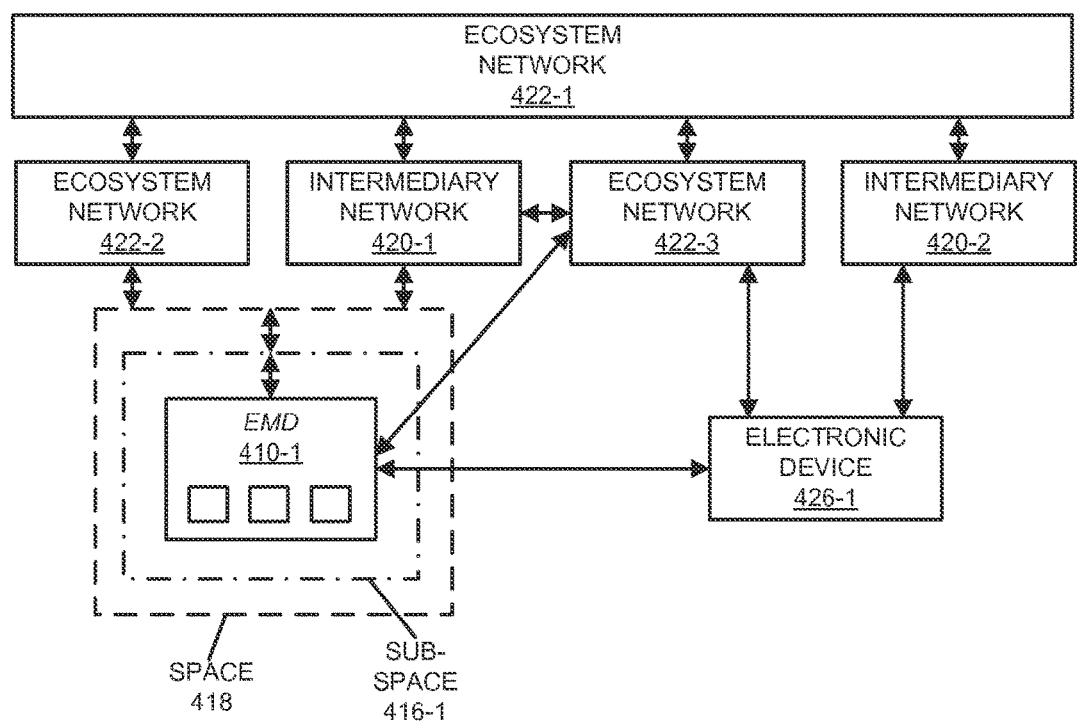
FIG. 9 is a drawing illustrating communication among components in the ecosystem of FIG. 1 in accordance with an embodiment of the present disclosure.

The service hierarchy in the ecosystem may provide different paths for exchanging information between components in combinations. This is shown in FIG. 9, which presents a drawing illustrating communication among components in the ecosystem of FIG. 1.

Figure 10:
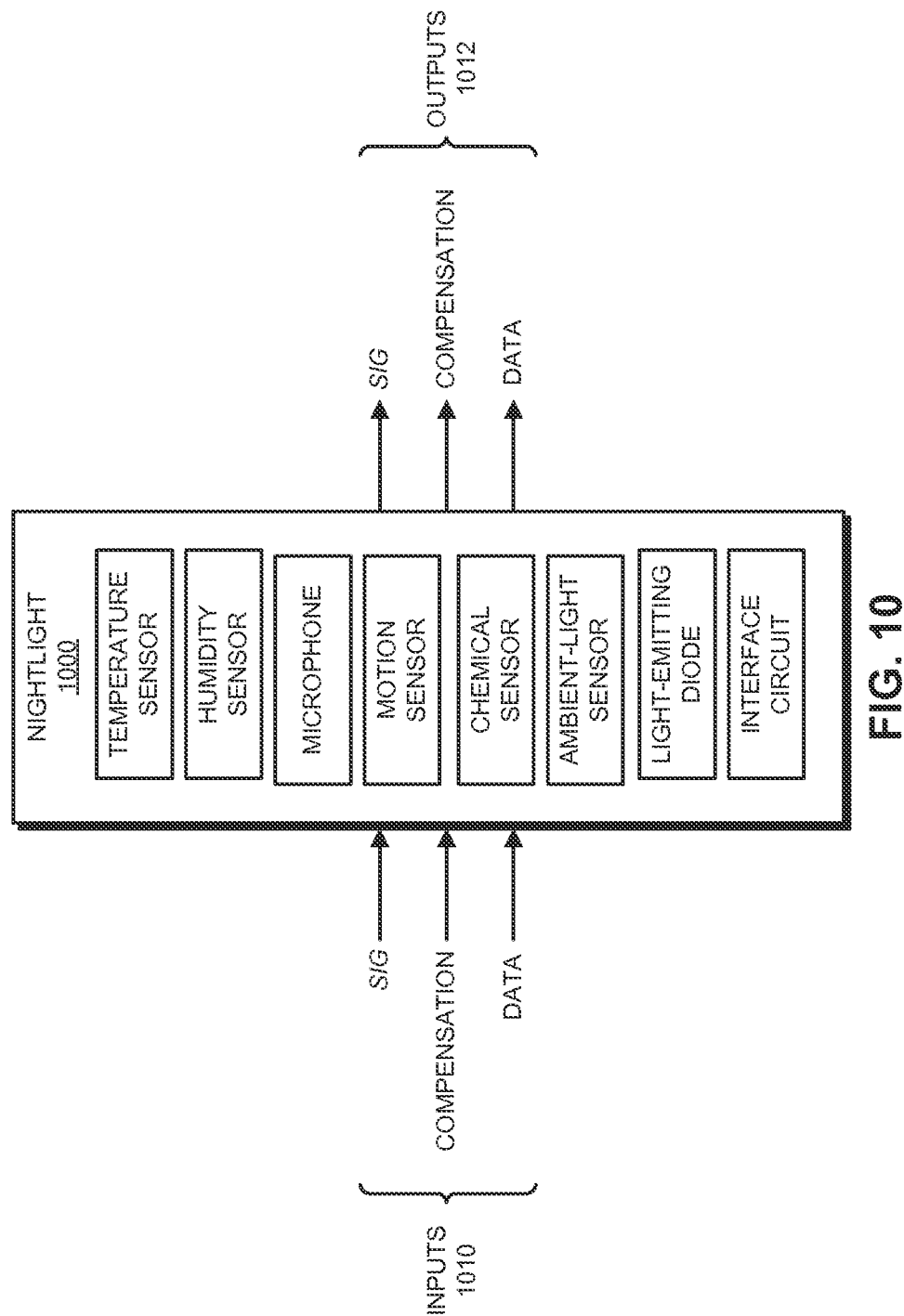
FIG. 10 is a drawing illustrating inputs to and outputs from a nightlight in the ecosystem of FIG. 1 in accordance with an embodiment of the present disclosure.

We now consider some specific examples of combinations of components in the ecosystem, including: a nightlight in a single family home and a nightlight in an apartment building. Referring back to FIG. 4, in the case of a nightlight in a single family home, environmental monitoring devices 410 and partner electronic device 412-1 may be nightlights, one of electronic devices 426 may be associated with a user (such as a home owner), and service-provider electronic devices 424 may be associated with service providers, such as: a maintenance service, an installation service, a retailer, and an emergency-monitoring service. FIG. 10 presents a drawing illustrating inputs to and outputs from one of these nightlights, such as nightlight 1000, in the ecosystem of FIG. 1. Inputs 1010 to nightlight 1000 may include: SIG such as services (upgrades, automation management, device-relationship management, batch management, etc.) and information (such as a notification of an event, a call to action, etc.); compensation information including when (non-recurring or recurring revenue), how (prepaid, credit or debit), what (cash, token or event) and frequency (time period, event or installment); and the data may include metadata (such as a location, privacy rights, a nightlight identifier, frequency and quantity of events, user identification, mode, configuration, authorization, etc.). Moreover, outputs 1012 from nightlight 1000 may include: SIG such as services (led color indicators of what the nightlight is monitoring and of other indications related to other products, real-time monitoring of events, lights that guide a user's path, the nightlight saves energy by turning on when there is motion, the nightlight provides security by listening for smoke detectors, etc.) and information (such as a notification of an event, a call to action, etc.); compensation information including when (a non-recurring or recurring expense) how (prepaid, credit or debit), what (cash, token or event) and frequency (time period, event or installment); and the data may include sensor data (such as samples of temperature, humidity, volatile-organic compounds, etc.), sensor packets (such as audio recordings from a microphone, motion information, etc.), sensor streaming (such as the microphone, a motion detector, etc.), events (such as from the microphone, from the motion detector, a software trigger, a button, etc.) and metadata (such as a location, privacy rights, a nightlight identifier, frequency and quantity of events, user identification, an operating mode, etc.). An example of good is an actual product shipped from a retailer, or a digital download or firmware upgrade for nightlight 1000, a service is a security or fire-monitoring service, and information includes alerts (such as a notification when a chemical reaches an unsafe level in the home).

Figure 11:
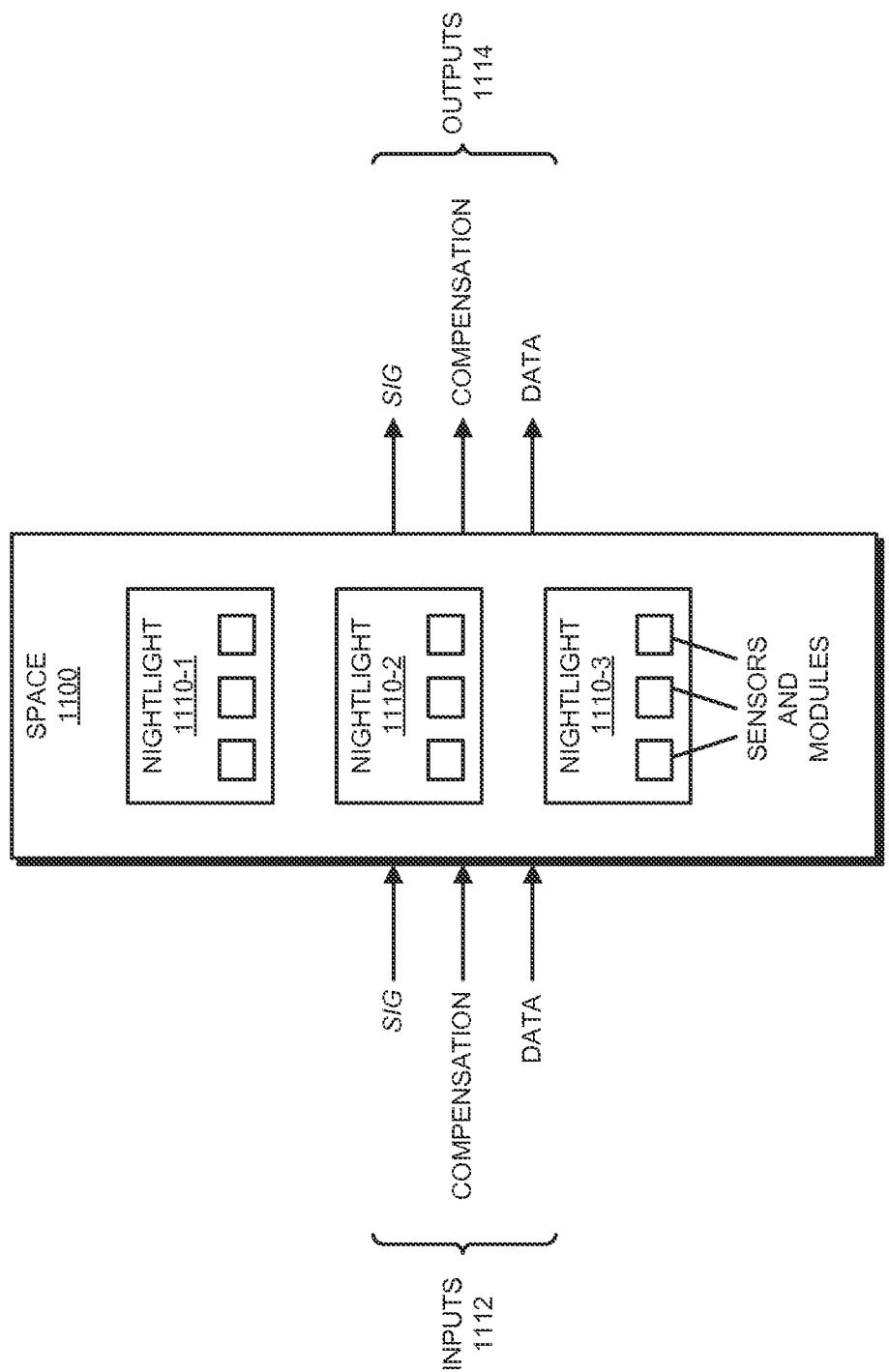
FIG. 11 is a drawing illustrating inputs to and outputs from nightlights in a space in the ecosystem of FIG. 1 in accordance with an embodiment of the present disclosure.

The example of nightlights in an apartment building is shown in FIG. 11, which presents a drawing illustrating inputs to and outputs from nightlights 1110 in a space 1100 (such as a long hallway) in the ecosystem of FIG. 1. Inputs 1112 to nightlights 1110 may include: SIG such as services (upgrades, automation management, relationship management, etc.) and information (such as a notification of an event, a call to action, etc.); compensation information including when (non-recurring or recurring revenue), how (prepaid, credit or debit), what (cash, token or event) and frequency (time period, event or installment); and the data may include events (such as within type, across type, across brand, feature enablement after payment authentication, etc.) and metadata (such as a location, a location size, privacy rights, a nightlight identifier, frequency and quantity of events, user identification, mode, configuration, authorization, etc.). Moreover, outputs 1114 from nightlights 1110 may include: SIG such as services (such as security, batching, safety, timely information communication, batch-access controls based on the space, etc.) and information (such as a notification of an event, a call to action, etc.); compensation information including when (a non-recurring or recurring expense) how (prepaid, credit or debit), what (cash, token or event) and frequency (time period, event or installment); and the data may include events (such as within type, across type, across brand, specified combinations of occurrences to trigger an event, etc.) and metadata (such as: a location, a location size, privacy rights, a nightlight identifier, frequency and quantity of events, user identification, an operating mode, configuration, etc.).

Figure 12:
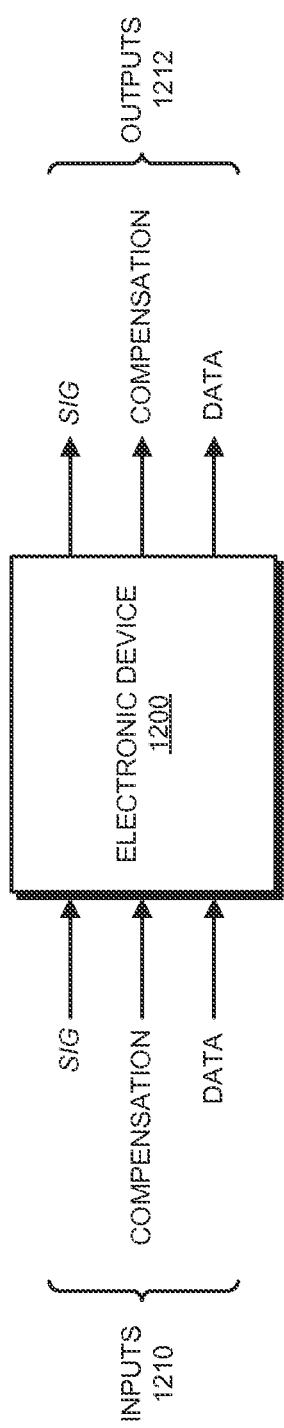
FIG. 12 is a drawing illustrating inputs to and outputs from an electronic device of a user in the ecosystem of FIG. 1 in accordance with an embodiment of the present disclosure.

As shown in FIG. 12, which presents a drawing illustrating inputs to and outputs from an electronic device 1200 of a user in the ecosystem of FIG. 1 (such as an example in which the user entity is a homeowner), inputs 1210 to electronic device 1200 may include: SIG such as services (upgrades, automation management, device-relationship management, etc.) and information (such as a notification of an event, a call to action, etc.); compensation information including when (non-recurring or recurring revenue), how (prepaid, credit or debit), what (cash, token or event) and frequency (time period, event or installment); and the data may include events (such as within type, across type, across brand, etc.) and metadata (such as a location, privacy rights, a nightlight identifier, frequency and quantity of events, user identification, mode, configuration, authorization, etc.). Moreover, outputs 1212 from electronic device 1200 may include: SIG such as services (such as security) and information (such as a notification of an event, a call to action, etc.); compensation information including when (a non-recurring or recurring expense) how (prepaid, credit or debit), what (cash, token or event) and frequency (time period, event or installment); and the data may include events (such as within type, across type, across brand, etc.) and metadata (such as a location, a location size privacy rights, a nightlight identifier, frequency and quantity of events, user identification, a configuration, etc.).

Figure 13:
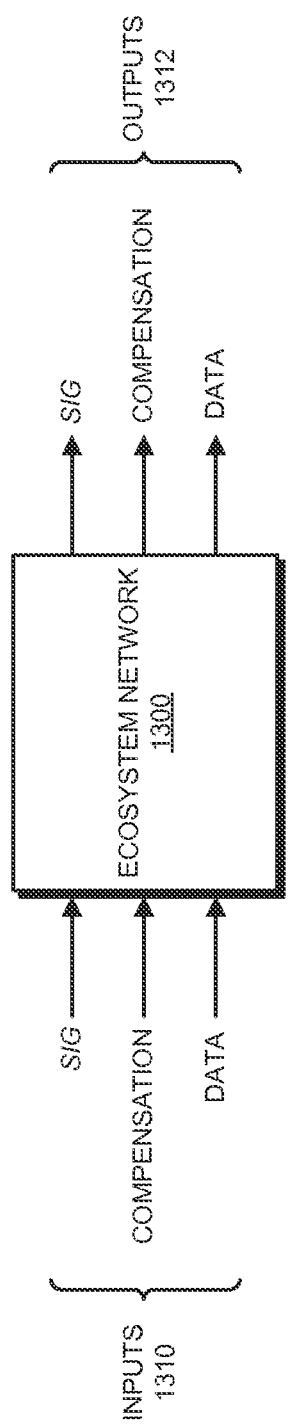
FIG. 13 is a drawing illustrating inputs to and outputs from an ecosystem network from a provider of the ecosystem of FIG. 1 in accordance with an embodiment of the present disclosure.

As shown in FIG. 13, which presents a drawing illustrating inputs to and outputs from an ecosystem network 1300 from a provider of the ecosystem of FIG. 1, inputs 1310 to ecosystem network 1300 may include: SIG such as services (upgrades, automation management, device-relationship management, etc.) and information (such as a notification of an event, a call to action, etc.); compensation information including when (non-recurring or recurring revenue), how (prepaid, credit or debit), what (cash, token or event) and frequency (time period, event or installment); and the data may include events (such as within type, across type, across brand, etc.) and metadata (such as a location, privacy rights, a nightlight identifier, frequency and quantity of events, user identification, mode, configuration, authorization, etc.). Moreover, outputs 1312 from ecosystem network 1300 may include: SIG such as services (such as security, quarantined corruption, high-quality data guaranteed, access and connection to the ecosystem of service providers, partner-anonymized aggregated data, etc.) and information (such as a notification of an event, a call to action, etc.); compensation information including when (a non-recurring or recurring expense) how (prepaid, credit or debit), what (cash, token or event) and frequency (time period, event or installment); and the data may include events (such as within type, across type, across brand, etc.) and metadata (such as a location, a location size privacy rights, a nightlight identifier, frequency and quantity of events, user identification, a configuration, etc.).

Figure 14:
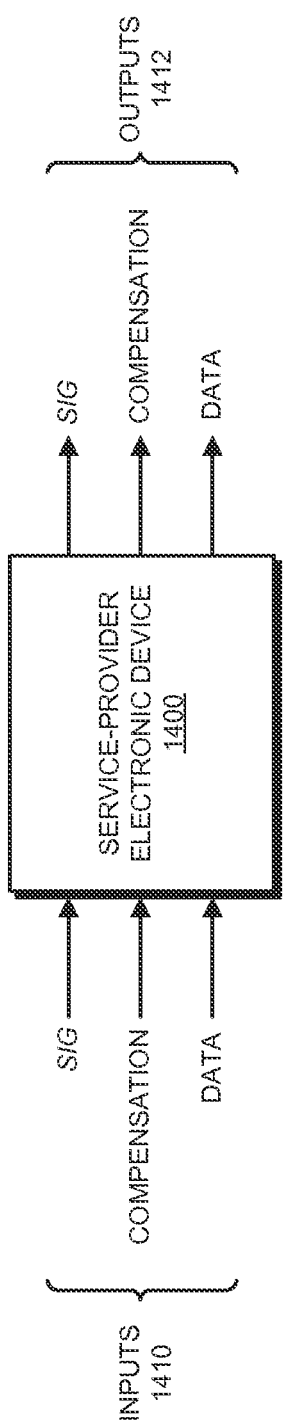
FIG. 14 is a drawing illustrating inputs to and outputs from a service-provider electronic device in the ecosystem of FIG. 1 in accordance with an embodiment of the present disclosure.

As shown in FIG. 14, presents a drawing illustrating inputs to and outputs from a service-provider electronic device 1400 in the ecosystem of FIG. 1, inputs 1410 to service-provider electronic device 1400 may include: SIG such as services (upselling, cross selling, market access, load management, etc.) and information (such as a notification of an event, a call to action, etc.); compensation information including when (non-recurring or recurring revenue), how (prepaid, credit or debit), what (cash, token or event) and frequency (time period, event or installment); and the data may include user-entity information (such as a location, a user identifier, assignment, timing, access, etc.) and supply information (such as identification, specifications, etc.). Moreover, outputs 1412 from service-provider electronic device 1400 may include: SIG such as services (such as security, safety, quality guarantee, etc.) and information (such as a notification of an event, a call to action, etc.); compensation information including when (a non-recurring or recurring expense) how (prepaid, credit or debit), what (cash, token or event) and frequency (time period, event or installment); and the data may include offerings (such as services offered, constraints, timing, location, quantities, frequency, load, confirmation, status, etc.).

Figure 15:
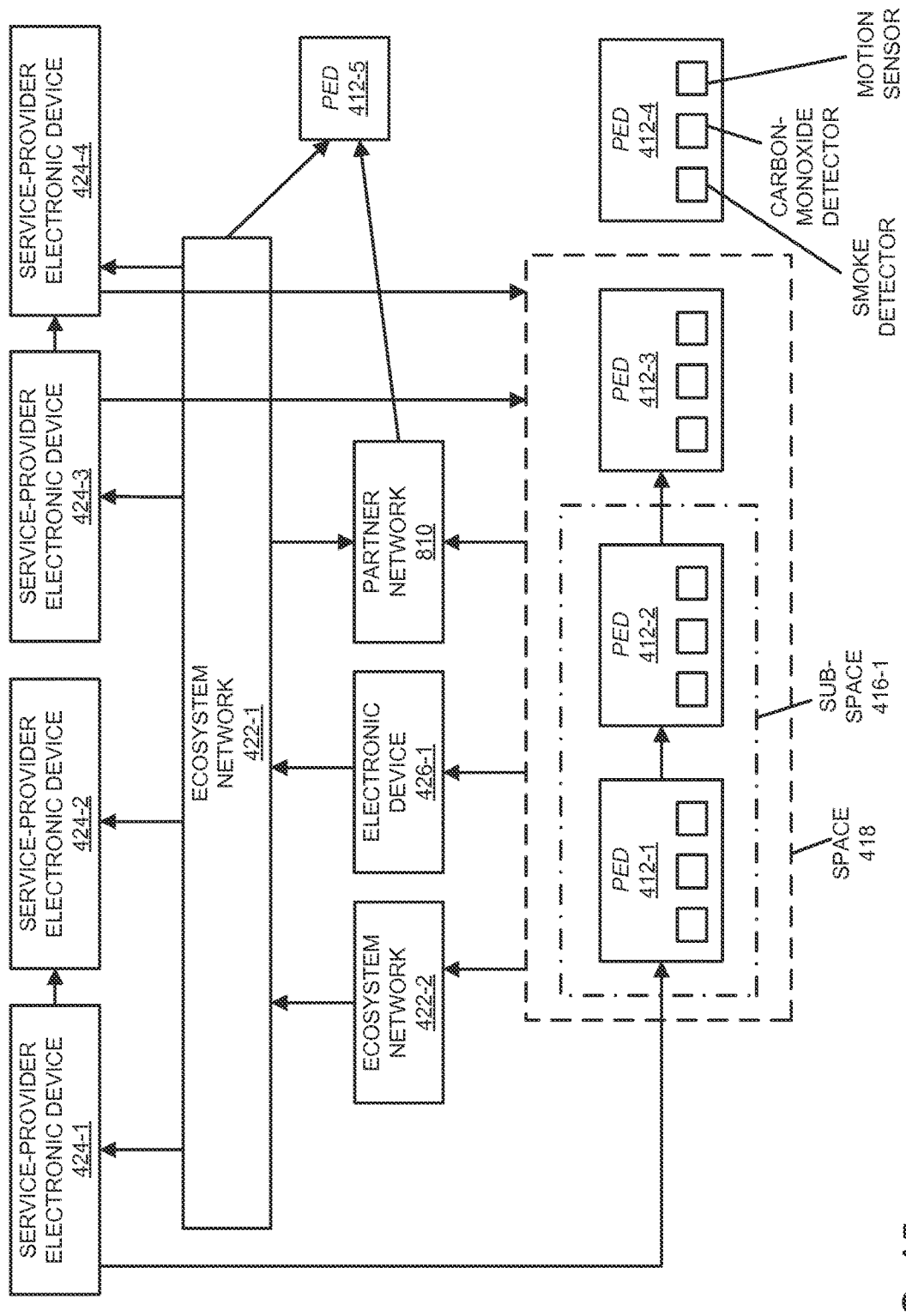
FIG. 15 is a drawing illustrating layers with electronic devices of a partner of a provider of the ecosystem of FIG. 1 in accordance with an embodiment of the present disclosure.

FIG. 15 presents a drawing illustrating layers with electronic devices of a partner of a provider of the ecosystem of FIG. 1. In particular, partner electronic devices 412 may include a combined smoke detector, carbon-monoxide detector and motion sensor. The provider of the ecosystem may pay the partner to include one or more of these sensors in partner electronic devices 412. Moreover, one of service-providers electronic devices 424 (such as a security service) may work with the partner to exchange sensor data, goods and service, and compensation via the ecosystem. Partner electronic devices 412 may communicate with each other about: their location, battery status, sensor data, user-access rights, motion detection data (such as where each user is, etc.). The sensor data can be transmitted redundantly to verify data quality and ensure that important real-time sensor data is received.

One or more of partner electronic devices 412 in the external environment or the space may communicate sensor data and/or environmental conditions with electronic device 426-1 and/or ecosystem networks 422 (which may record and process the sensor data, and may determine if a notification needs to be sent out the ecosystem). Moreover, one or more of partner electronic devices 412 may exchange share information with the partner and/or the partner may receive information from the ecosystem. The partner may use the sensor data to offer an emergency-monitoring service.

Furthermore, a homeowner may pay for a security-monitoring service using the motion sensors in partner electronic devices 412. The provider of the ecosystem may: pay a retailer in the service providers for replacement batteries, upgraded smoke alarms or additional smoke alarms that are shipped to the space (such as a home); pay an installation service in the service providers a monthly fee (or a rebate to a landlord), a prepaid fee for a number of notifications, or an initial payment or discount as an incentive to install partner electronic devices 412; notify and pay the security service for security-officer patrols and visits to the space; notify the emergency-monitoring service, which may prompt a visit from emergency personnel to the space. In addition, note that the provider of the ecosystem may share revenue with the partner in exchange for motion-sensor data from partner electronic devices 412.

Note that the margins in the preceding example may be associated with a bulk service agreement with the security service, in which the security service is paid per event, and a subscription fee can be charged to each individual user. Alternatively, there can be a flat subscription fee charged by the security service per user, and with some markup charged by the provider of the ecosystem as a subscription fee. In addition, the provider of the ecosystem can charge customers per event or per usage. For example, with a remote cabin that is visited once a year, and that has, on average, one or two alerts per year, a full subscription service may not be worth it. However, a subscription 'lite' service or a fixed number of notifications with an offer to 'top up' or upgrade the service to a full subscription as needed may be more useful for a user, or may be perceived as a better value for the user.

The inputs to the partner electronic device may include: SIG (such as space overview, a full-system fire test for the space, firmware updates to support, space-specific features, custom configurations between products and spaces, e.g., sprinkler programming); compensation (such as credit-card registration, prepayments, gift cards, service value tokens or other cash equivalent to purchase subscriptions or on-demand services); and the data (such as a Global Positioning System location, authorized users, a sound profile, acoustic transfer function or characterization of the space, configurations, connections between devices, connections between spaces, privacy rights for users, devices, identifying parameters for a sub-space within the space and for the space, a device identifier, location naming, etc.). Moreover, the outputs to the partner electronic device may include: SIG (such as the space provides protection, shelter, security, safety, storage, etc.); compensation (such as the space can be rented out for living, hotel stay, events, storage or other purposes, notifications of security breaches, etc.); and the data (such as a Global Positioning System location, authorized users, guests, privacy rights, identifying parameters, a size of the space, user preferences, etc.).

Figure 16:
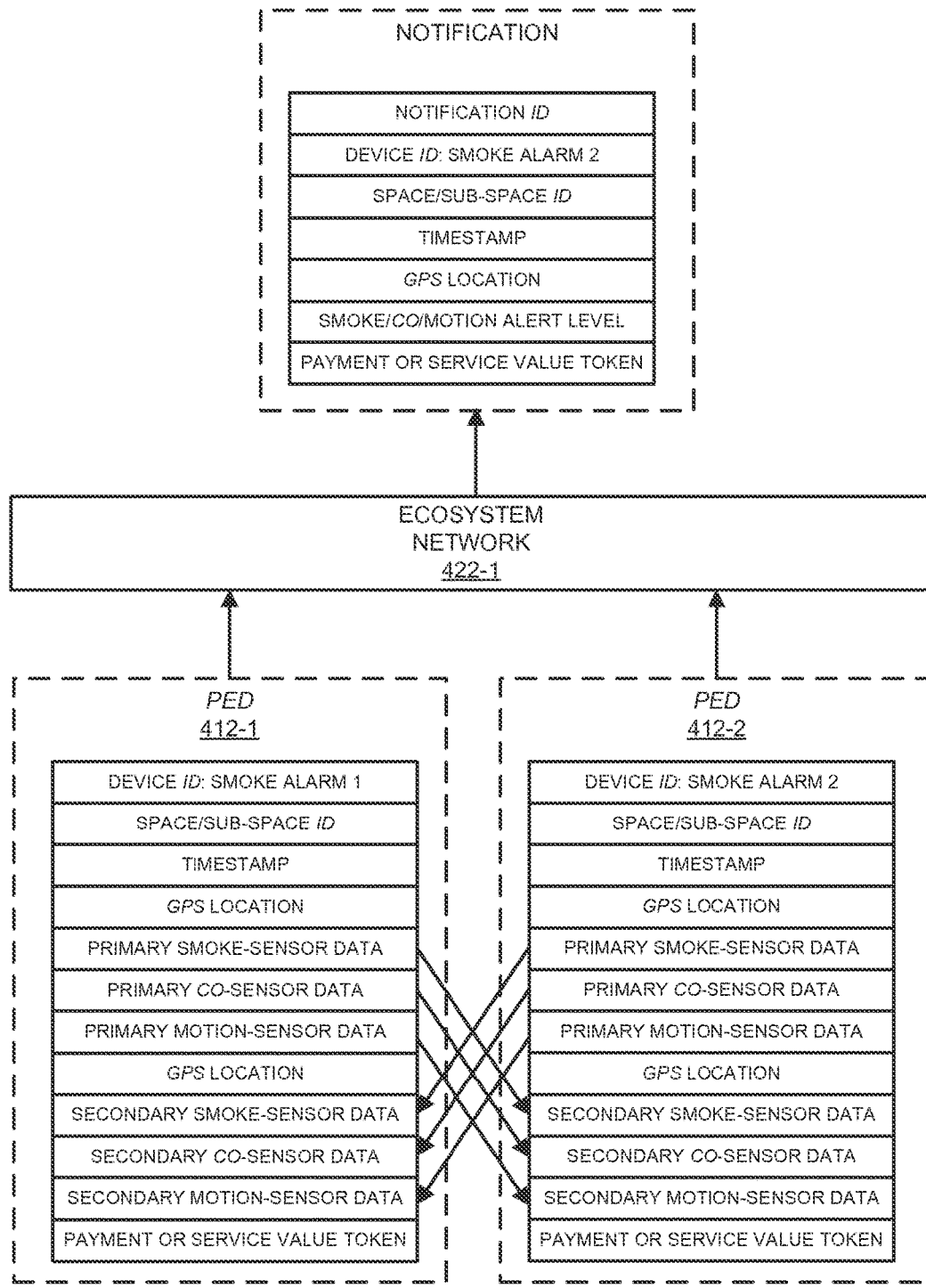
FIG. 16 is a drawing illustrating communication among components in the ecosystem of FIG. 1 in accordance with an embodiment of the present disclosure.

Data flow in the service hierarchy in the example of FIG. 15 is shown in FIG. 16, which presents a drawing illustrating communication among components in the ecosystem of FIG. 1. Note that in this example, partner electronic devices may mesh or combine their sensor data together (from primary to secondary storage) for redundant data transmission and improved reliability using possibly existing mesh network or communication techniques such as Zigbee® or Z-wave.

Figure 17:
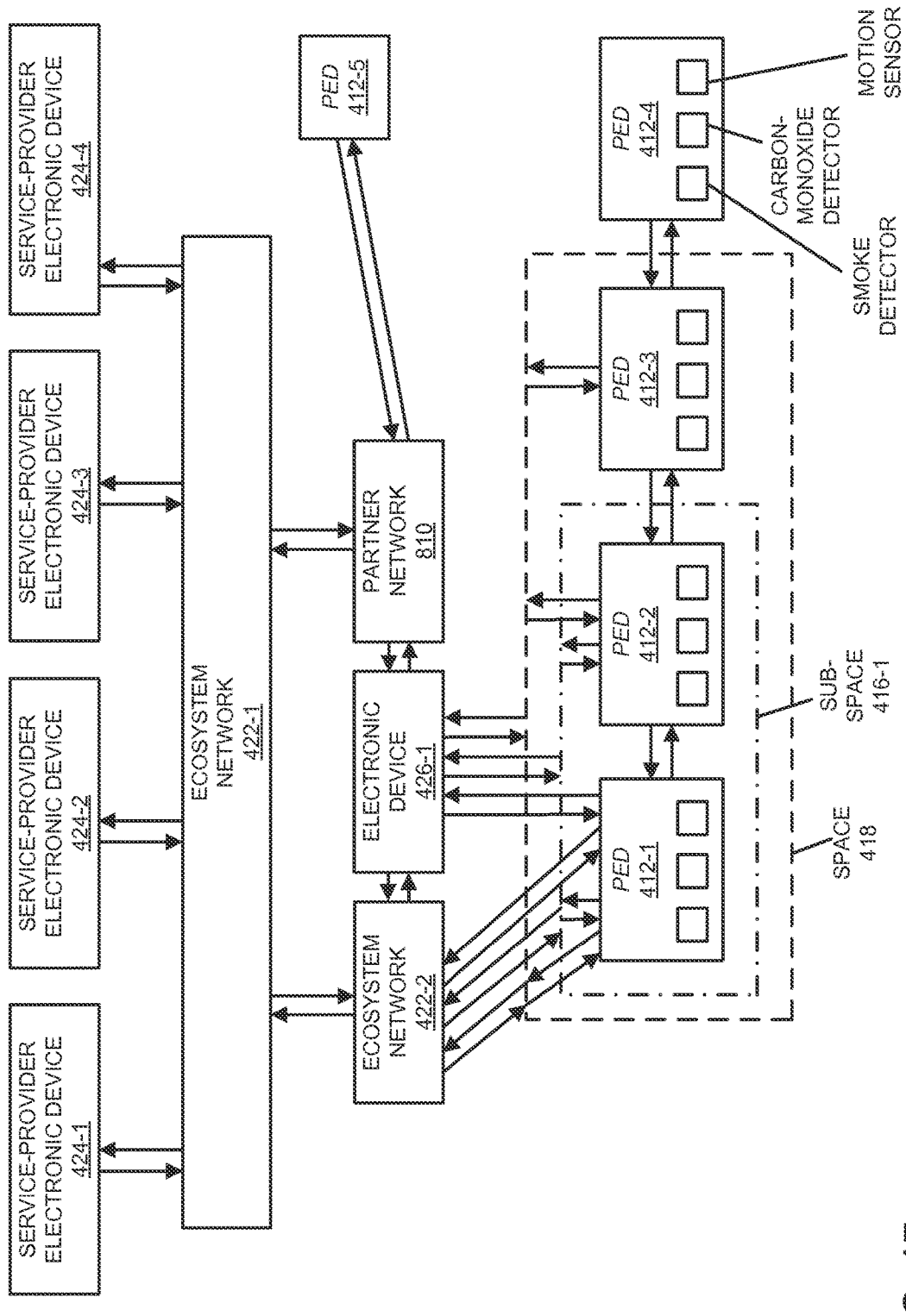
FIG. 17 is a drawing illustrating communication among components in the ecosystem of FIG. 1 in accordance with an embodiment of the present disclosure.
Figure 18:
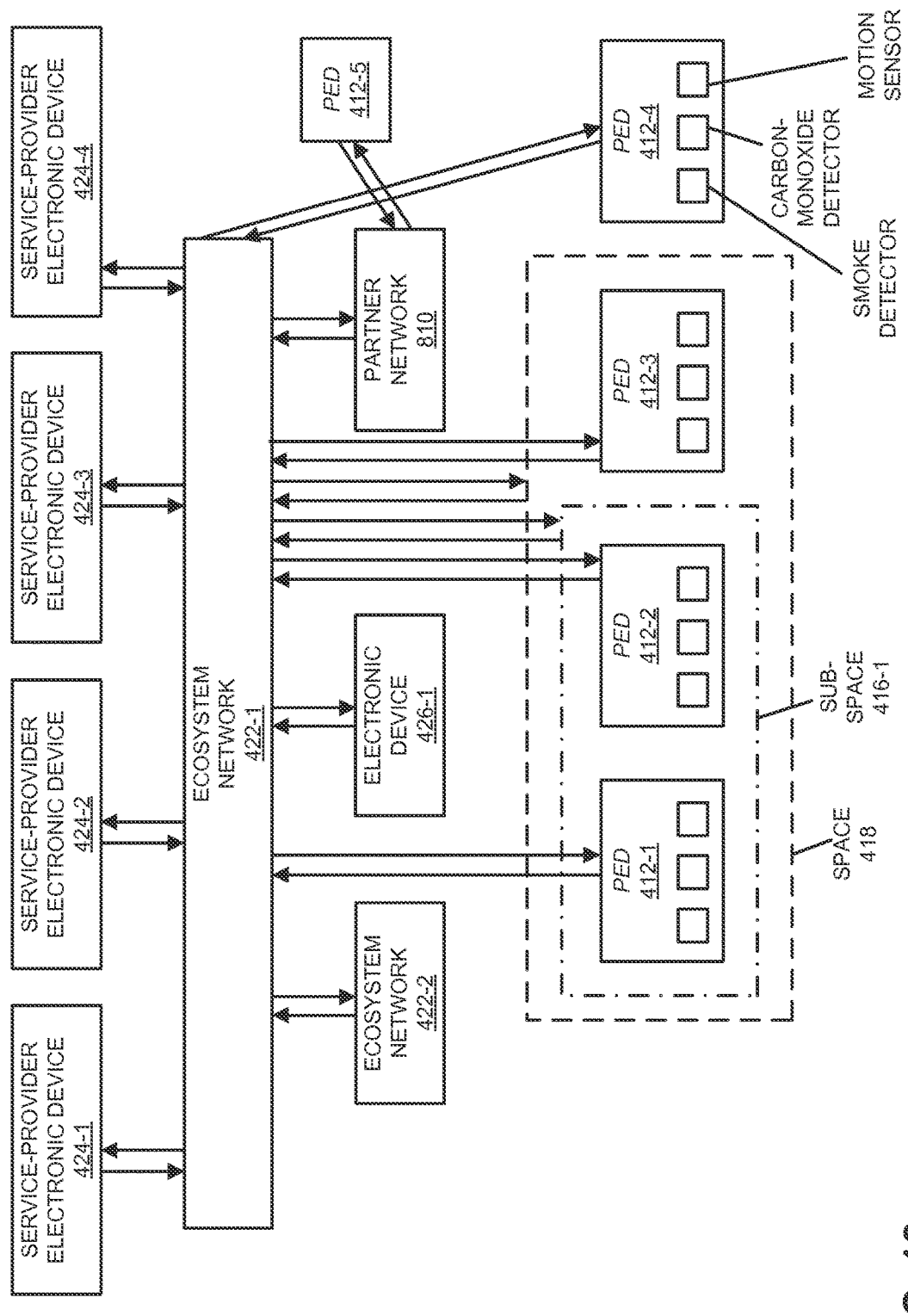
FIG. 18 is a drawing illustrating communication among components in the ecosystem of FIG. 1 in accordance with an embodiment of the present disclosure.

Data flow in the service hierarchy in the example of FIG. 15 is also shown in FIG. 17, which presents a drawing illustrating communication among components in the ecosystem of FIG. 1. Moreover, compensation flow in the service hierarchy in the example of FIG. 15 is shown in FIG. 18, which presents a drawing illustrating communication among components in the ecosystem of FIG. 1. Note that, in general, SIG may flow or be exchanged between any pair of the components in the service hierarchy in the example of FIG. 15.

Figure 19:
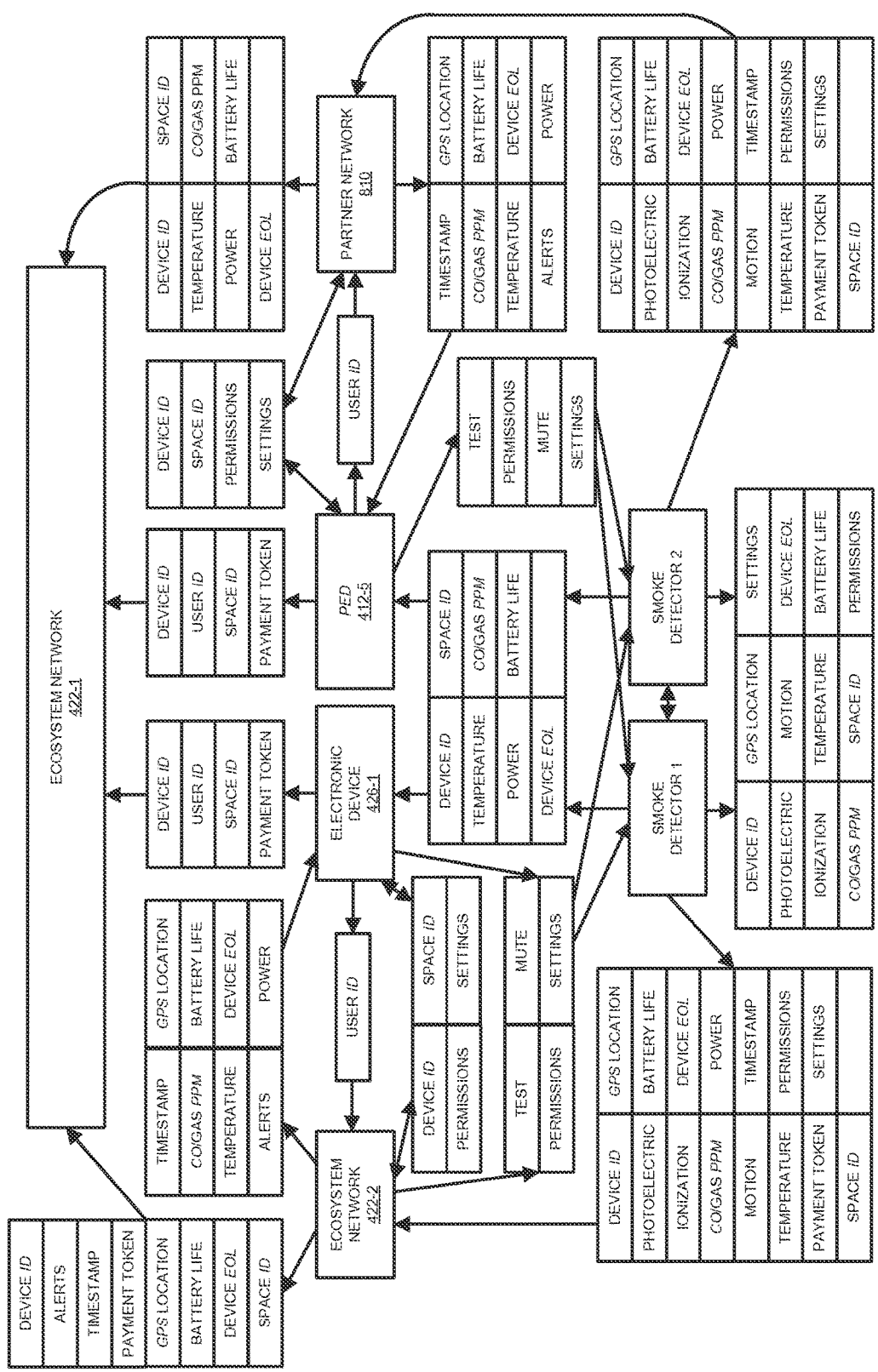
FIG. 19 is a drawing illustrating communication among components in the ecosystem of FIG. 1 in accordance with an embodiment of the present disclosure.

Datagram flows between some of the components in the service hierarchy in the example of FIG. 15 are shown in FIG. 19, which presents a drawing illustrating communication among components in the ecosystem of FIG. 1. The datagrams include permissions as well as sensor data. In some embodiments, the datagrams include encryption keys.

Figure 20:
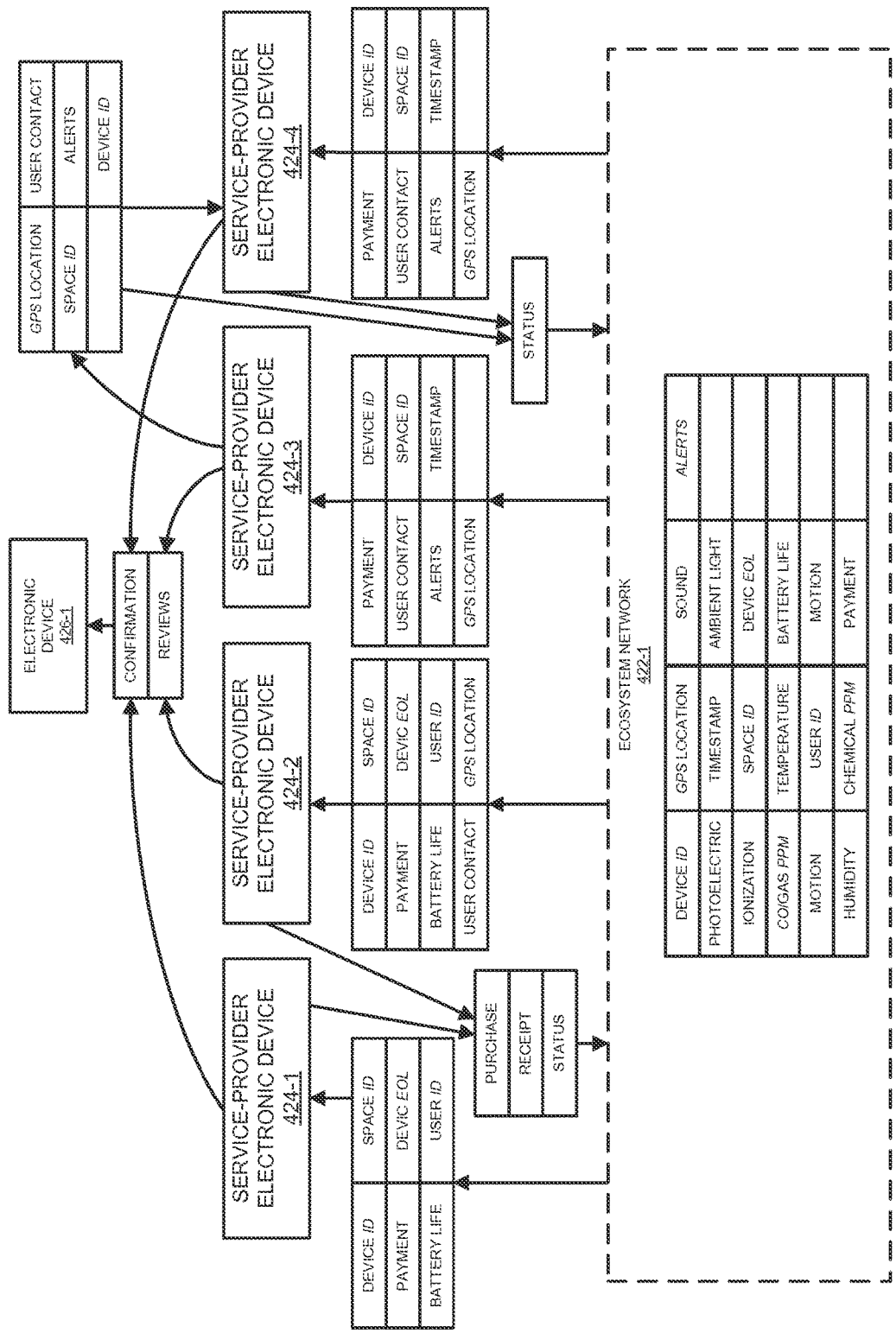
FIG. 20 is a drawing illustrating communication among components in the ecosystem of FIG. 1 in accordance with an embodiment of the present disclosure.
Figure 21:
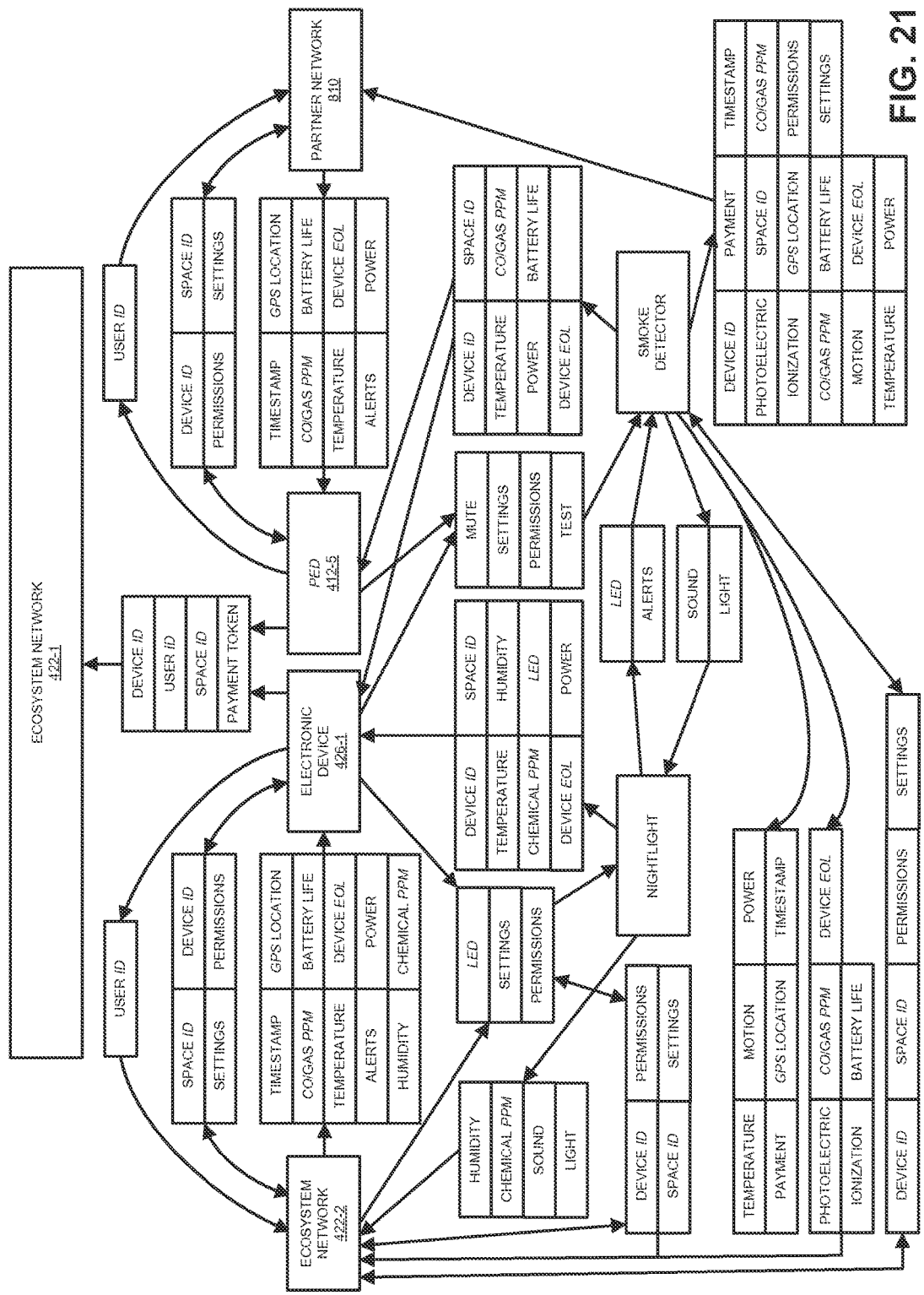
FIG. 21 is a drawing illustrating communication among components in the ecosystem of FIG. 1 in accordance with an embodiment of the present disclosure.

An embodiment of datagram flows between additional components in the service hierarchy in the example of FIG. 15 are shown in FIG. 20, which presents a drawing illustrating communication among components in the ecosystem of FIG. 1. Another embodiment of datagram flows between some of the components in the service hierarchy in the example of FIG. 15 are shown in FIG. 21, which presents a drawing illustrating communication among components in the ecosystem of FIG. 1.

Figure 22:
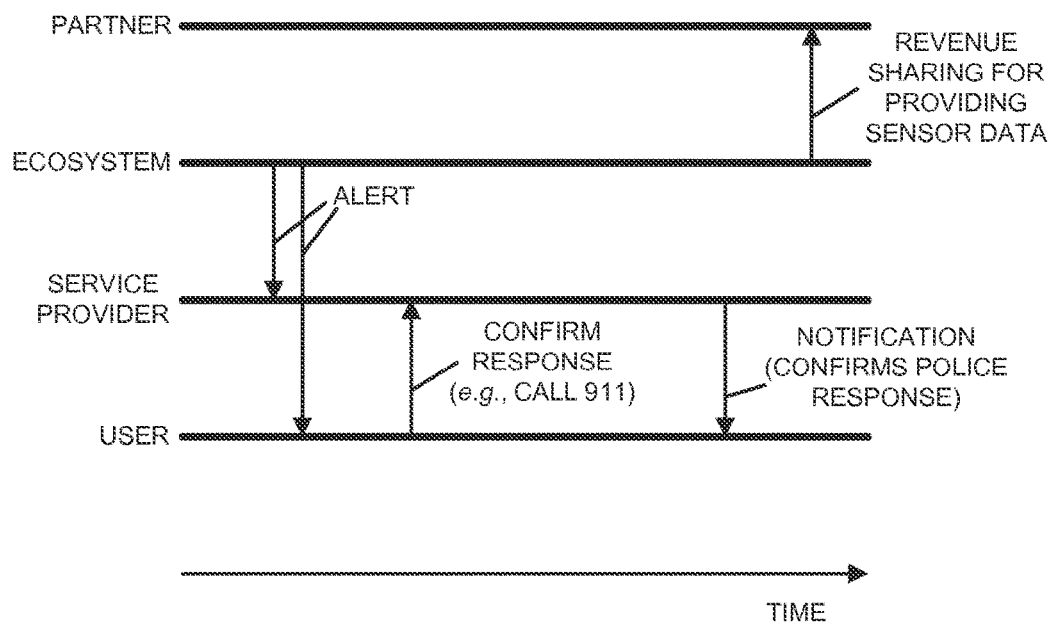
FIG. 22 is a timing diagram illustrating communication among components in the ecosystem of FIG. 1 in accordance with an embodiment of the present disclosure.
Figure 23:
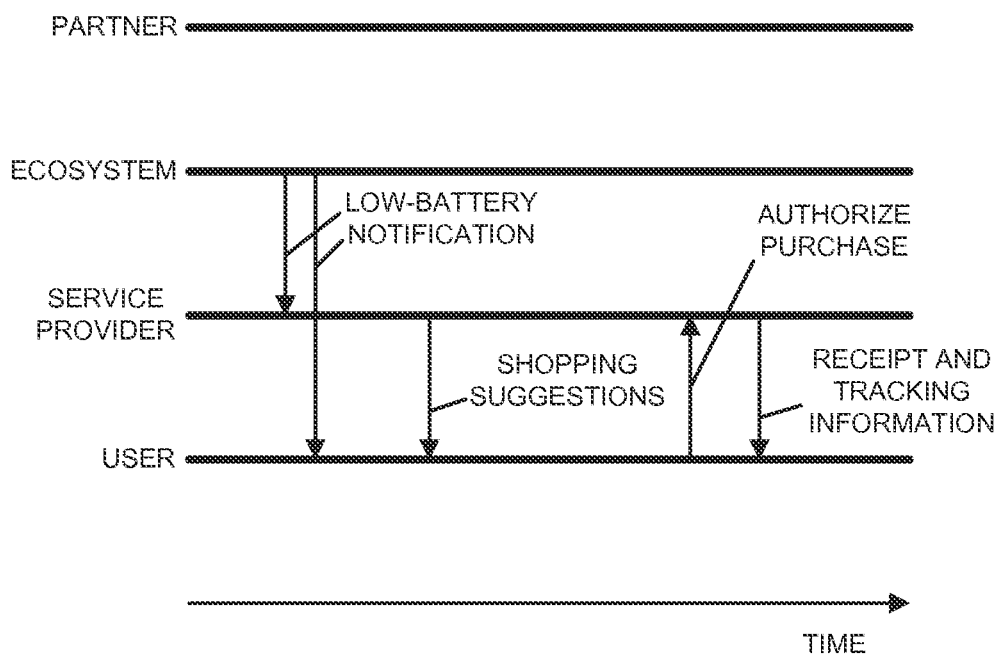
FIG. 23 is a timing diagram illustrating communication among components in the ecosystem of FIG. 1 in accordance with an embodiment of the present disclosure.
Figure 24:
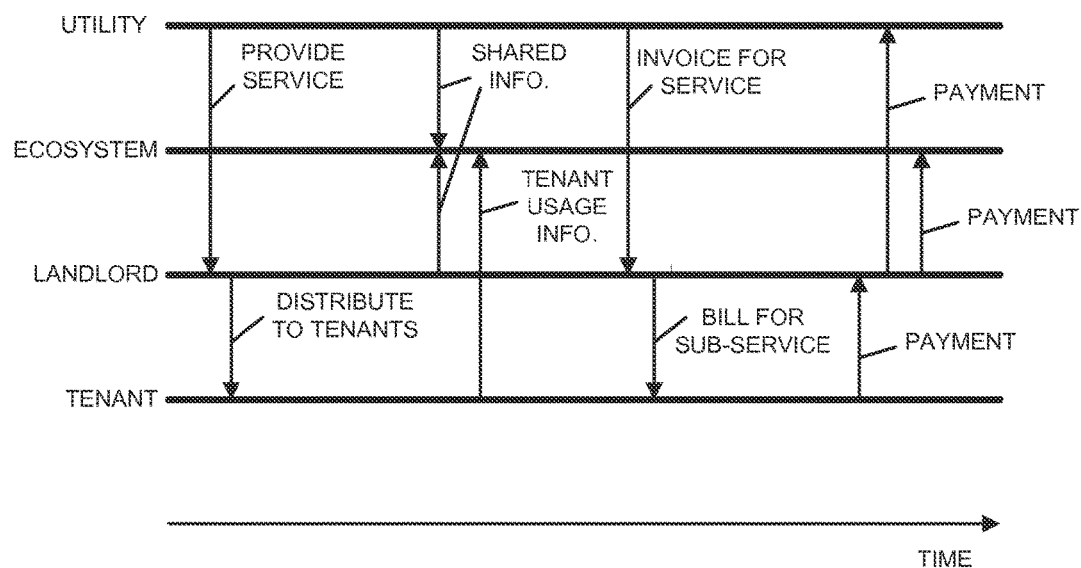
FIG. 24 is a timing diagram illustrating communication among components in the ecosystem of FIG. 1 in accordance with an embodiment of the present disclosure.
Figure 25:
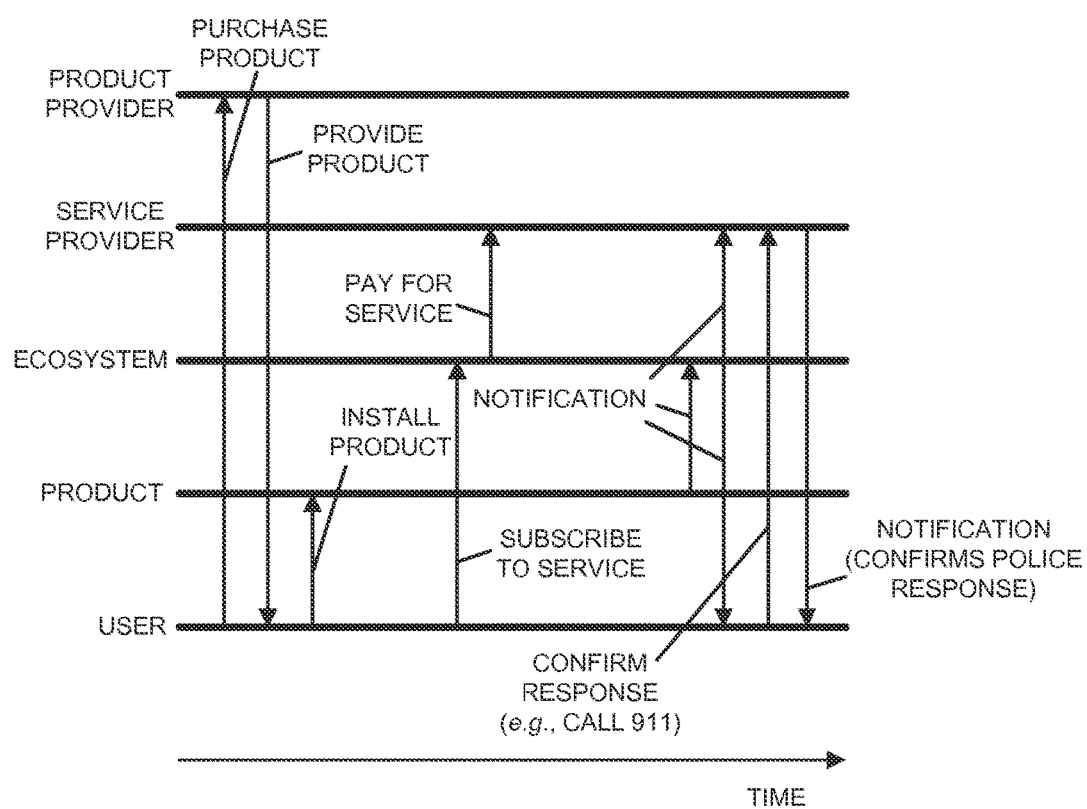
FIG. 25 is a timing diagram illustrating communication among components in the ecosystem of FIG. 1 in accordance with an embodiment of the present disclosure.

We now describe examples of timing diagrams during different types of services. FIG. 22 presents a timing diagram illustrating communication among components in the ecosystem of FIG. 1 for an alarm service. Moreover, FIG. 23 presents a timing diagram illustrating communication among components in the ecosystem of FIG. 1 for a product shipment or service scheduling in a retail service. Furthermore, FIG. 24 presents a timing diagram illustrating communication among components in the ecosystem of FIG. 1 during a utility metering service. Additionally, FIG. 25 presents a timing diagram illustrating communication among components in the ecosystem of FIG. 1 during service origination, installation and/or registration.

Figure 26:
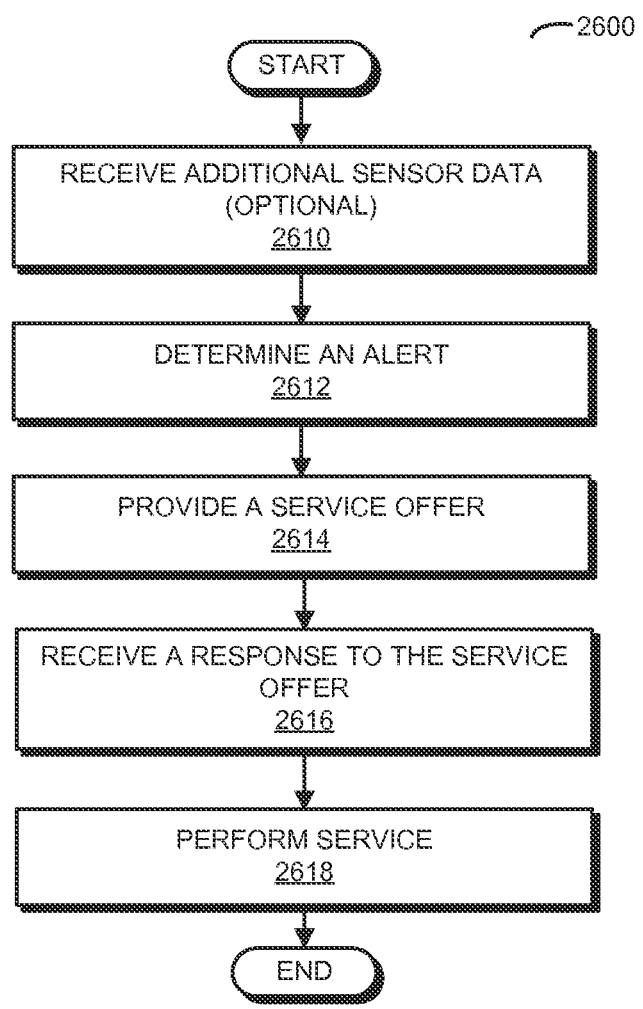
FIG. 26 is a flow diagram illustrating a method for providing a service in the ecosystem of FIG. 1 in accordance with an embodiment of the present disclosure.

We now describe embodiments of service techniques that can be performed using components in the ecosystem. FIG. 26 presents a flow diagram illustrating a method 2600 for providing a service in response to an alert in the ecosystem of FIG. 1, which may be performed by an environmental monitoring device (such as one of environmental monitoring devices 110 in FIG. 1). During operation, the environmental monitoring device determines, based on sensor data representing an environmental condition in an external environment that is provided by a sensor mechanism in the environmental monitoring device, the alert (operation 2612) associated with the environmental condition and/or the external environment. For example, the environmental monitoring device may receive the sensor data from the sensor mechanism and/or may access sensor data that is stored in memory.

Then, the environmental monitoring device provides, via an interface circuit in the environmental monitoring device, a service offer (operation 2614) to an electronic device based on the alert, where the service offer includes information associated with the environmental condition (e.g., the information may indicate the environmental condition is present or may indicate that, if the service offer is accepted, information about the environmental condition will be provided), and the electronic device is of an entity that is associated with the external environment (such as a cellular telephone of a user entity, e.g., a user or an owner of the environmental monitoring device, a tenant, a property owner, a landlord, maintenance personnel, and/or a property manager). Moreover, the environmental monitoring device receives, via the interface circuit, a response to the service offer (operation 2616) from the electronic device, where the response authorizes a service based on the environmental condition.

Next, the environmental monitoring device performs the service (operation 2618). Note that the service may include providing the alert. For example, the environmental monitoring device may communicate the alert to the electronic device. Alternatively or additionally, during the service the environmental monitoring device may provide an instruction to a regulator device in the external environment to modify the environmental condition, where the regulator device may be associated with a second entity (such as a regulator entity) that is different from the entity and a provider of the environmental monitoring device. This instruction may include compensation (or information specifying the compensation, such as a credit to a particular financial account or a payment from a financial vehicle, e.g., a debit card or a credit card) for the second entity. In particular, the compensation may be for: modifying the environmental condition on a per-alert basis; and/or modifying the environmental condition during at least a time interval (such as an hour, a day, a week, a month, while the entity is present in the external environment, while the entity is absent from the external environment, etc.). In some embodiments, the service includes insurance for: an item in the external environment, a portion of the external environment (such as a room in a building), and/or the external environment.

Moreover, note that the service may be provided on a per-alert basis. Alternatively or additionally, the service may be selectively provided as a function of time based on the environmental condition (such as when there are occurrences of the environmental condition or when the environmental condition is absent). Thus, in some embodiments, the service is provided as needed. In some embodiments, a user can opt-in or opt-out of a per-alert service plan.

Furthermore, a spatial extent of the service in the external environment may be varied as a function of time based on the environmental condition. For example, the service may be extended to different rooms in a house or a building when the environmental condition is present or absent.

Additionally, performing the service (operation 2618) may involve: downloading software for the environmental monitoring device (such as a software upgrade or antivirus software) that, when executed by the environmental monitoring device, performs the service; and/or enabling a software module in the environmental monitoring device (i.e., that is already installed in the environmental monitoring device) that, when executed by the environmental monitoring device, performs the service. Thus, performing the service (operation 2618) may involve obtaining or activating additional functionality of the environmental monitoring device, such as a different sensor capability or a different sensor-data analysis capability.

In some embodiments, performing the service (operation 2618) involves: communicating the sensor data to another electronic device of the second entity or a third entity (such as a service provider or a partner entity), which may be different from the entity; and providing compensation for the sensor data to: the electronic device, and/or an account-management computer system that manages a financial account associated with the entity. For example, the environmental monitoring device may provide the sensor data to the regulator device, which allows the regulator device to modify the environmental condition (e.g., using a feedback-control system). In exchange for providing the sensor data that enables the service in this example, the entity may be compensated or may receive a credit in their financial account. In some embodiments, the entity is compensated with a credit in a non-financial account, such as a scoreboard, or a credit of services from a service provider or a partner entity.

Furthermore, the environmental monitoring device may optionally receive additional sensor data (operation 2610) from other environmental sensors in other environments, and the determination (operation 2612) may be based on the additional sensor data. Thus, the environmental monitoring device may use a collaborative filtering technique to make the determination. For example, sensor data from environmental monitoring devices in other rooms or houses in a neighborhood may be used to determine if the environmental condition (such as a regional power failure) is present.

Figure 27:
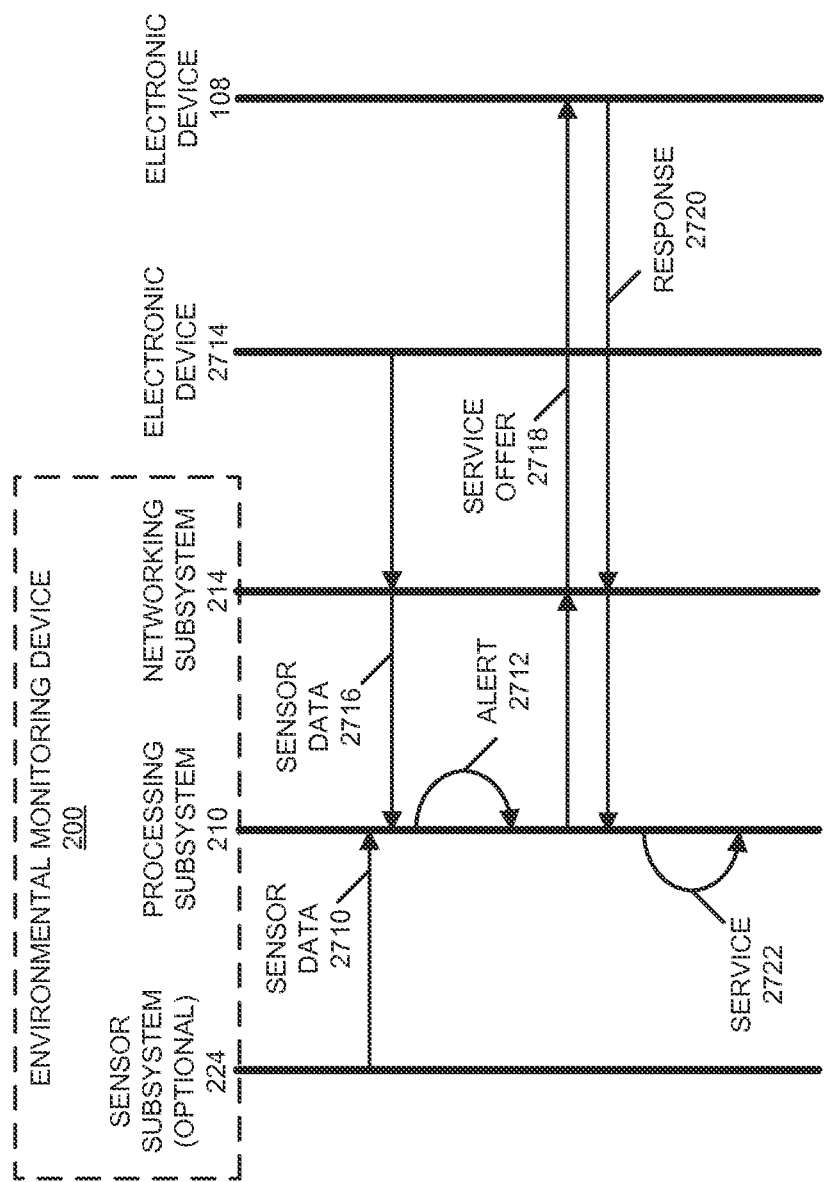
FIG. 27 is a drawing illustrating communication among components in an ecosystem during the method of FIG. 26 in accordance with an embodiment of the present disclosure.

FIG. 27 presents a drawing illustrating communication among components in an ecosystem during method 2600 (FIG. 26). In particular, optional sensor subsystem 224 in environmental monitoring device 200 may provide sensor data 2710 to processing subsystem 210. Then, processing subsystem 210 may analyze sensor data 2710, and may determine alert 2712 based on the environmental condition in the external environment of environmental monitoring device 200. In some embodiments, at least another environmental monitoring device, such as environmental monitoring device 2714, in the same or a different external environment optionally provides sensor data 2716 to environmental monitoring device 200. Networking subsystem 214 may receive sensor data 2716 and may provide sensor data 2716 to processing subsystem 210, which uses sensor data 2716 when determining alert 2712.

Moreover, processing subsystem 210 may provide service offer 2718 for service 2722 to networking subsystem 214. Next, networking subsystem 214 may communicate service offer 2718 to electronic device 108. Subsequently, electronic device 108 may provide response 2720 authorizing service 2722 to networking subsystem 214, which forwards response 2720 to processing subsystem 210. In response, processing subsystem 210 performs service 2722.

Figure 28:
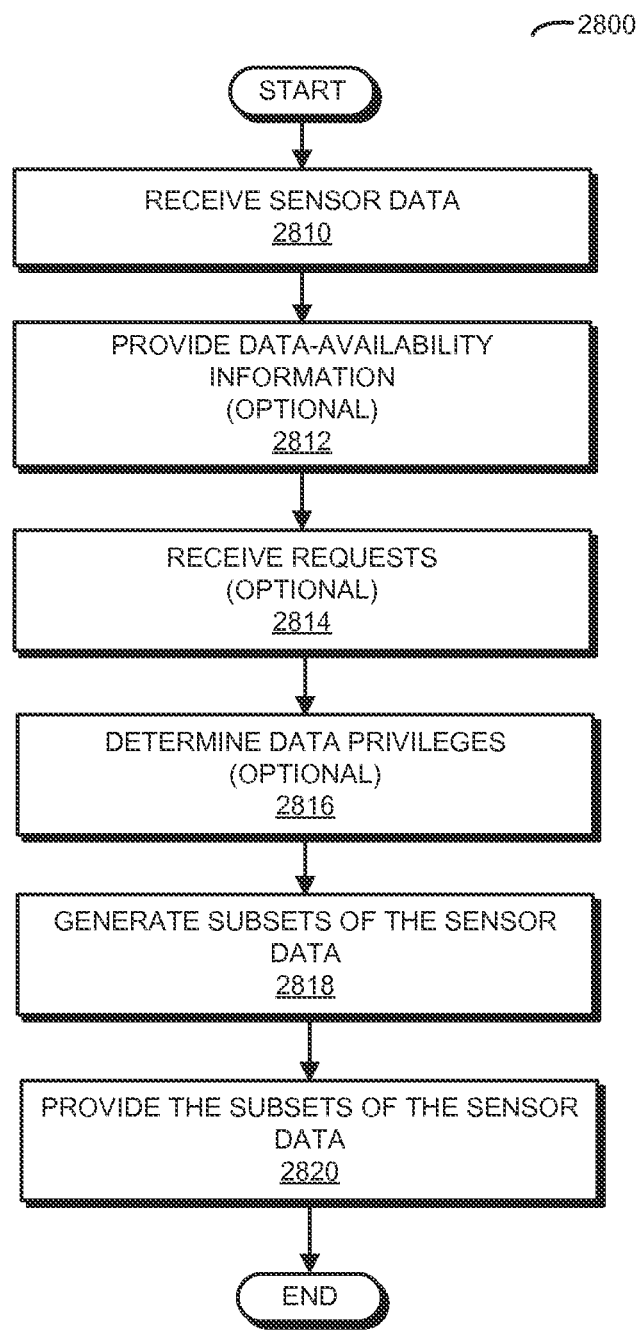
FIG. 28 is a flow diagram illustrating a method for providing subsets of sensor data in the ecosystem of FIG. 1 in accordance with an embodiment of the present disclosure.

FIG. 28 presents a flow diagram illustrating a method 2800 for providing subsets of sensor data based on data privileges in the ecosystem of FIG. 1, which may be performed by an environmental monitoring device (such as one of environmental monitoring devices 110 in FIG. 1). During operation, the environmental monitoring device receives sensor data (operation 2810) representing an environmental condition in an external environment that is provided by a sensor mechanism in the environmental monitoring device. For example, the environmental monitoring device may receive the sensor data from the sensor mechanism and/or may access sensor data that is stored in memory.

Then, the environmental monitoring device generates the subsets of the sensor data (operation 2818) based on the data privileges of entities, where the data privileges of at least some of the entities are different and at least some of the corresponding subsets of the sensor data are different. For example, the entities may include two or more of: a tenant in the external environment, a property manager of the external environment, an owner of the external environment (such as a landlord), and maintenance personnel who maintain the external environment.

Next, the environmental monitoring device provides, via an interface circuit in the environmental monitoring device, the subsets of the sensor data (operation 2820) to electronic devices of the entities.

Moreover, the environmental monitoring device may: optionally provide, via the interface circuit, data-availability information (operation 2812) specifying available sensor data for the external environment; and optionally receive, via the interface circuit, requests (operation 2814) from the electronic devices in response to the data-availability information, where the data privileges correspond to the requests. For example, the data privileges may be specified in the requests. Alternatively or additionally, the environmental monitoring device may optionally determine the data privileges (operation 2816) based on the requests. In particular, the data privileges of an entity may be determined based on the entity and the requested data (such as the type of data). Note that the data-availability information may be provided to: the electronic devices, and/or a system that implements a sensor-data marketplace, which allows the entities to determine the sensor data that is available.

In some embodiments, the data privileges vary as a function of: time, and/or the environmental condition. Thus, an entity may have access to different sensor data at different times of the day and/or when the environmental condition is present or absent (such as when a fire alarm or a carbon-monoxide detector is sounding an alarm). Moreover, the data privileges may specify: different spatial extents in the external environment monitored by the sensor mechanism; and/or different types of information associated with the external environment. For example, an entity (such as a landlord) may have access to sensor data for a rental property at certain times of day or when the tenants are not present. Similarly, a tenant may have full access to the sensor data from the rental property, while a landlord may have access to sensor data that indicates an emergency (such as a fire or carbon monoxide) and/or the availability or quality of certain services (such as hot water, heating and air conditioning).

In an exemplary embodiment, environmental monitoring devices are included in retail stores and a warehouse. The ecosystem may aggregate and maintain the monitored sensor data and environmental conditions. User entities in this embodiment may include: a warehouse, a retail store and a trucking service. The ecosystem may have different data privileges for these user entities, including: general data privileges, warehouse access rights, and trucking access rights. Service providers in this example may include: a supplier, a logistics service, a consumer-rating service and the corporate headquarters of the retailer. This service hierarchy may facilitate supply-chain management.

Figure 29:
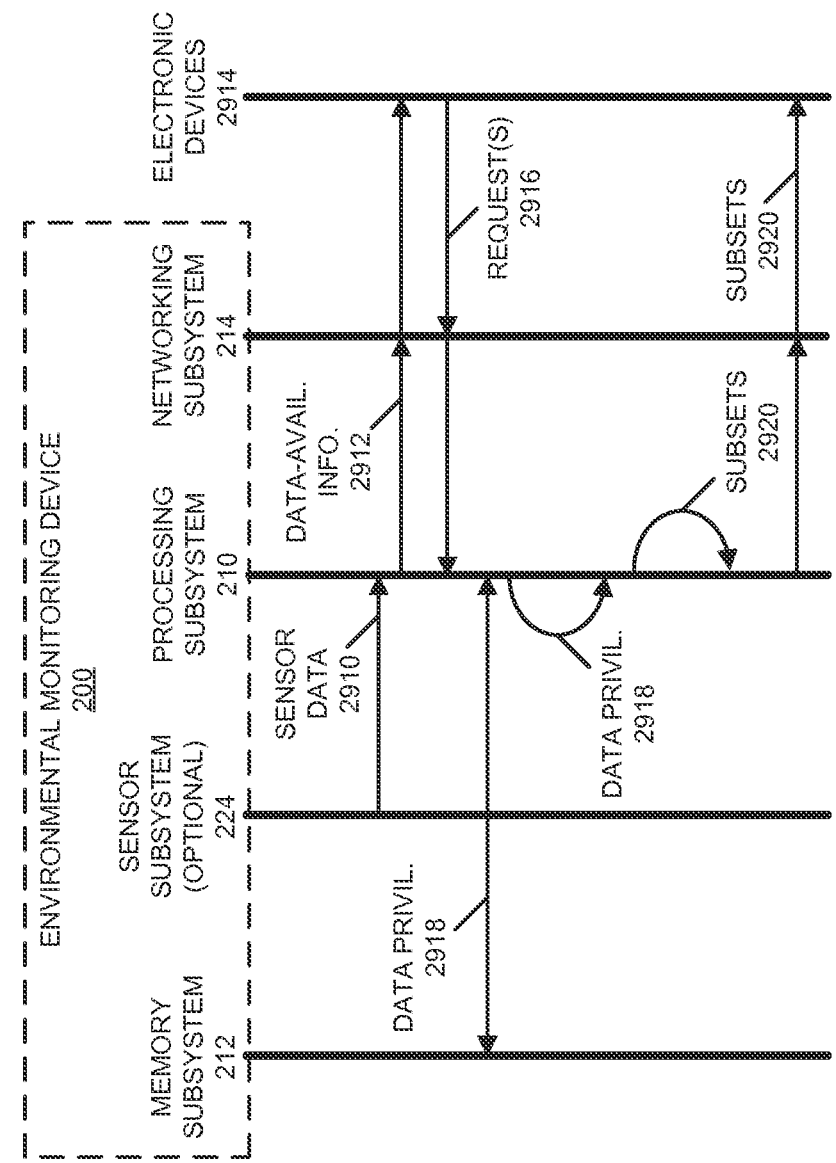
FIG. 29 is a drawing illustrating communication among components in an ecosystem during the method of FIG. 28 in accordance with an embodiment of the present disclosure.

FIG. 29 presents a drawing illustrating communication among components in an ecosystem during method 2800 (FIG. 28). In particular, optional sensor subsystem 224 in environmental monitoring device 200 may provide sensor data 2910 to processing subsystem 210. Then, processing subsystem 210 may optionally provide data-availability information 2912 to networking subsystem 214, which may optionally provide data-availability information 2912 to electronic devices 2914 of entities and/or a sensor-data marketplace.

Moreover, one or more of electronic devices 2914 may optionally provide one or more requests 2916. In response to networking subsystem 214 receiving the one or more requests 2916 and forwarding the one or more requests 2916 to processing subsystem 210, processing subsystem 210 may optionally determine data privileges 2918. Alternatively or additionally, processing subsystem 210 may optionally access predefined data privileges 2918 in memory subsystem 212. However, in some embodiments data privileges 2918 are included in the one or more requests 2916.

Next, processing subsystem 210 may generate subsets 2920 of sensor data 2910 based on data privileges 2918 of the entities, and may, via networking subsystem 214, provide one or more of subsets 2920 to one or more of electronic devices 2914.

Figure 30:
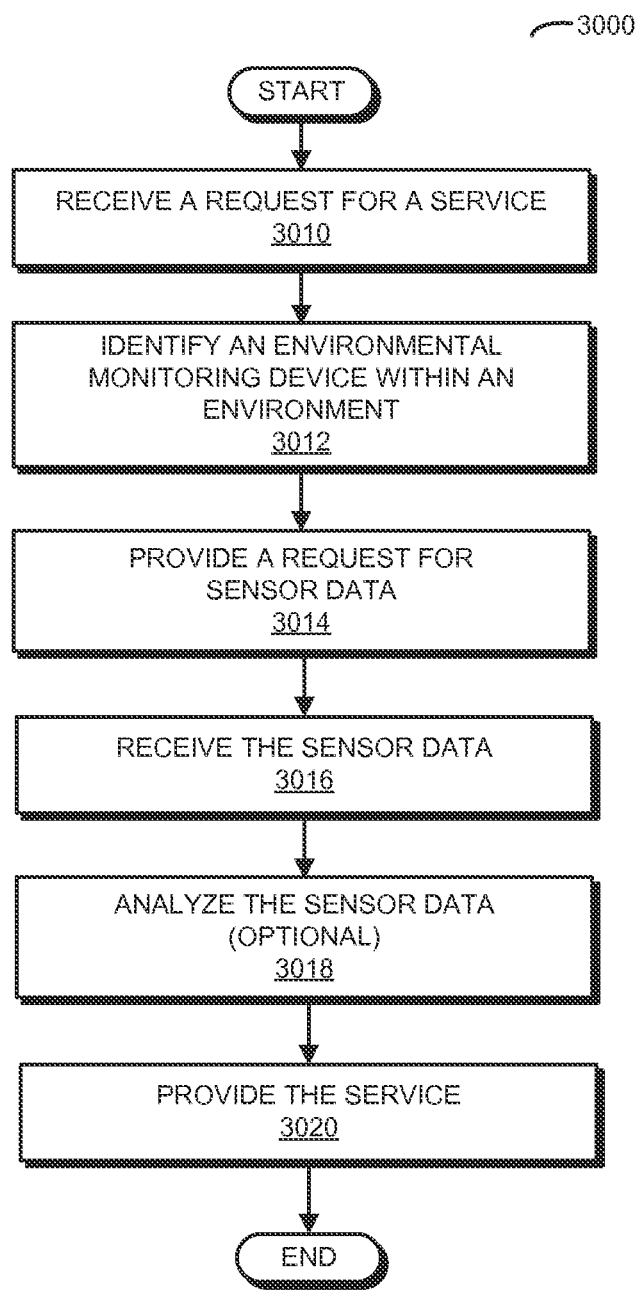
FIG. 30 is a flow diagram illustrating a method for providing a service in the ecosystem of FIG. 1 in accordance with an embodiment of the present disclosure.

FIG. 30 presents a flow diagram illustrating a method 3000 for providing a service and subcontracting for sensor data that enables the service in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system receives, via an interface mechanism in the system, a service request for the service (operation 3010) associated with an environment from an electronic device of an entity (such as a user entity). Note that the service request may include compensation (or information specifying compensation) to or for a third entity associated with the system (such as a provider of the system) for the service.

Then, the system identifies an environmental monitoring device within the environment (operation 3012) in response to the service request, where the environmental monitoring device provides the sensor data that represents an environmental condition in the environment, and the environmental monitoring device is associated with a second entity that is different from the entity (such as another user entity, a third-party owner entity, a partner entity, a service provider, etc.) and/or the third entity. Note that the service may be associated with a type of the sensor data, and the environmental monitoring device may be identified based on the type of the sensor data.

Moreover, the system: provides, via the interface mechanism, a data request for the sensor data (operation 3014) to the environmental monitoring device; and receives, via the interface mechanism, the sensor data (operation 3016) from the environmental monitoring device in response to the data request. Note that the second entity may include a service provider, and the data request may include compensation (or information specifying compensation) to the second entity for the sensor data. Alternatively, the second entity may include a partner of the third entity, and the sensor data may be received without compensation to the second entity for the sensor data.

Furthermore, the system provides the service (operation 3020) to the entity based on the environmental condition. In some embodiments, the system optionally analyzes the sensor data (operation 3018), and the service may be provided based on the analyzed sensor data.

For example, the system may provide an instruction to a regulator device in the environment to modify the environmental condition, where the regulator device is associated with: the second entity and/or a fourth entity that is different from the entity, the second entity and the third entity (such as a regulator entity). Moreover, the instruction may include compensation (or information specifying the compensation) for modifying the environmental condition. In particular, the compensation may be for: modifying the environmental condition on a per-event basis; and/or modifying the environmental condition during at least a time interval. Thus, the service may be provided on a one-time basis. (More generally, in the present discussion compensation may include a flat-rate subscription paid at a predefined periodicity, such as monthly, bi-yearly or yearly, which may cover a predefined number of instances of the environmental condition or an unlimited number of instances.) Alternatively or additionally, the service may be selectively provided as a function of time based on the environmental condition.

Note that performing the service may involve: downloading software for the environmental monitoring device that, when executed by the environmental monitoring device, performs the service; and/or remotely enabling a software module in the environmental monitoring device (i.e., that is already installed in the environmental monitoring device) that, when executed by the environmental monitoring device, performs the service. Thus, the service may involve adding a capability or functionality to the environmental monitoring device, such as a different sensor capability and/or a different sensor-data analysis capability.

In some embodiments, the service includes insurance for: an item in the environment, a portion of the environment, and/or the environment.

Figure 31:
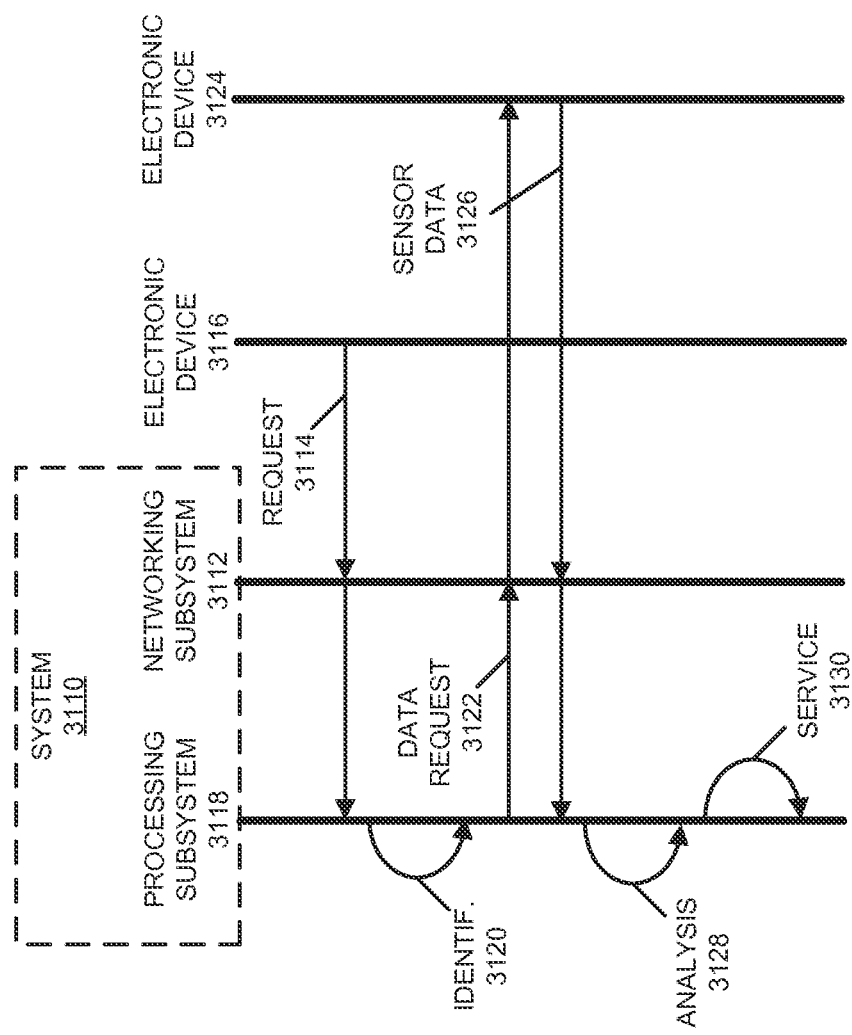
FIG. 31 is a drawing illustrating communication among components in an ecosystem during the method of FIG. 30 in accordance with an embodiment of the present disclosure.

FIG. 31 presents a drawing illustrating communication among components in an ecosystem during method 3000 (FIG. 30). In particular, networking subsystem 3112 in system 3110 may receive a service request 3114 for service 3130 associated with the environment from electronic device 3116 of the entity, and networking subsystem 3112 may forward service request 3114 to processing subsystem 3118. Then, processing subsystem 3118 may identify 3120 an environmental monitoring device 3124 within the environment in response to service request 3114.

Moreover, the processing subsystem 3118 may provide, via networking subsystem 3112, a data request 3122 for the sensor data to environmental monitoring device 3124. In response, environmental monitoring device 3124 may provide sensor data 3126. After networking subsystem 3112 receives sensor data 3124 and forwards sensor data 3126 to processing subsystem 3118, processing subsystem 3118 may provide service 3130 based on the environmental condition. In some embodiments, processing subsystem 3118 optionally performs analysis 3128 on sensor data 3126 prior to providing service 3130 based, at least in part, on a result of analysis 3128.

Figure 32:
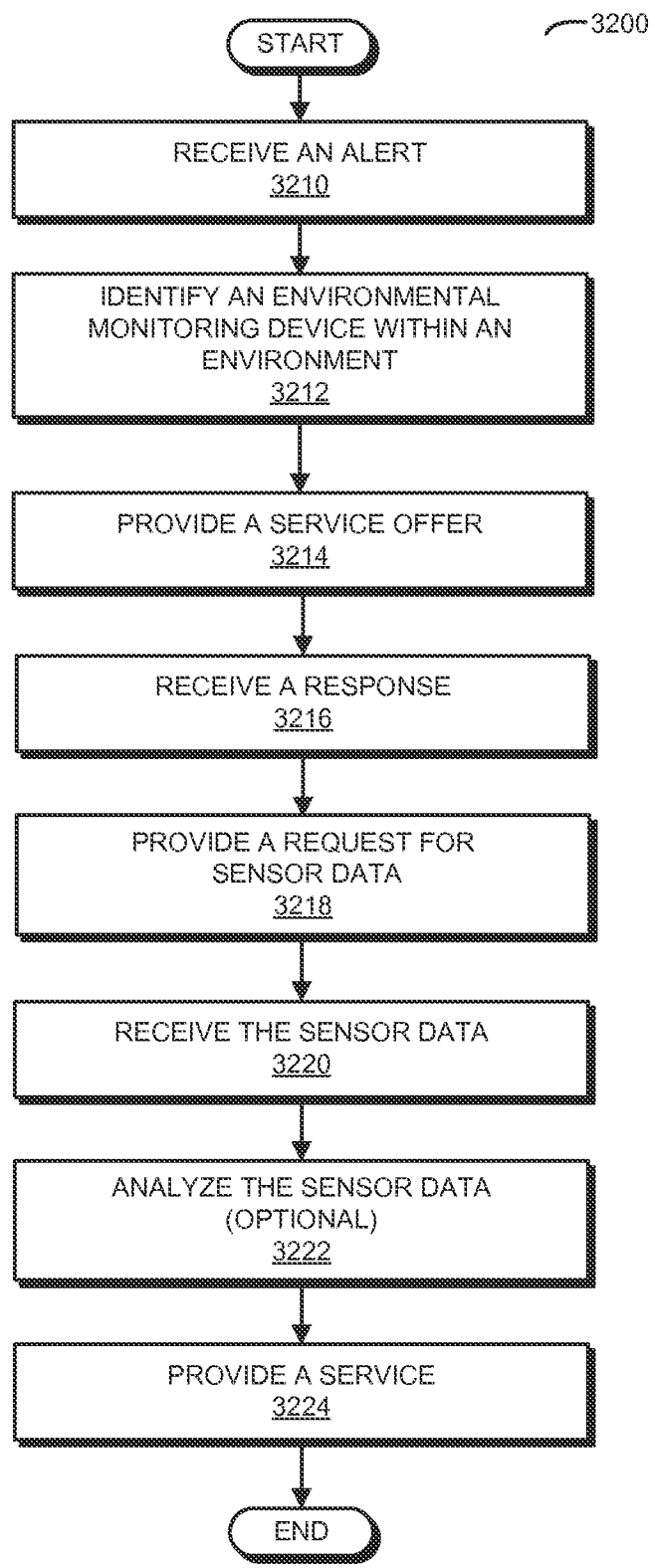
FIG. 32 is a flow diagram illustrating a method for providing a service in the ecosystem of FIG. 1 in accordance with an embodiment of the present disclosure.

FIG. 32 presents a flow diagram illustrating a method 3200 for providing a service and subcontracting for sensor data that enables the service in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system receives, via an interface mechanism in the system, an alert (operation 3210) associated with an environment, such as an alert based on an environmental condition in the environment (such as an alert from an electronic device in the environment or external to the environment). Then, the system identifies an environmental monitoring device within the environment (operation 3212) in response to the alert, where the environmental monitoring device provides the sensor data that represents the environmental condition in the environment, and the environmental monitoring device is associated with a second entity (such as another user entity, a third-party owner entity, a partner entity, a service provider, etc.) that may be different than a third entity associated with the system (such as a provider of the system). Note that the service may be associated with a type of the sensor data, and the environmental monitoring device may be identified based on the type of the sensor data.

Moreover, the system: provides, via the interface mechanism, a service offer (operation 3214) to an electronic device of an entity associated with the environment (such as a cellular telephone of a user entity), where the service offer includes information associated with the environmental condition (e.g., the information may indicate the environmental condition is present or may indicate that, if the service offer is accepted, information about the environmental condition will be provided), and the entity is different from the second entity and the third entity; and receives, via the interface mechanism, a response (operation 3216) to the service offer from the electronic device, where the response authorizes a service. Note that the response may include compensation (or information specifying compensation) for the third entity for the service.

Furthermore, the system: provides, via the interface mechanism, a data request for the sensor data (operation 3218) to the environmental monitoring device; and receives, via the interface mechanism, the sensor data (operation 3220) from the environmental monitoring device in response to the data request. Note that the second entity may include a service provider, and the data request may include compensation (or information specifying compensation) to the second entity for the sensor data. Alternatively, the second entity may include a partner of the third entity, and the sensor data may be received without compensation to the second entity for the sensor data.

Additionally, the system provides the service (operation 3224) to the entity based on the environmental condition. In some embodiments, the system optionally analyzes the sensor data (operation 3222), and the service may be provided based on the analyzed sensor data.

For example, the system may provide an instruction to a regulator device in the environment to modify the environmental condition, where the regulator device is associated with: the second entity and/or a fourth entity that is different from the entity, the second entity and the third entity (such as a regulator entity). Moreover, the instruction may include compensation (or information specifying the compensation) for modifying the environmental condition. In particular, the compensation may be for: modifying the environmental condition on a per-event basis; and/or modifying the environmental condition during at least a time interval. Thus, the service may be provided on a one-time basis. Alternatively or additionally, the service may be selectively provided as a function of time based on the environmental condition.

Note that performing the service may involve: downloading software for the environmental monitoring device that, when executed by the environmental monitoring device, performs the service; and/or remotely enabling a software module in the environmental monitoring device (i.e., that is already installed in the environmental monitoring device) that, when executed by the environmental monitoring device, performs the service. Thus, the service may involve adding a capability or functionality to the environmental monitoring device, such as a different sensor capability and/or a different sensor-data analysis capability.

In some embodiments, the service includes insurance for: an item in the environment, a portion of the environment, and/or the environment.

Figure 33:
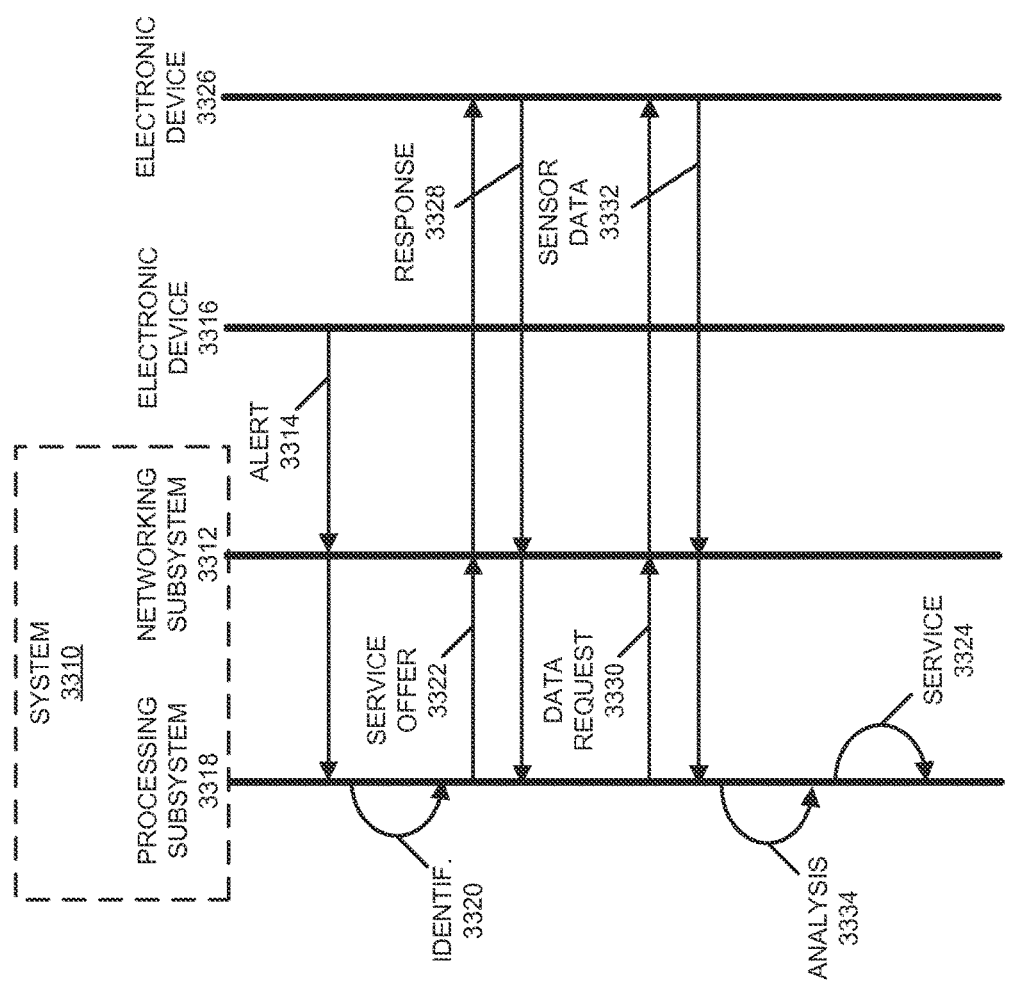
FIG. 33 is a drawing illustrating communication among components in an ecosystem during the method of FIG. 32 in accordance with an embodiment of the present disclosure.

FIG. 33 presents a drawing illustrating communication among components in an ecosystem during method 3200 (FIG. 32). In particular, networking subsystem 3312 in system 3310 may receive an alert 3314 associated with the environment from electronic device 3316, and networking subsystem 3312 may forward alert 3314 to processing subsystem 3318. Then, processing subsystem 3318 may identify environmental monitoring device 3320 within the environment in response to alert 3314.

Moreover, the processing subsystem 3318 may provide, via networking subsystem 3312, service offer 3322 for service 3324 to electronic device 3326 of the entity. In response, electronic device 3326 may provide response 3328 authorizing service 3324.

After networking subsystem 3312 receives response 3328 and forwards response 3328 to processing subsystem 3318, processing subsystem 3318 may provide a data request 3330 for the sensor data to environmental monitoring device 3320. In response, environmental monitoring device 3320 may provide sensor data 3332. Furthermore, after networking subsystem 3312 receives sensor data 3332 and forwards sensor data 3332 to processing subsystem 3318, processing subsystem 3318 may provide service 3324 based on the environmental condition. In some embodiments, processing subsystem 3318 optionally performs analysis 3334 on sensor data 3332 prior to providing service 3324 based, at least in part, on a result of analysis 3334.

Figure 34:
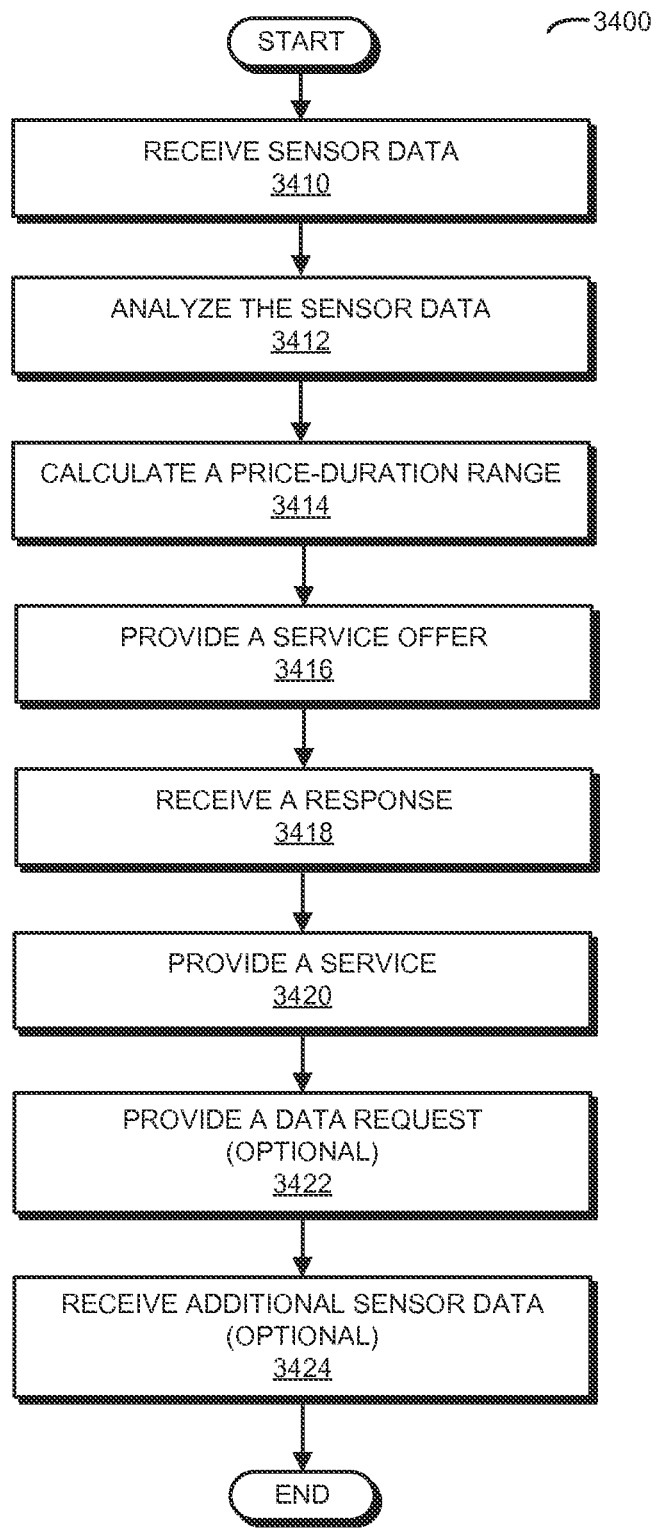
FIG. 34 is a flow diagram illustrating a method for providing a service offer for a service in the ecosystem of FIG. 1 in accordance with an embodiment of the present disclosure.

FIG. 34 presents a flow diagram illustrating a method 3400 for providing a service offer for a service (such as dynamic insurance) in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system receives, via an interface mechanism in the system, sensor data (operation 3410) from environmental monitoring devices in environments, where the sensor data represent environmental conditions in the environments, and where the environmental monitoring devices are associated with second entities (such as another user entity, a third-party owner entity, a partner entity, a service provider, etc.) that are different from a third entity associated with the system (such as a provider of the system). Note that the system may provide compensation (or information specifying the compensation) to the second entities for the sensor data.

Then, the system analyzes the sensor data (operation 3412) to determine a probability of an environmental condition occurring during a time interval in at least one of the environments, where an entity (such as a user entity) is associated with at least the one of the environments. Moreover, the system calculates a price-duration range (operation 3414) of a service in the environment necessary for profitability of the service based on the determined probability and an estimated cost associated with the service.

Next, the system provides, via the interface mechanism, a service offer (operation 3416) for the service associated with the environmental condition to an electronic device associated with the entity, where the service offer includes at least a price and a duration based on the calculated price-duration range.

Furthermore, the system: receives, via the interface mechanism, a response (operation 3418) to the service offer from the electronic device, where the response authorizes the service; and provides the service (operation 3420) to the entity based on subsequent sensor data from one or more of the environmental monitoring devices. Note that the response may be received without action by the entity (e.g., the electronic device may authorize the service based on one or more predefined criteria). Additionally, note that the service may be selectively provided based on the environmental condition, such as when the environmental condition occurs or is present, or when the environmental condition is absent. In some embodiments, the sensor data is received on an ongoing basis, and the analysis is performed dynamically to update the price-duration range.

Note that performing the service may involve: downloading software for at least the one environmental monitoring device that, when executed by at least the one environmental monitoring device, performs the service; and/or remotely enabling a software module in at least the one environmental monitoring device (i.e., that is already installed in the environmental monitoring device) that, when executed by at least the one environmental monitoring device, performs the service. Thus, the service may involve adding a capability or functionality to the environmental monitoring device, such as a different sensor capability and/or a different sensor-data analysis capability.

In some embodiments, the service offer includes multiple pairs of prices and durations based on the calculated price-duration range. In these embodiments, the response to the service offer from the electronic device authorizes the service at one of the pairs of prices and durations.

The sensor data may include current and historical sensor data representing the environmental conditions in the environments. Furthermore, the service may include insurance for: an item in at least the one environment, a portion of at least the one environment, and/or at least the one environment. Additionally, the duration may include: one occurrence of the environmental condition, or a predefined number of instances (such as 1, 3, 5, 10 or 100 occurrences).

Moreover, the system may: optionally provide, via the interface mechanism, a data request (operation 3422) for additional sensor data to at least: one or more of the environmental monitoring devices, and/or one or more additional environmental monitoring devices in at least the one environment; and optionally receive, via the interface mechanism, the additional sensor data (operation 3424) in response to the data request. For example, the additional sensor data may provide an independent verification of the price and the duration (thus, the additional sensor data may be the same or a different type of sensor data than the sensor data). The system may update the price and/or the duration based on the additional sensor data. Note that the additional sensor data may be associated with or may have timestamps after those of the sensor data. Moreover, the service may be provided based on the additional sensor data and/or the system may provide compensation (or information specifying the compensation) for the additional sensor data.

Figure 35:
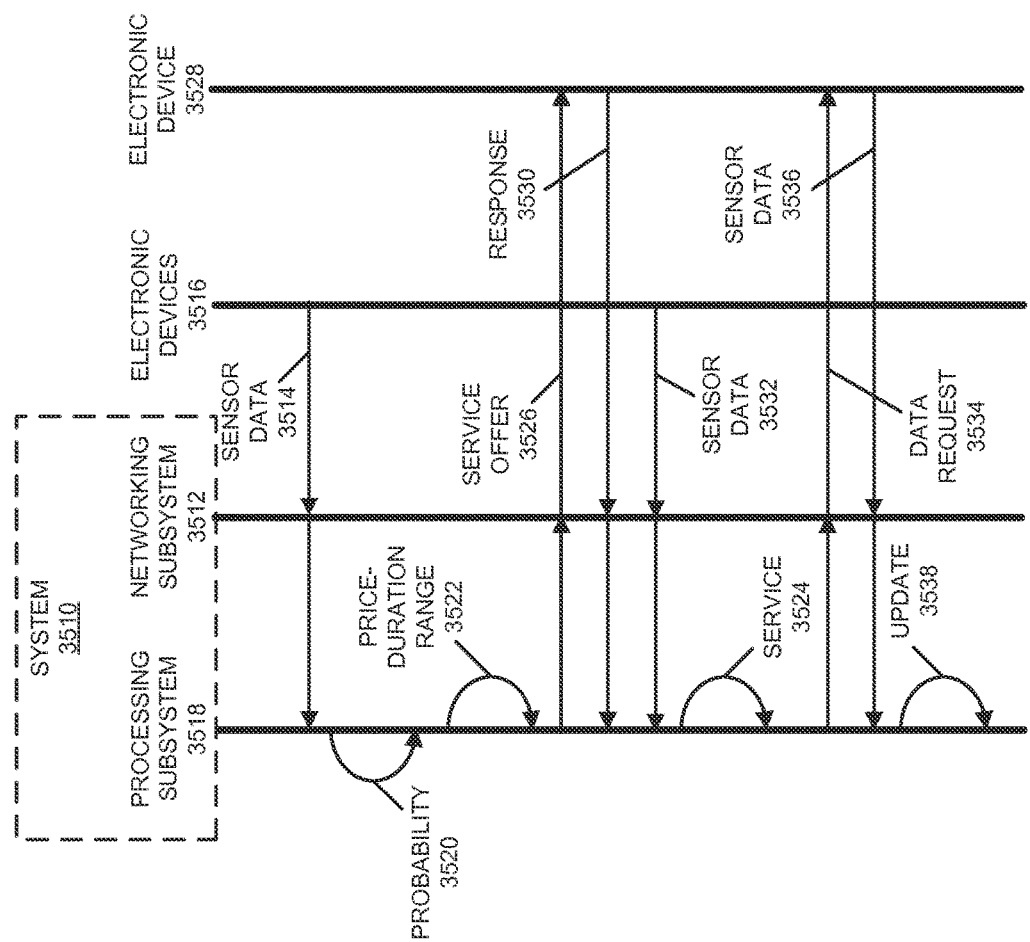
FIG. 35 is a drawing illustrating communication among components in an ecosystem during the method of FIG. 34 in accordance with an embodiment of the present disclosure.

FIG. 35 presents a drawing illustrating communication among components in an ecosystem during method 3400 (FIG. 34). In particular, networking subsystem 3512 in system 3510 may receive sensor data 3514 from environmental monitoring devices 3516 in environments, and networking subsystem 3512 may forward sensor data 3514 to processing subsystem 3518. Then, processing subsystem 3518 may analyze sensor data 3514 to determine probability 3520 of the environmental condition occurring during the time interval in at least one of the environments. Moreover, processing subsystem 3518 may calculate a price-duration range 3522 of service 3524 in the environment necessary for profitability of service 3524 based on probability 3522 and an estimated cost associated with service 3524.

Next, processing subsystem 3518 may provide, via networking subsystem 3512, service offer 3526 for service 3524 to electronic device 3528 associated with the entity, where service offer 3526 includes at least a price and a duration based on calculated price-duration range 3522. In response, electronic device 3528 may provide response 3530 to service offer 3526 authorizing service 3524. After networking subsystem 3512 receives response 3530 and forwards response 3530 to processing subsystem 3518, processing subsystem 3518 may provide service 3524 to the entity based on subsequent sensor data 3532 from one or more of environmental monitoring devices 3516.

In some embodiments, processing subsystem 3518 optionally provides, via networking subsystem 3512, data request 3534 for additional sensor data to one or more of environmental monitoring devices 3516. In response, the one or more of environmental monitoring devices 3516 may optionally provide additional sensor data 3536. After networking subsystem 3512 receives additional sensor data 3536 and forwards additional sensor data 3536 to processing subsystem 3518, processing subsystem 3518 may update 3538 the price and/or the duration based on additional sensor data 3536.

Figure 36:
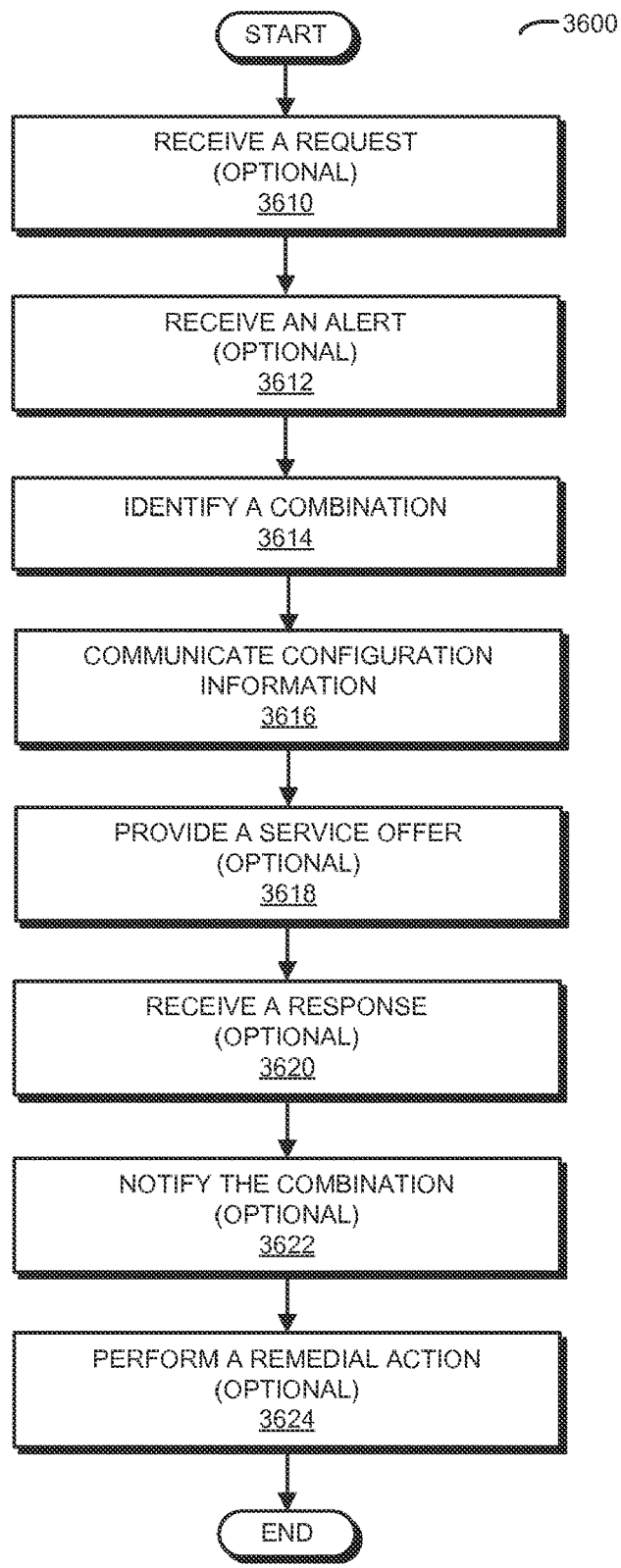
FIG. 36 is a flow diagram illustrating a method for identifying a combination in the ecosystem of FIG. 1 in accordance with an embodiment of the present disclosure.

FIG. 36 presents a flow diagram illustrating method 3600 for identifying a combination of components that provides a service in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system identifies, based on sensor data from (or a type of sensor data available from) at least one of environmental monitoring devices of second entities that represents an environmental condition in an environment, the combination (operation 3614) that provides the service related to the environment, where the combination includes one or more of the environmental monitoring devices of an entity and/or the second entities and one or more of: partner electronic devices and/or service providers. Note that the one or more of the environmental monitoring devices may be included in the environment, and the partner electronic devices may be included in the environment and may be associated with partners or partner entities of a third entity that is associated with the system (such as a provider of the system). Moreover, a given partner electronic device may optionally include, on behalf of the third entity, at least a module and/or a sensor (i.e., the module or the sensor may be pre-installed in the given partner electronic device), and the service providers may include: a maintenance service, an installation service, a retail service, and/or an emergency-monitoring service. Furthermore, the one or more of the environmental monitoring devices and the one or more of the partner electronic devices and the service providers may be associated with different entities. In some embodiments, the service is associated with a type of the sensor data, and the one or more of the environmental monitoring devices are identified based on the type of the sensor data. For example, the service may involve providing useful information (such as discount offers or advertisements) for products a user may need, and the sensor data may allow the system, as a function of time, to identify the user's needs and their emotional state (such as when the user is interested or feeling like shopping or purchasing something, e.g., when the user is happy, when the user is motivated to solve a problem, etc.). Thus, the environmental condition may include a user's emotional state, needs and/or shopping intent.

Then, the system communicates, via an interface mechanism in the system, configuration information (operation 3616) specifying the combination and functions in the service to the one or more of the environmental monitoring devices and one or more of the partner electronic devices and/or service-provider electronic devices of the service providers. The configuration information specifies interrelationships among the combination that define the service-data hierarchy, and the service-data hierarchy may specify the exchange of the sensor data, the sub-services in the service, and the compensation (including instructions for how to provide the compensation) within the combination for the sensor data and the sub-services.

In some embodiments, the system optionally receives a request (operation 3610) for the service from an electronic device associated with the entity that is associated with the environment, where the entity may be different from the second entities, the third entity, the partners and the service providers, and the combination may be identified based on the request. However, in some embodiments the combination is identified without a request from the entity that is associated with the environment. Furthermore, the combination may be identified when: the environmental condition occurs; and/or a risk of occurrence of the environmental condition exceeds a threshold (such as 1, 5, 10, 25 or 50%). Additionally, the system may optionally receive, via the interface mechanism, an alert (operation 3612) about an occurrence of the environmental condition in the environment, where the one or more of the environmental monitoring devices are identified based on the alert.

Moreover, the system may optionally: provide a service offer (operation 3618) for the service to the electronic device associated with the entity; receive a response (operation 3620) to the service offer from the electronic device, where the response authorizes the service; and notify the combination (operation 3622) to provide the service based on the response.

Furthermore, the system may optionally perform remedial action (operation 3624). For example, the system may provide modification information specifying one or more modifications to the combination based on additional sensor data from: the one or more of the environmental monitoring devices; and/or an additional environmental monitoring device in the environment. Alternatively or additionally, the system may provide revision information specifying one or more revisions to the service based on additional sensor data from: the one or more of the environmental monitoring devices; and/or an additional environmental monitoring device in the environment. Note that the system may provide the modification information based on the one or more revisions to the service. Thus, if the service changes, the combination may be modified.

Figure 37:
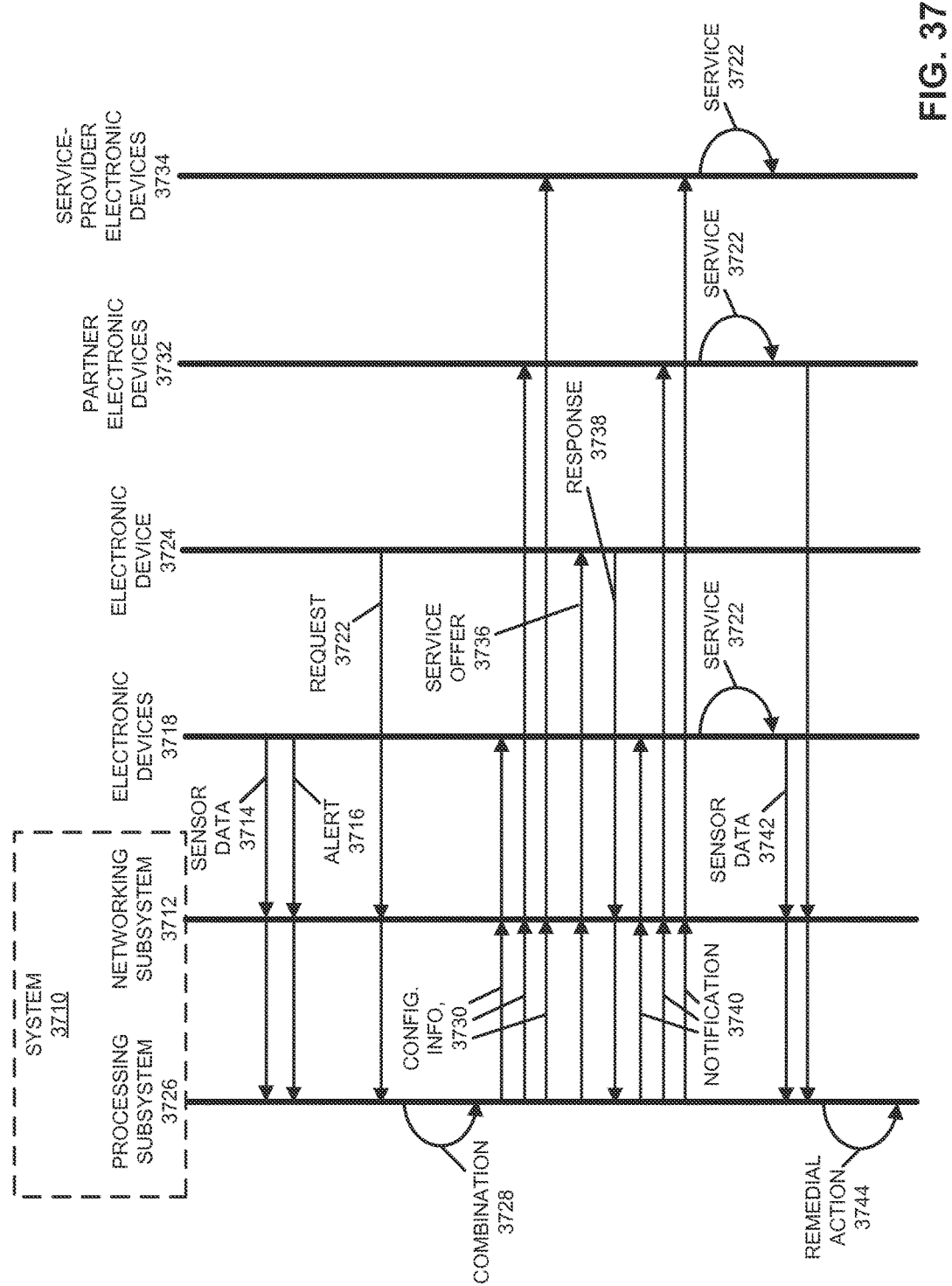
FIG. 37 is a drawing illustrating communication among components in an ecosystem during the method of FIG. 36 in accordance with an embodiment of the present disclosure.

FIG. 37 presents a drawing illustrating communication among components in an ecosystem during method 3600 (FIG. 36). In particular, networking subsystem 3712 in system 3710 may receive sensor data 3714 and/or alert 3716 from one or more of environmental monitoring devices 3718 in environments. Moreover, networking subsystem 3712 may optionally receive request 3720 for service 3722 from electronic device 3724 associated with the entity in one of the environments, and may optionally forward request 3720 to processing subsystem 3726.

Then, processing subsystem 3726 may analyze sensor data 3714 (or the type(s) of sensor data 3714) to identify combination 3728 that provides service 3722 related to the environment.

Furthermore, processing subsystem 3726 may communicate, via networking subsystem 3712, configuration information 3730 specifying combination 3728 and functions in service 3722 to one or more of environmental monitoring devices 3718 and one or more of partner electronic devices 3732 of the partners and/or service-provider electronic devices 3734 of the service providers.

Additionally, processing subsystem 3726 may optionally provide, via networking subsystem 3712, a service offer 3736 for service 3722 to electronic device 3724. In response, electronic device 3724 may optionally provide response 3738 authorizing service 3722, which is received by networking subsystem 3712 and forwarded to processing subsystem 3726. Then, processing subsystem 3726 may optionally provide, via networking subsystem 3712, notification 3740 to combination 3728 to provide service 3722.

Based on optional additional sensor data 3742, which is received by networking subsystem 3712 from one or more of environmental monitoring devices 3718 and/or one or more of partner electronic devices 3732, and forwarded to processing subsystem 3726, processing subsystem 3726 may optionally perform remedial action 3744, such as a modification to combination 3728 and/or a revision to service 3722.

Figure 38:
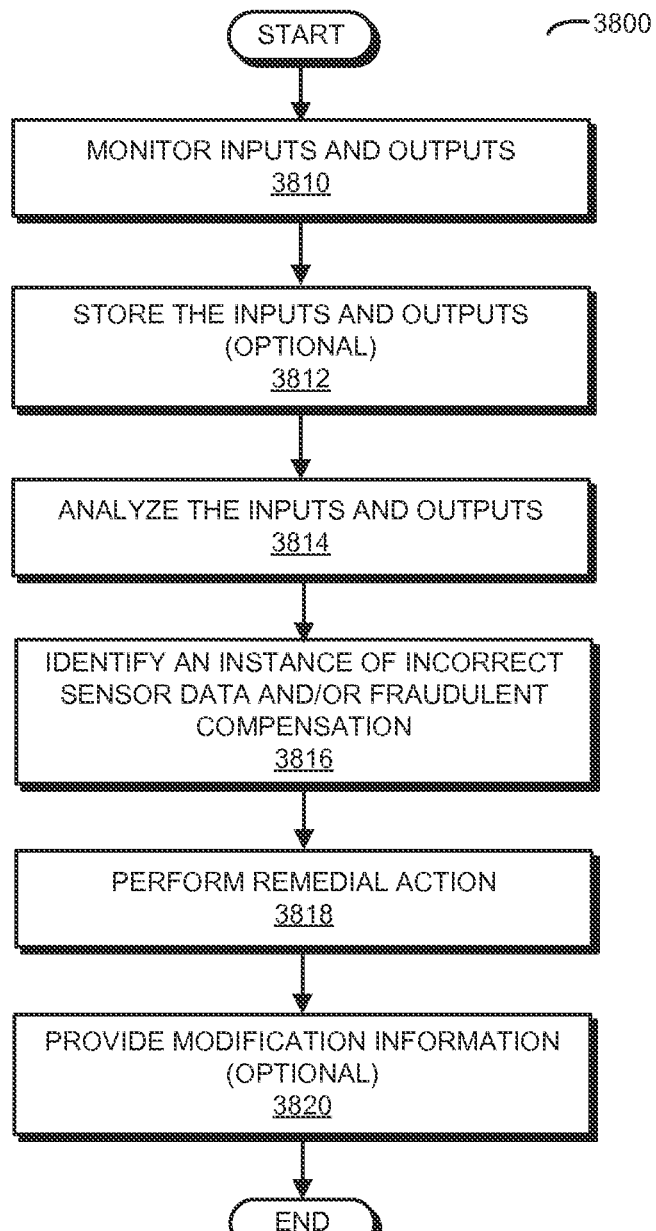
FIG. 38 is a flow diagram illustrating a method for performing a remedial action in the ecosystem of FIG. 1 in accordance with an embodiment of the present disclosure.

FIG. 38 presents a flow diagram illustrating a method 3800 for performing a remedial action in response to bad sensor data and/or fraudulent payments in one or more combinations in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system monitors inputs and outputs (operation 3810) exchanged among components in combinations that provide services in the environments, where the environments include environmental monitoring devices (which are associated with user entities and/or second entities) and partner electronic devices (which are associated with partners or partner entities of a third entity associated with the system, such as a provider of the system). Note that the components in a given combination include at least one of: the environmental monitoring devices, and one or more of the partner electronic devices and/or service providers. The given partner electronic device may include, on behalf of the third entity, at least a module and/or a sensor (i.e., the module and/or the sensor may be pre-installed in the given partner electronic device). Moreover, the service providers include: a maintenance service, an installation service, a retail service, and/or an emergency-monitoring service Furthermore, the inputs and the outputs from a given component in the given combination include: sensor data representing one or more environmental conditions in one or more of the environments, sub-services in the services, and/or compensation (or information specifying the compensation) within the given combination for the sensor data and the sub-services. Then, the system: optionally stores the monitored inputs and outputs (operation 3812); analyzes the inputs and outputs (operation 3814) based on quality criteria and historical inputs and outputs exchanged within the combinations; identifies, based on the analysis, an instance in the inputs and the outputs of: incorrect sensor data and/or fraudulent compensation (operation 3816); and performs a remedial action (operation 3818) based on the identified instance.

Note that the analysis (operation 3814) may compare the monitored inputs and outputs and historical inputs and outputs from at least a subset of the combinations. Moreover, the combinations in the subset may have: a common type of service, and/or a common type of sensor data.

Moreover, the quality criteria may include: pre-defined or pre-determined signatures of failure mechanisms in the combinations, and/or signatures of previous fraudulent activity in the combinations.

Furthermore, the sensor data may be acquired by one or more of: the environmental monitoring devices, and/or the partner electronic devices.

Additionally, at least the one of: the environmental monitoring devices and the one or more of the partner electronic devices and the service providers in the given combination may be associated with different entities.

In some embodiments, the system optionally provides modification information (operation 3820) specifying one or more modifications to one or more of the combinations based on the sensor data and/or the environmental conditions. In this way, the combinations may be modified as the environmental condition changes.

Moreover, the remedial action may include providing a notification about the identified instance to an affected combination. Alternatively or additionally, the remedial action may include providing modification information specifying a modification to an affected combination that includes the identified instance. For example, the modification may include excluding a source of the identified instance from the affected combination, where the source may include one of: the environmental monitoring devices, the partner electronic devices and/or the service providers. Note that the remedial action may include banning the source from inclusion in subsequent combinations. Furthermore, the modification may include replacing the source of the identified instance in the affected combination, and where a replacement for the source may include: the environmental monitoring devices, the partner electronic devices and/or the service providers that is different than the source.

In some embodiments, the remedial action includes: discontinuing a service provided by an affected combination that includes the instance; and/or adjusting a level of the service provided by the affected combination that includes the instance (e.g., the service may be slowed down or intentionally degraded, noise can be intentionally introduced in signal-based services or in the associated sensor data, or data privileges of the source of the instance may be changed or eliminated). Alternatively or additionally, the remedial action may include removing the incorrect sensor data from the inputs and the outputs. Furthermore, the remedial action may include replacing the incorrect sensor data from the inputs and the outputs with modified sensor data (such as inferred or extrapolated sensor data, or sensor data that is corrected for the incorrect sensor data). Additionally, the remedial action may include instructions for performing maintenance on the source of the identified instance in an affected combination.

Figure 39:
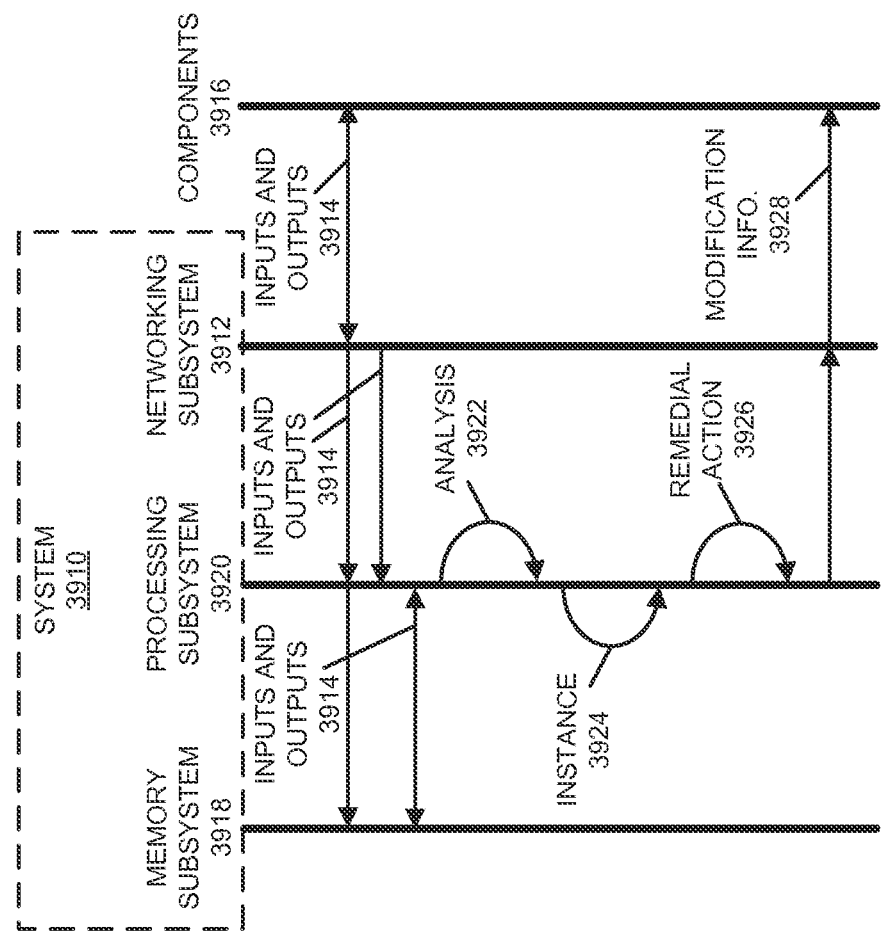
FIG. 39 is a drawing illustrating communication among components in an ecosystem during the method of FIG. 38 in accordance with an embodiment of the present disclosure.

FIG. 39 presents a drawing illustrating communication among components in an ecosystem during the method 3800 (FIG. 38). In particular, networking subsystem 3912 in system 3910 may monitor inputs and outputs 3914 exchanged among and/or with components 3916 in the combinations that provide services in the environments. Note that the components in a given combination may include at least one of: the environmental monitoring devices, and one or more of the partner electronic devices and/or service providers. Moreover, inputs and outputs 3914 from a given component in the given combination include: sensor data representing one or more environmental conditions in one or more of the environments, sub-services in the services, and/or compensation within the given combination for the sensor data and the sub-services.

Then, networking subsystem 3912 may optionally store inputs and outputs 3914 in memory subsystem 3918 (e.g., for future use). Furthermore, processing subsystem 3920 may access inputs and outputs 3914 in memory subsystem

3918 and/or may receive inputs and outputs 3914 from networking subsystem 3912, and processing subsystem 3920 may perform analysis 3922 on inputs and outputs 3914 based on quality criteria and historical inputs and outputs exchanged within combinations 3916. Next, processing subsystem 3920 may identify, based on analysis 3922, an instance 3924 in inputs and outputs 3914 of: incorrect sensor data and/or fraudulent compensation, processing subsystem 3920 may perform a remedial action 3926 based on instance 3924.

In some embodiments, processing subsystem 3920 optionally provides, via networking subsystem 3912, modification information 3928 specifying one or more modifications to components 3916 in one or more of the combinations based on the sensor data and/or the environmental conditions.

Figure 40:
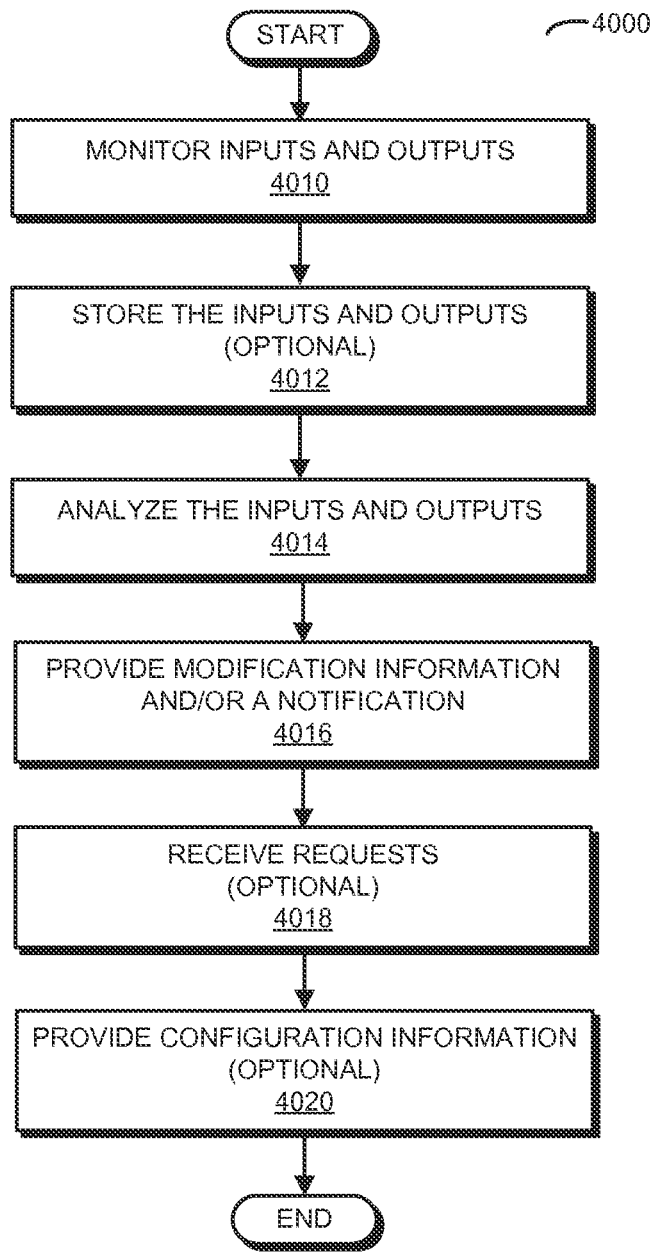
FIG. 40 is a flow diagram illustrating a method for analyzing inputs and outputs in the ecosystem of FIG. 1 in accordance with an embodiment of the present disclosure.

FIG. 40 presents a flow diagram illustrating method 4000 for analyzing inputs and outputs exchanged in combinations in the ecosystem of FIG. 1, which may be performed by an environmental monitoring device (such as one of environmental monitoring devices 110 in FIG. 1), a computer system (such as one of computer systems 120 in FIG. 1) and/or, more generally, a system at one or more locations in the ecosystem. In the discussion that follows, the system is used as an illustrative example.

During operation, the system monitors the inputs and the outputs (operation 4010) among components in the combinations that provide services in environments, where the environments include environmental monitoring devices (which are associated with user entities and/or second entities) and partner electronic devices (which are associated with partners or partner entities of a third entity associated with the system, such as a provider of the system). Note that the components in a given combination include at least one of: the environmental monitoring devices, and one or more of the partner electronic devices and/or service providers. The given partner electronic device may include, on behalf of the third entity, at least a module and/or a sensor (i.e., the module and/or the sensor may be pre-installed in the given partner electronic device). Moreover, the service providers include: a maintenance service, an installation service, a retail service, and/or an emergency-monitoring service. Furthermore, the inputs and the outputs from a given component in the given combination include: sensor data representing one or more environmental conditions in one or more of the environments, sub-services in the services, and/or compensation (or information specifying the compensation) within the given combination for the sensor data and the sub-services. Then, the system optionally stores the monitored inputs and outputs (operation 4012). Next, the system analyzes the inputs and the outputs (operation 4014) to determine: sensor-data patterns, suggested services, and/or suggested sensor-data sub-contracting during the services and the suggested services.

Note that the analysis (operation 4014) may compare the monitored inputs and outputs and historical inputs and outputs from at least a subset of the combinations. Moreover, the combinations in the subset may have: a common type of service, and/or a common type of sensor data.

Moreover, the system may store information specifying the combinations and the services.

Furthermore, the sensor data may be acquired by one or more of: the environmental monitoring devices and/or the partner electronic devices.

Additionally, at least the one of: the environmental monitoring devices and the one or more of the partner electronic devices and the service providers in the given combination may be associated with different entities. Note that, based on data privileges, at least some of the different entities may have different access rights to the inputs and the outputs, and to the analysis.

In some embodiments, the system optionally provides: modification information (operation 4016) specifying one or more modifications to one or more of the combinations based on the analysis, and/or a notification (operation 4016) based on the analysis. In this way, the combinations may be modified or adapted based on identified opportunities.

Note that analysis (operation 4014) may determine: purchasing patterns, recommended product features, recommended retail inventory, recommended pricing of the services and the suggested services, and/or recommended durations of the services and the suggested services.

Additionally, the system may optionally: receive requests for the services (operation 4018), e.g., from electronic devices of user entities; and provide configuration information (operation 4020) specifying the combinations and functions of the components in the combinations. Note that at least some of the combinations may provide the services in at least a subset of the environments without action by occupants of at least the subset of the environments (e.g., the requests may be provided by third parties). For example, the requests for the services for at least some of the combinations may be associated with: a governmental organization, an insurance provider, and/or an owner of at least the subset of the environments.

FIG. 41 presents a drawing illustrating communication among components in an ecosystem during the method 4000 (FIG. 40). In particular, networking subsystem 4112 in system 4110 may monitor inputs and outputs 4114 exchanged among and/or with components 4116 in the combinations that provide services in the environments. Note that the components in a given combination may include at least one of: the environmental monitoring devices, and one or more of the partner electronic devices and/or service providers. Moreover, inputs and outputs 4114 from a given component in the given combination include: sensor data representing one or more environmental conditions in one or more of the environments, sub-services in the services, and/or compensation within the given combination for the sensor data and the sub-services.

Then, networking subsystem 4112 may optionally store inputs and outputs 4114 in memory subsystem 4118. Furthermore, processing subsystem 4120 may access inputs and outputs 4114 in memory subsystem 4118 and/or may receive inputs and outputs 4114 from networking subsystem 4112, and processing subsystem 4120 may perform analysis 4122 on inputs and outputs 4114 to determine analysis results, such as: sensor-data patterns, suggested services, and/or suggested sensor-data sub-contracting during the services and the suggested services.

Additionally, processing subsystem 4120 may optionally provide, via networking subsystem 4112, modification information 4124 specifying one or more modifications to components 4116 in one or more of the combinations and/or notification 4126 based on analysis 4122.

In some embodiments, networking subsystem 4112 may optionally receive, from one or more components 4116, one or more requests 4128 for one or more services, and networking subsystem 4112 may optionally forward the one or more requests 4128 to processing subsystem 4120. In response, processing subsystem 4120 may optionally provide, via networking subsystem 4112, configuration information 4130 specifying the combinations and functions of components 4116 in the combinations, so components 4116 can provide the one or more requested services.

In some embodiments of one or more of the preceding methods, there may be additional or fewer operations. Furthermore, the order of the operations may be changed, and/or two or more operations may be combined into a single operation. In addition, in some of the preceding embodiments there are fewer components, more components, a position of a component is changed and/or two or more components are combined.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system, comprising:
an interface-circuit configured to communicate with electronic devices; and
a control circuit, coupled to the interface circuit, configured to:
receive, via the interface circuit, a service request for a service associated with an environment from an electronic device of an entity;
identify an environmental monitoring device within the environment in response to the service request, wherein the environmental monitoring device provides sensor data that represents an environmental condition in the environment, and wherein the environmental monitoring device is associated with a second entity that is different from the entity and a third entity associated with the system;
provide, via the interface circuit, a data request for the sensor data to the environmental monitoring device;
receive, via the interface circuit, the sensor data from the environmental monitoring device in response to the data request; and
provide the service to the entity based at least in part on the environmental condition, wherein the service is other than providing the sensor data to the entity; and
wherein the service comprises insurance for one of: an item in the environment; a portion of the environment; and the environment.

2. The system of claim 1, wherein the service is associated with a type of the sensor data; and
wherein the environmental monitoring device is identified based at least in part on the type of the sensor data.

3. The system of claim 1, wherein the control circuit is configured to analyze the sensor data; and
wherein the service is provided based at least in part on the analyzed sensor data.

4. The system of claim 1, wherein the service request comprises compensation to the third entity for the service.

5. The system of claim 1, wherein the second entity comprises a service provider; and
wherein the data request comprises compensation to the second entity for the sensor data.

6. The system of claim 1, wherein the second entity comprises a partner of the third entity; and
wherein the sensor data is received without compensation to the second entity for the sensor data.

7. The system of claim 1, wherein the control circuit is configured to provide an instruction to a regulator device in the environment to modify the environmental condition;
wherein the regulator device is associated with one of: the second entity; and a fourth entity that is different from the entity, the second entity and the third entity; and
wherein the instruction comprises compensation for modifying the environmental condition.

8. The system of claim 7, wherein the compensation is for one of: modifying the environmental condition on a per-event basis; and modifying the environmental condition during at least a time interval.

9. The system of claim 1, wherein the service is provided on a one-time basis.

10. The system of claim 1, wherein the service is selectively provided as a function of time based at least in part on the environmental condition.

11. The system of claim 1, wherein, when at least one of necessary sensor data and analyzed sensor data associated with the service request are unavailable for the environment, performing the service involves one of: downloading software for the environmental monitoring device that, when executed by the environmental monitoring device, performs the service; and remotely enabling a software module in the environmental monitoring device that, when executed by the environmental monitoring device, performs the service.

12. The system of claim 1, wherein the control circuit comprises:
a processor coupled to the interface mechanism; and
memory, coupled to the processor, which stores a program module, wherein, when executed by the processor, the program module causes the system to receive the service request, identify the environmental monitoring device, provide the data request, receive the sensor data and provide the service.

13. A non-transitory computer-readable storage medium for use in conjunction with a system, the computer-readable storage medium storing a program module to provide a service, wherein, when executed by the system, the program module causes the system to:
receive, via an interface circuit in the system, a service request for the service associated with an environment from an electronic device of an entity;
identify an environmental monitoring device within the environment in response to the service request, wherein the environmental monitoring device provides sensor data that represents an environmental condition in the environment, and wherein the environmental monitoring device is associated with a second entity that is different from the entity and a third entity associated with the system;
provide, via the interface circuit, a data request for the sensor data to the environmental monitoring device;
receive, via an interface circuit, the sensor data from the environmental monitoring device in response to the data request; and provide the service to the entity based at least in part on the environmental condition, wherein the service is other than providing the sensor data to the entity; and wherein the service comprises insurance for one of: an item in the environment; a portion of the environment; and the environment.

14. The computer-readable storage medium of claim 13, wherein the service is associated with a type of the sensor data; and wherein the environmental monitoring device is identified based at least in part on the type of the sensor data.

15. The computer-readable storage medium of claim 13, wherein the second entity comprises a service provider; and wherein the data request comprises compensation to the second entity for the sensor data.

16. The computer-readable storage medium of claim 13, wherein the second entity comprises a partner of the third entity; and wherein the sensor data is received without compensation to the second entity for the sensor data.

17. The computer-readable storage medium of claim 13, wherein, when executed by the system, the program module causes the system to provide an instruction to a regulator device in the environment to modify the environmental condition;

wherein the regulator device is associated with one of: the second entity; and a fourth entity that is different from the entity, the second entity and the third entity; and wherein the instruction comprises compensation for modifying the environmental condition.

18. The computer-readable storage medium of claim 17, wherein the compensation is for one of: modifying the environmental condition on a per-event basis; and modifying the environmental condition during at least a time interval.

19. A method for providing a service in a system, wherein the method comprises:

by the system:

receiving, via an interface circuit in the system, a service request for the service associated with an environment from an electronic device of an entity;

identifying an environmental monitoring device within the environment in response to the service request, wherein the environmental monitoring device provides sensor data that represents an environmental condition in the environment, and wherein the environmental monitoring device is associated with a second entity that is different from the entity and a third entity associated with the system;

providing, via the interface circuit, a data request for the sensor data to the environmental monitoring device;

receiving, via the interface circuit, the sensor data from the environmental monitoring device in response to the data request; and providing the service to the entity based at least in part on the environmental condition, wherein the service is other than providing the sensor data to the entity; and wherein the service comprises insurance for one of: an item in the environment; a portion of the environment; and the environment.

20. The system of claim 1, wherein the environmental monitoring device is identified based at least in part on a type of sensor data that provides feedback about an occurrence of a risk mechanism that can adversely impact an insured value of an item in the environment.

21. The method of claim 20, wherein the service is associated with a type of the sensor data; and wherein the environmental monitoring device is identified based at least in part on the type of the sensor data.

* * * * *